(12) United States Patent
Chang et al.

(10) Patent No.: US 12,200,161 B2
(45) Date of Patent: *Jan. 14, 2025

(54) USER INTERFACES FOR PRESENTING INDICATIONS OF INCOMING CALLS

(71) Applicant: Apple Inc., Cupertino, CA (US)

(72) Inventors: Jae Woo Chang, Cupertino, CA (US); Nathan De Vries, Alameda, CA (US); Marcel Van Os, Santa Cruz, CA (US); Christopher Patrick Foss, San Francisco, CA (US); Heena Ko, San Francisco, CA (US); Patrick L. Coffman, San Francisco, CA (US); Robert Garcia, III, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,736

(22) Filed: Oct. 23, 2023

(65) Prior Publication Data

US 2024/0163358 A1    May 16, 2024

Related U.S. Application Data

(63) Continuation of application No. 17/352,122, filed on Jun. 18, 2021, now Pat. No. 11,800,001.

(60) Provisional application No. 63/131,094, filed on Dec. 28, 2020, provisional application No. 63/041,776, filed on Jun. 19, 2020.

(51) Int. Cl.
*H04M 1/57*      (2006.01)
*H04M 1/72*      (2021.01)
*H04M 1/72439*   (2021.01)
*H04M 1/72469*   (2021.01)

(52) U.S. Cl.
CPC ....... *H04M 1/575* (2013.01); *H04M 1/72439* (2021.01); *H04M 1/72469* (2021.01); *H04M 2201/42* (2013.01)

(58) Field of Classification Search
None
See application file for complete search history.

(56) References Cited

U.S. PATENT DOCUMENTS 6,323,846 B1    11/2001    Westerman et al.
6,570,557 B1    5/2003     Westerman et al.
(Continued)

FOREIGN PATENT DOCUMENTS

EP    3159773 A2    4/2017
EP    3291523 A1    3/2018
(Continued)

OTHER PUBLICATIONS

Corrected Notice of Allowance received for U.S. Appl. No. 17/352,122, mailed on Sep. 7, 2023, 2 pages.
(Continued)

*Primary Examiner* — Quoc D Tran
(74) *Attorney, Agent, or Firm* — Kubota & Basol LLP

(57) ABSTRACT

In some embodiments, an electronic device displays an incoming call user interface in response to receiving an indication of an incoming call. In some embodiments, the incoming call user interface is displayed overlaid on a respective user interface that is optionally associated with an application other than the application associated with the incoming call.

36 Claims, 42 Drawing Sheets

(56) References Cited

U.S. PATENT DOCUMENTS

| | | |
|---|---|---|
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 7,975,242 B2 | 7/2011 | Forstall et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,762,729 B1 | 9/2017 | Sales et al. |
| 9,933,937 B2 | 4/2018 | Lemay et al. |
| 10,013,227 B2 | 7/2018 | Hyun et al. |
| 11,800,001 B2 * | 10/2023 | Chang ............... H04M 1/72469 |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2012/0094719 A1 | 4/2012 | Choi et al. |
| 2014/0171154 A1 | 6/2014 | Chou et al. |
| 2020/0175945 A1 | 6/2020 | Chen et al. |
| 2021/0400131 A1 | 12/2021 | Chang et al. |

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

International Search Report received for PCT Patent Application No. PCT/US2021/038132, mailed on Oct. 7, 2021, 4 pages.
Non-Final Office Action received for U.S. Appl. No. 17/352,122, mailed on Nov. 7, 2022, 12 pages.
Notice of Allowance received for U.S. Appl. No. 17/352,122, mailed on Jun. 9, 2023, 5 pages.

* cited by examiner

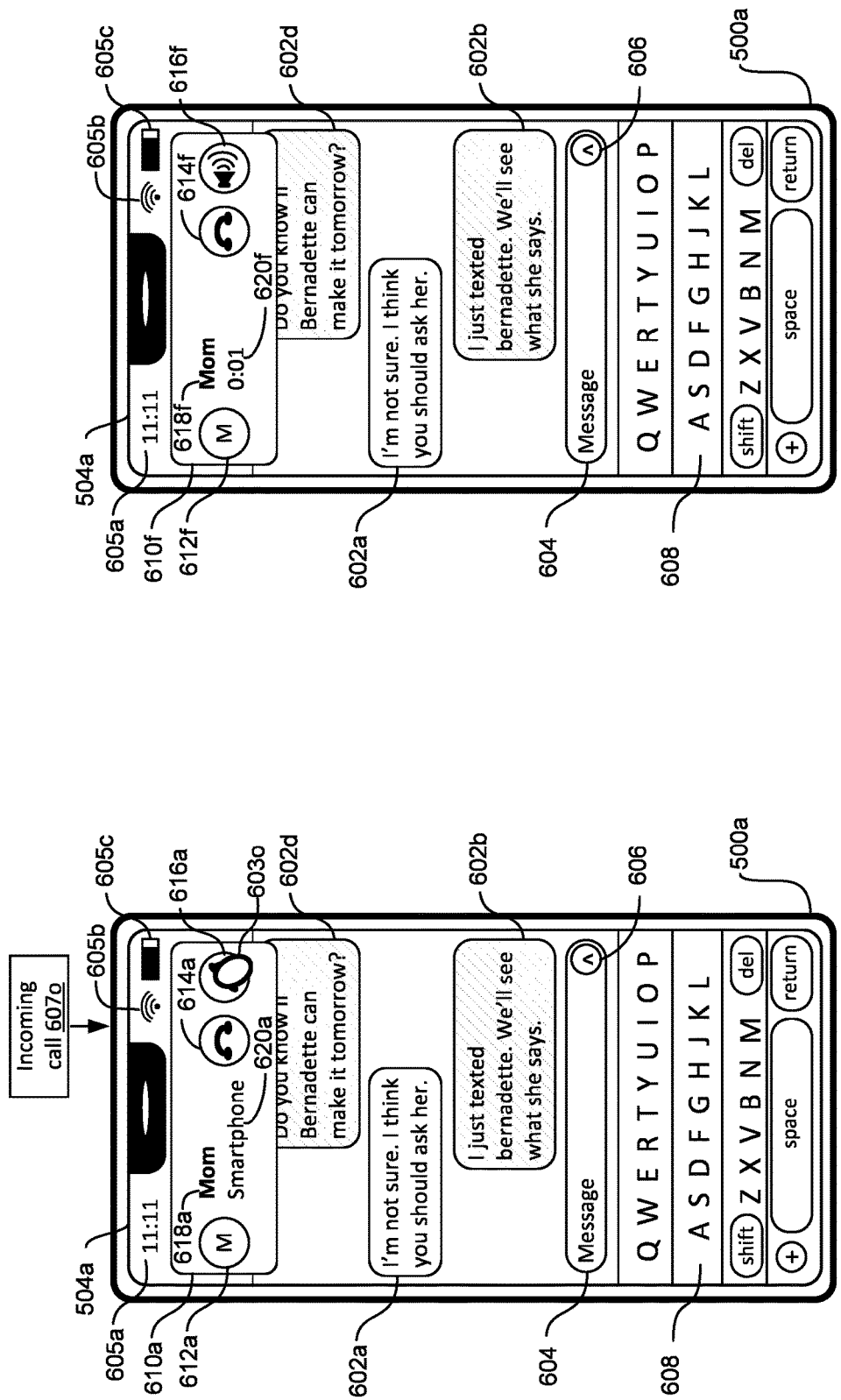

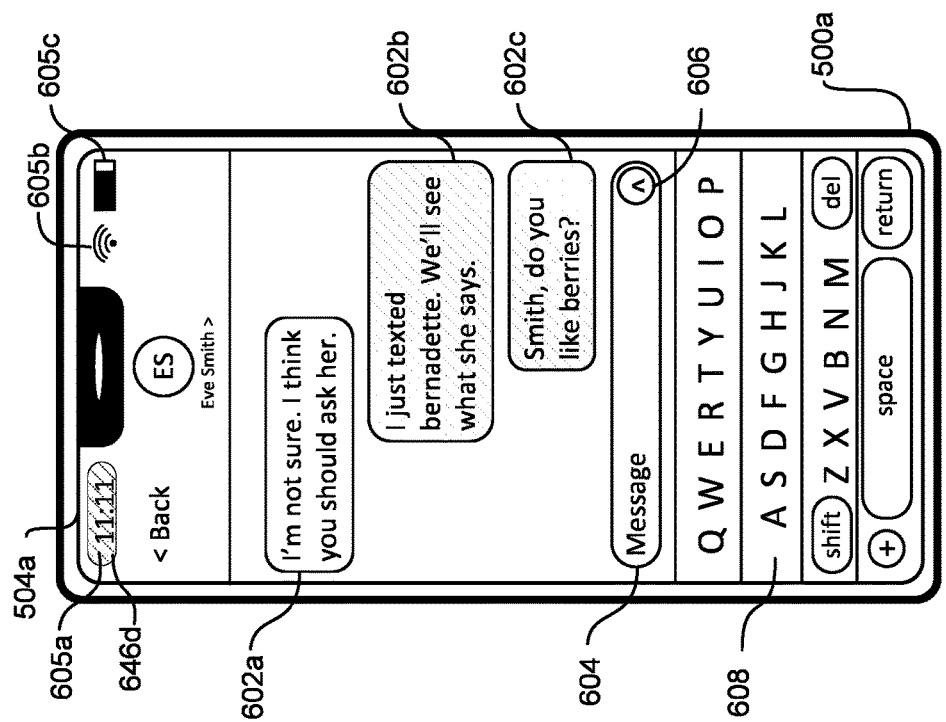
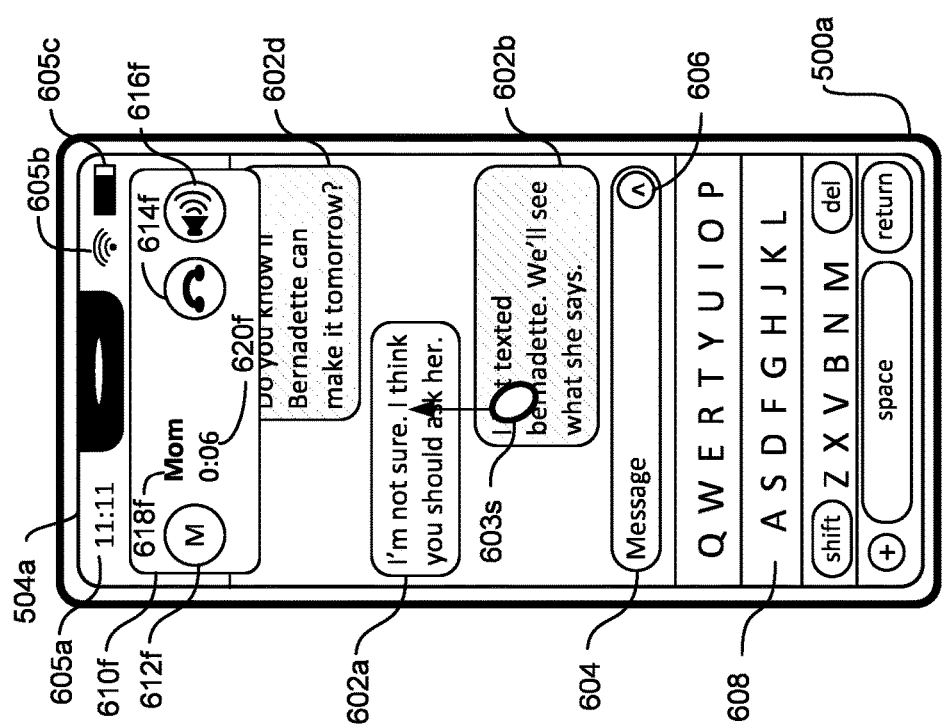
FIG. 6T
FIG. 6S

USER INTERFACES FOR PRESENTING INDICATIONS OF INCOMING CALLS

CROSS-REFERENCE TO RELATED APPLICATIONS

This application is a continuation of U.S. application Ser. No. 17/352,122, filed Jun. 18, 2021, and published on Dec. 23, 2021 as U.S. Publication No. 2021-0400131, which claims the benefit of U.S. Provisional Application No. 63/041,776, filed Jun. 19, 2020, and U.S. Provisional Application No. 63/131,094, filed Dec. 28, 2020, the entire disclosures of which are incorporated herein by reference in their entireties for all purposes.

FIELD OF THE DISCLOSURE

This specification relates generally to electronic devices that display user interfaces in response to receiving an indication of an incoming call (e.g., phone call, video call, etc.), and user interactions with such devices.

BACKGROUND

User interaction with electronic devices has increased significantly in recent years. These devices can be devices such as computers, tablet computers, televisions, multimedia devices, mobile devices, and the like. In some circumstances, users wish to make and receive calls (e.g., phone calls, voice calls, video calls, etc.) using electronic devices. An electronic device can present a user interface indicating an incoming call in response to receiving an indication of the incoming call.

SUMMARY

Some embodiments described in this disclosure are directed to ways of displaying a user interface that indicates an incoming call in response to an indication of an incoming call received at the electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
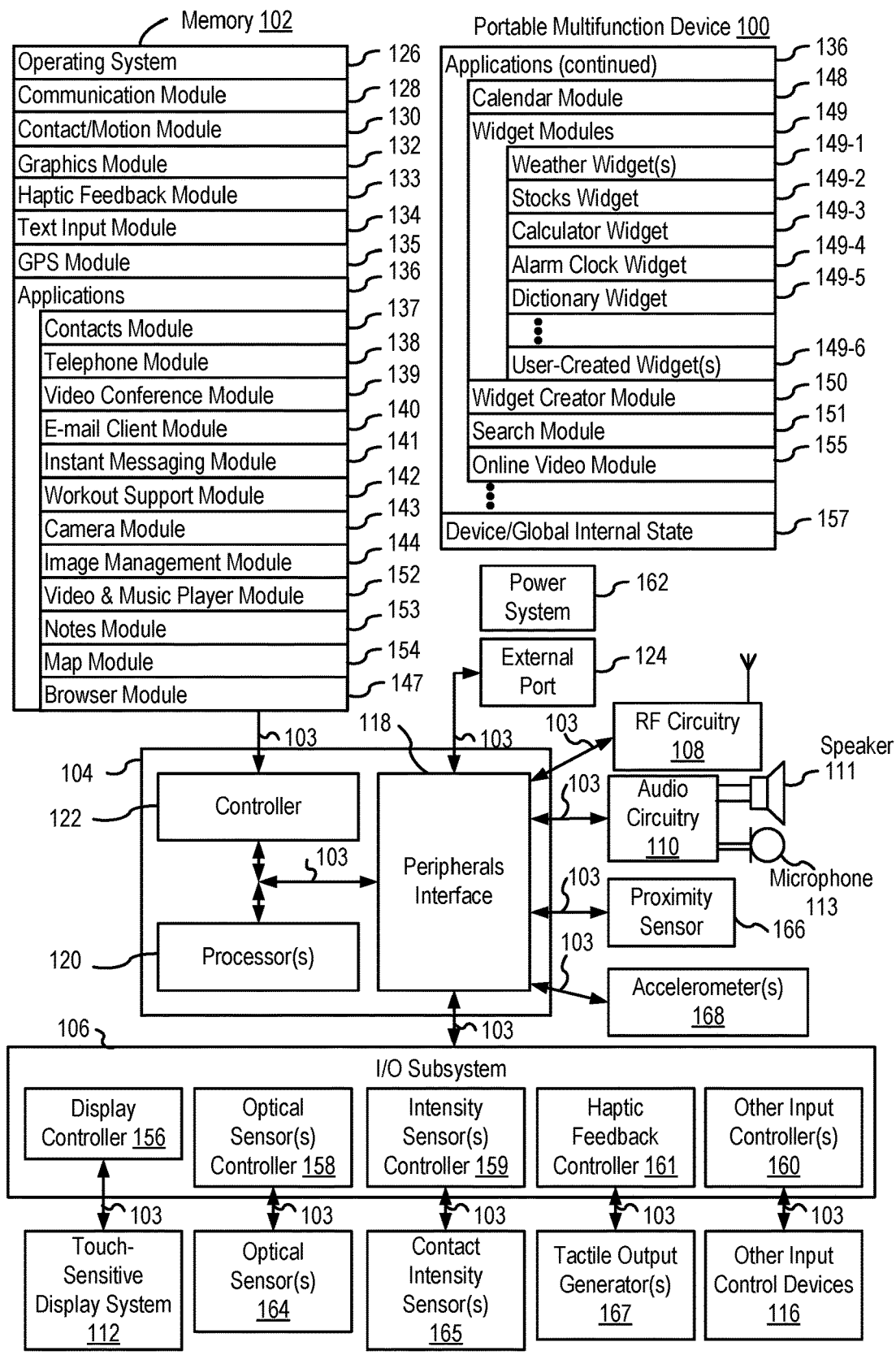
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device presents a user interface in response to receiving an indication of an incoming call (e.g., a phone call, an internet-based voice call, a video call, etc.). Such techniques can reduce the cognitive burden on a user who uses an example electronic device and provide an indication of the contact or user account from which the call was made while, in some embodiments, continuing to display a respective user interface of another application. Further, these techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
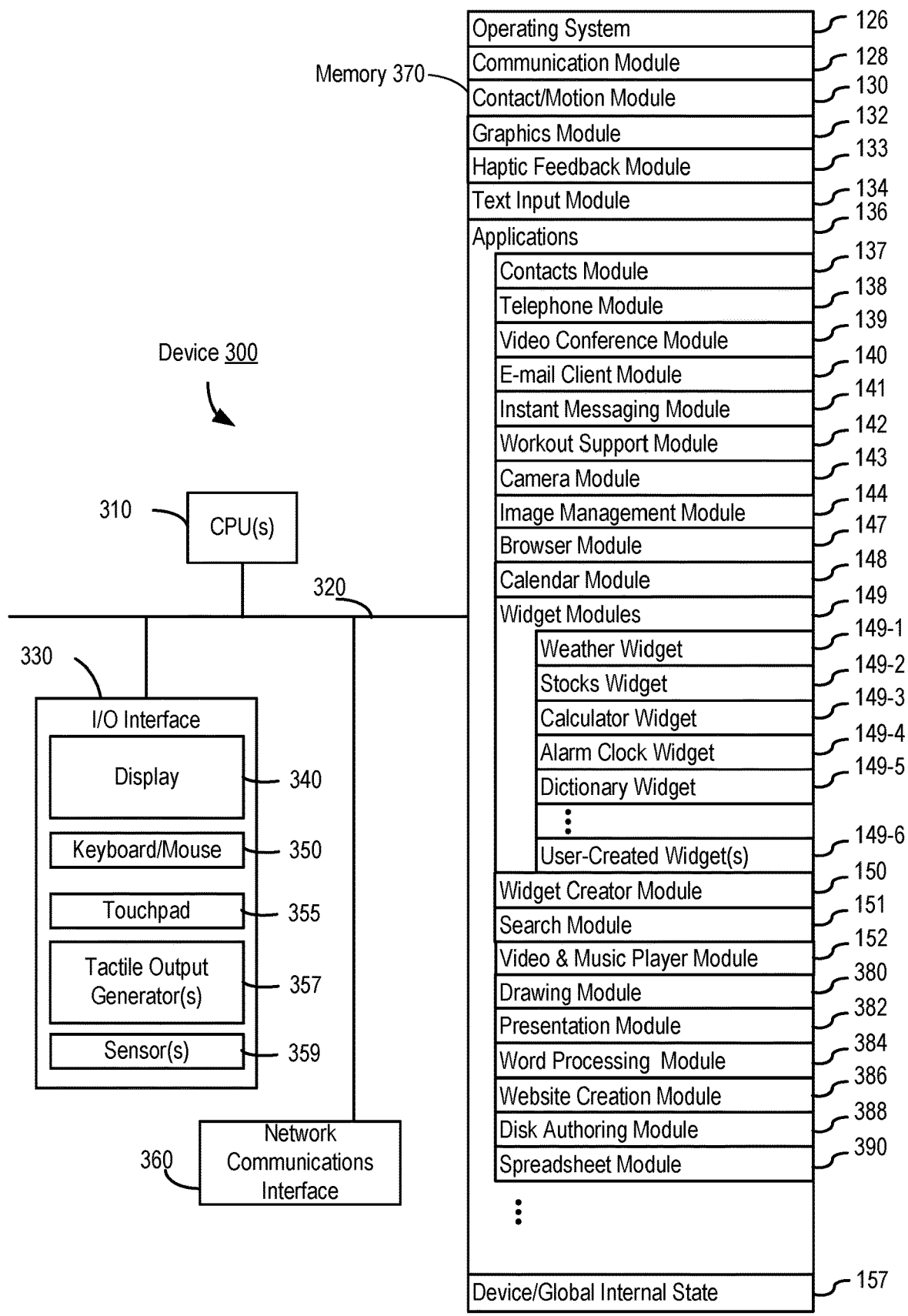
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
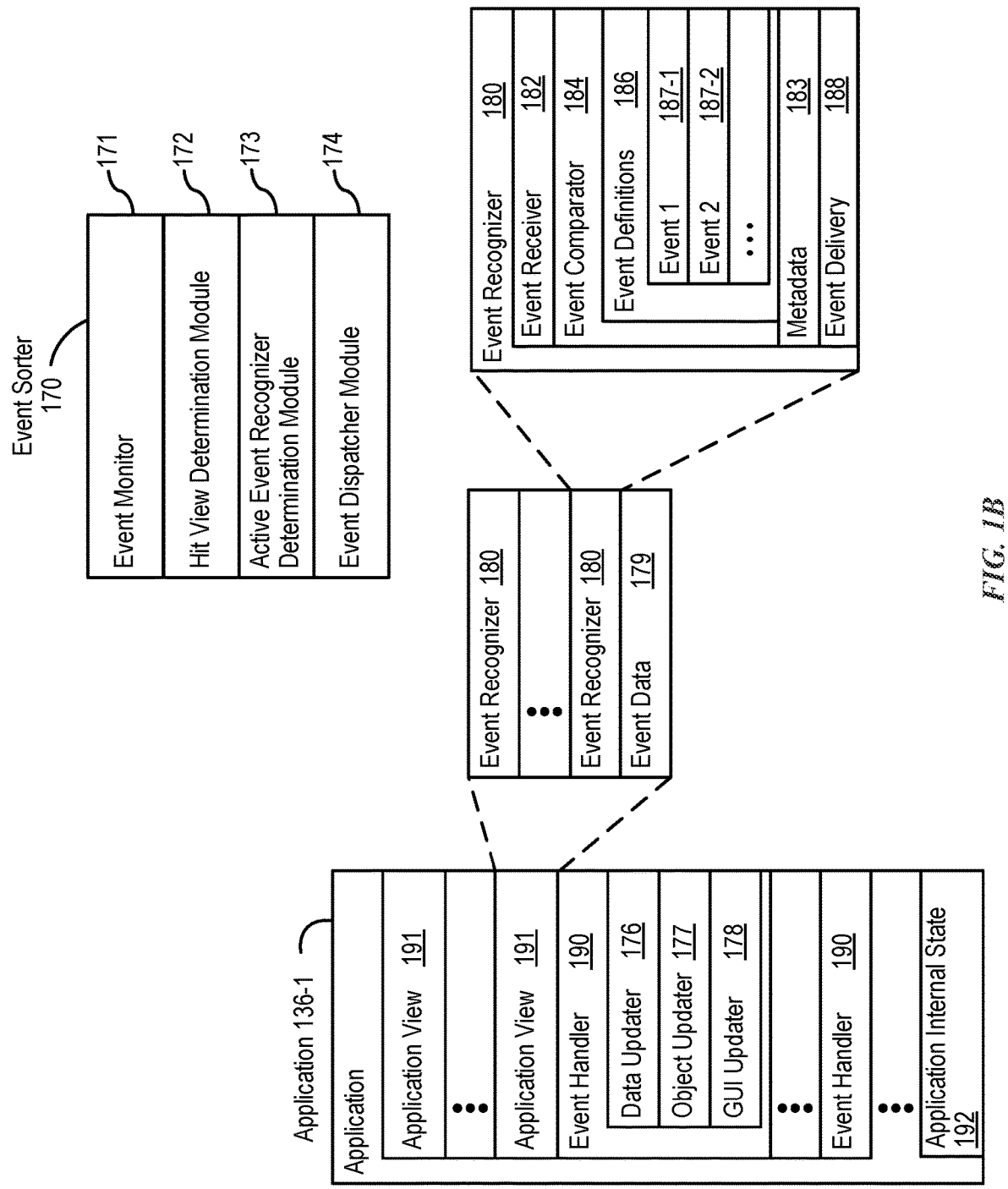
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
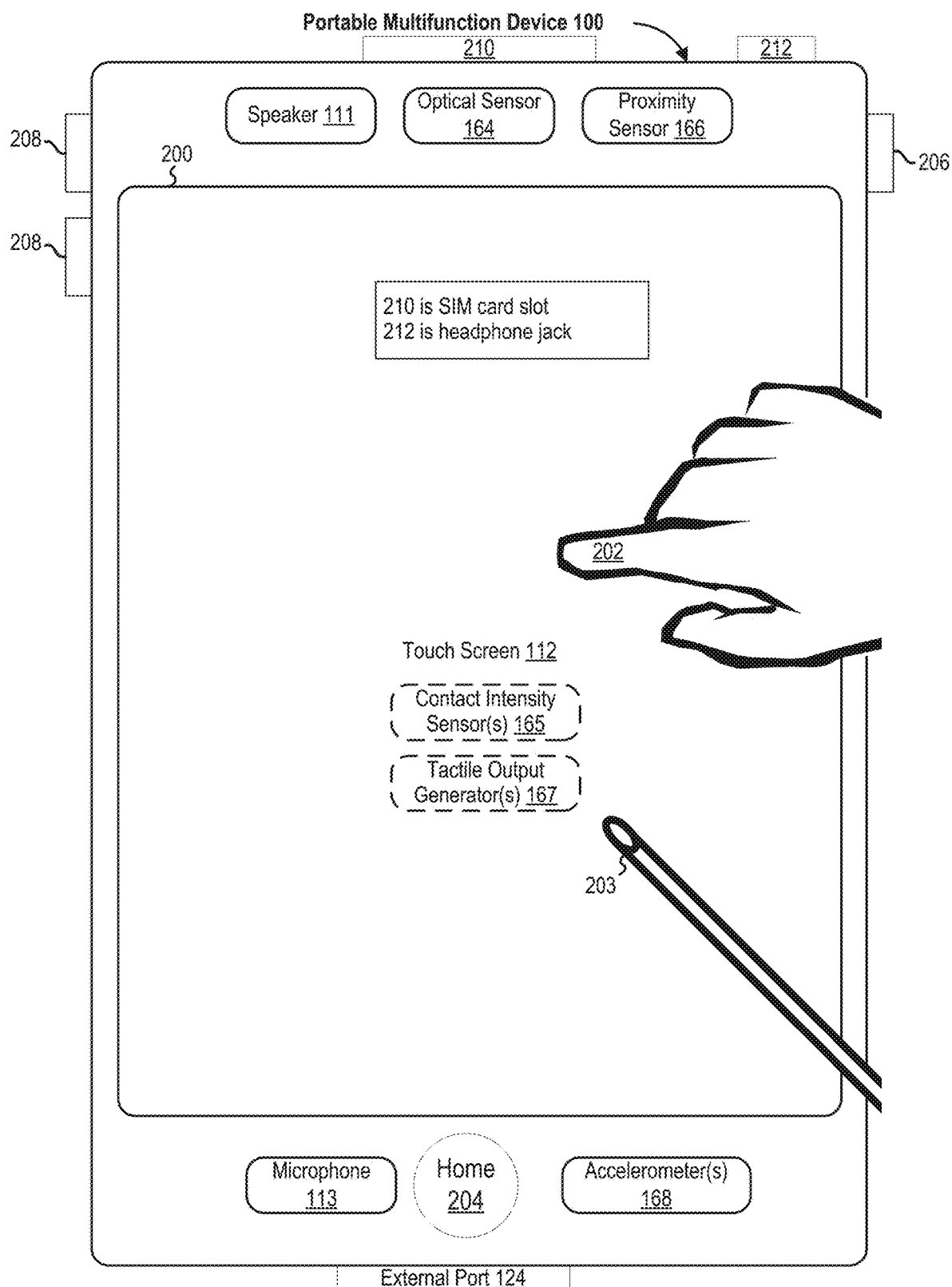
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
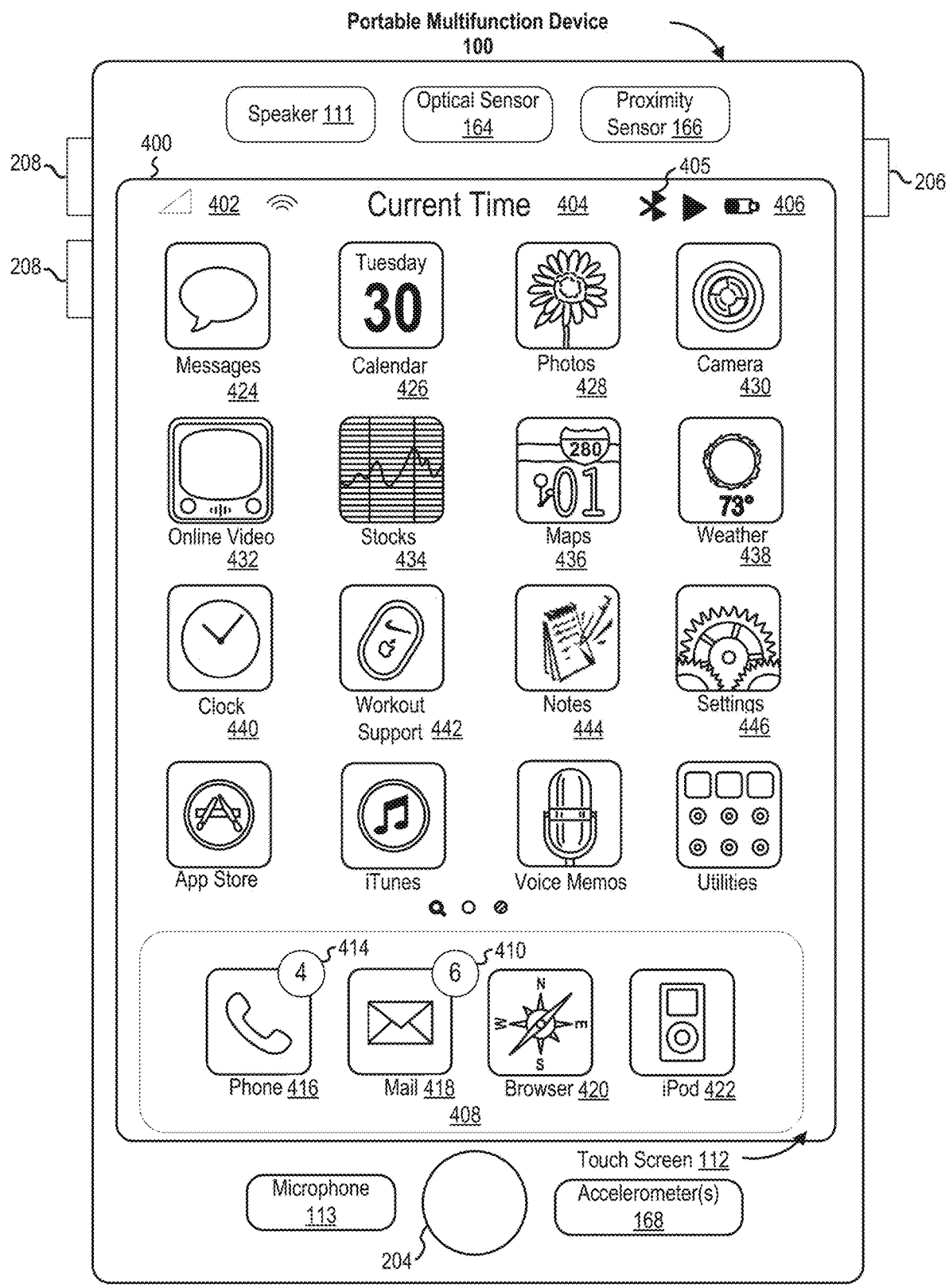
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
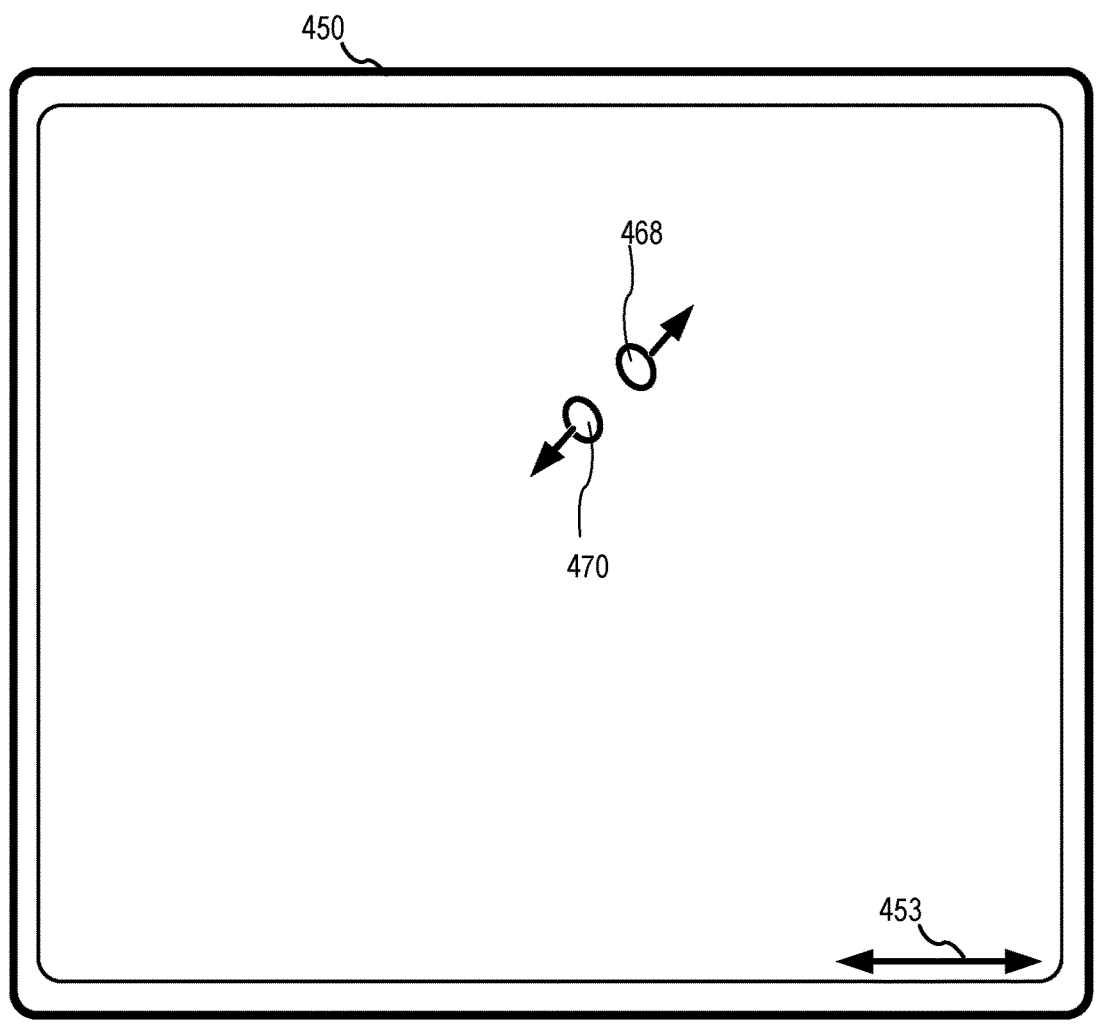
FIG. 4B illustrates an exemplary user interface for a multifunction device with a touch-sensitive surface that is separate from the display in accordance with some embodiments.
Figure 4B:
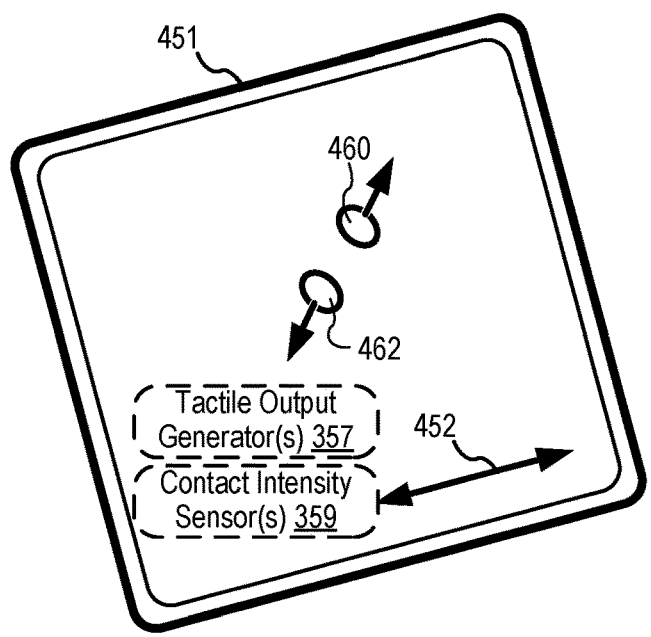

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
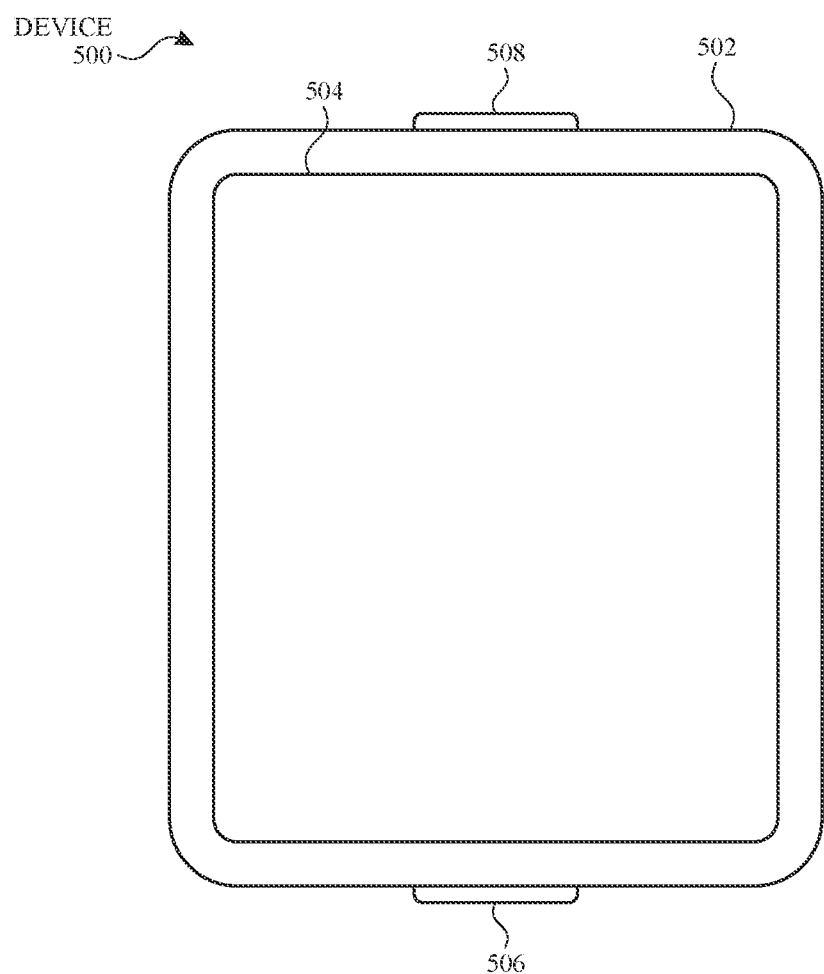
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
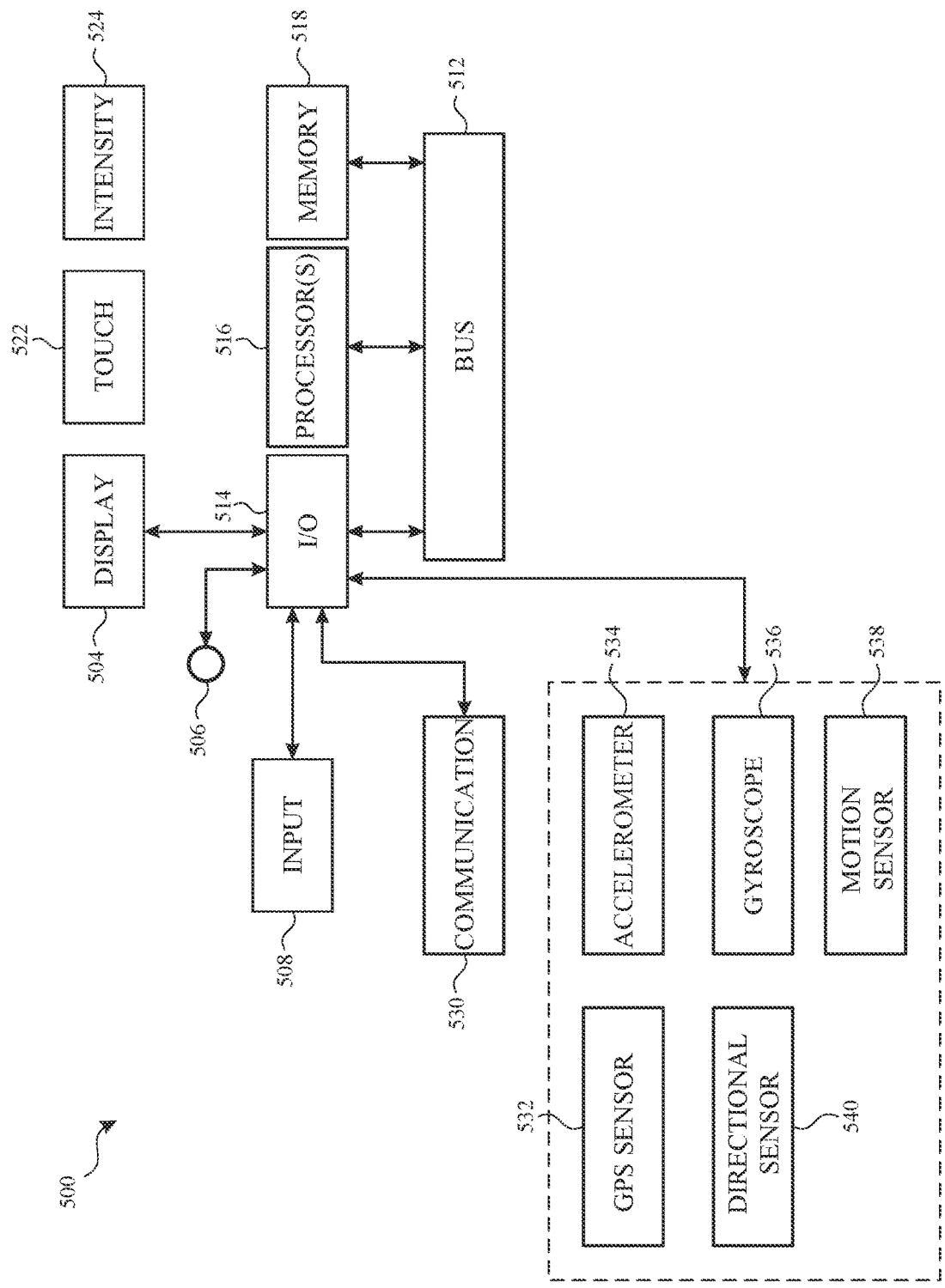
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
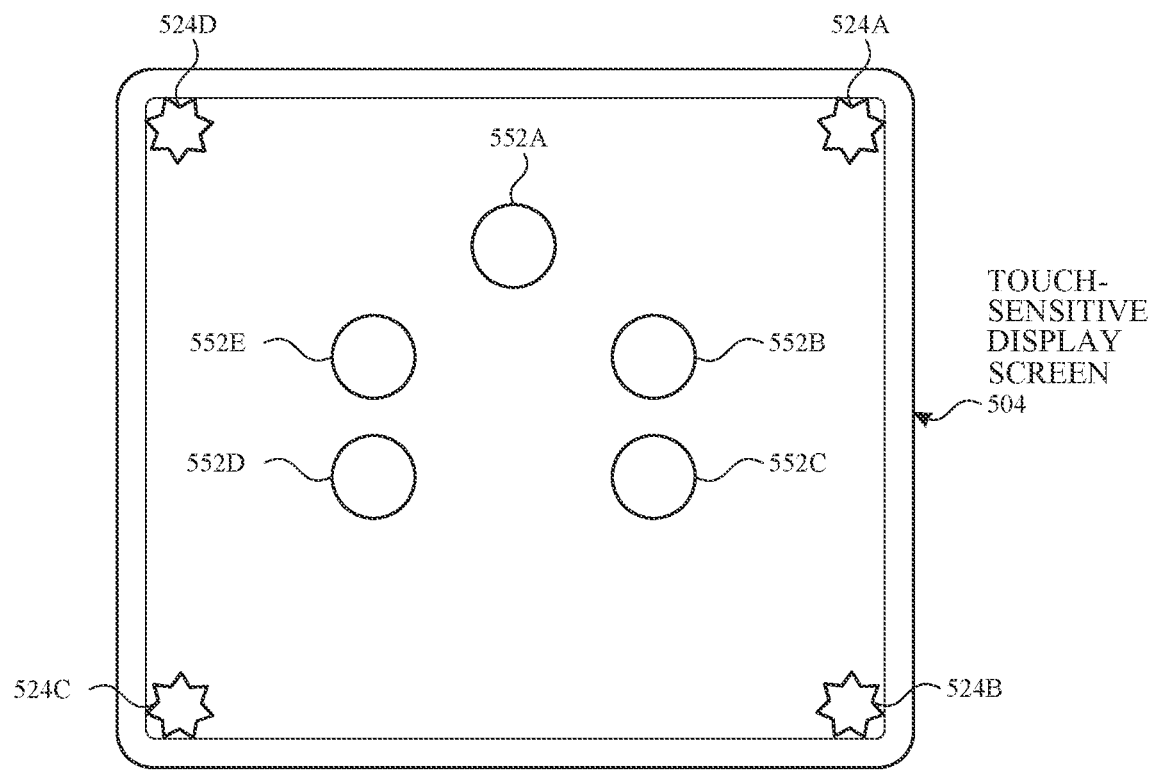
FIGS. 5C-5D illustrate exemplary components of a personal electronic device having a touch-sensitive display and intensity sensors in accordance with some embodiments.
Figure 5C:
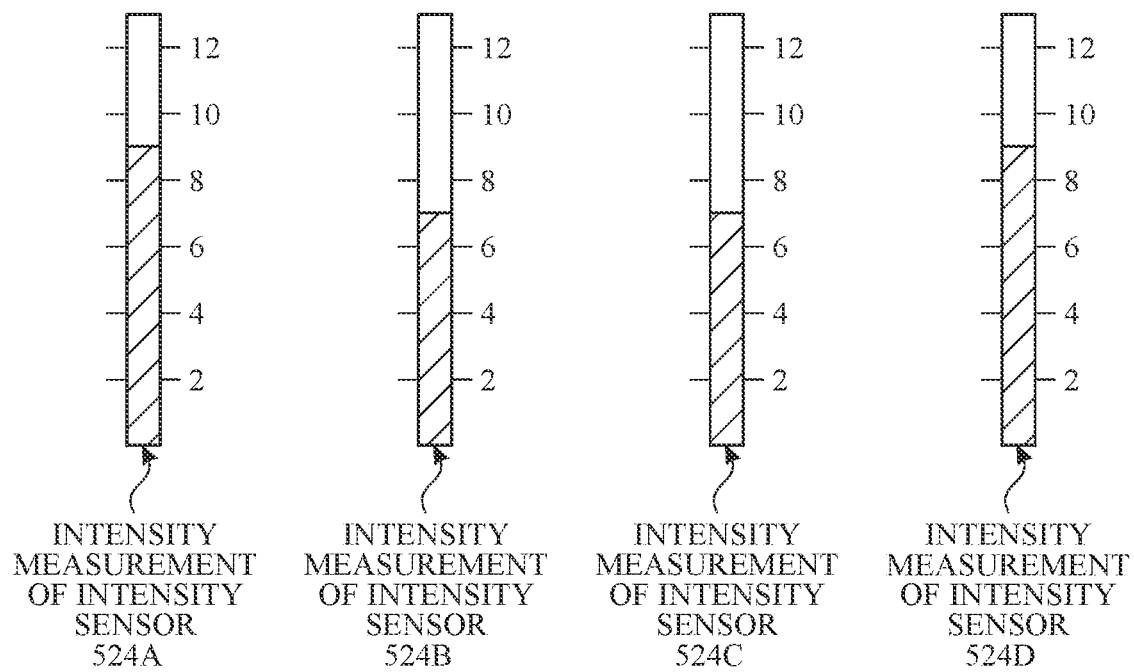
Figure 5D:
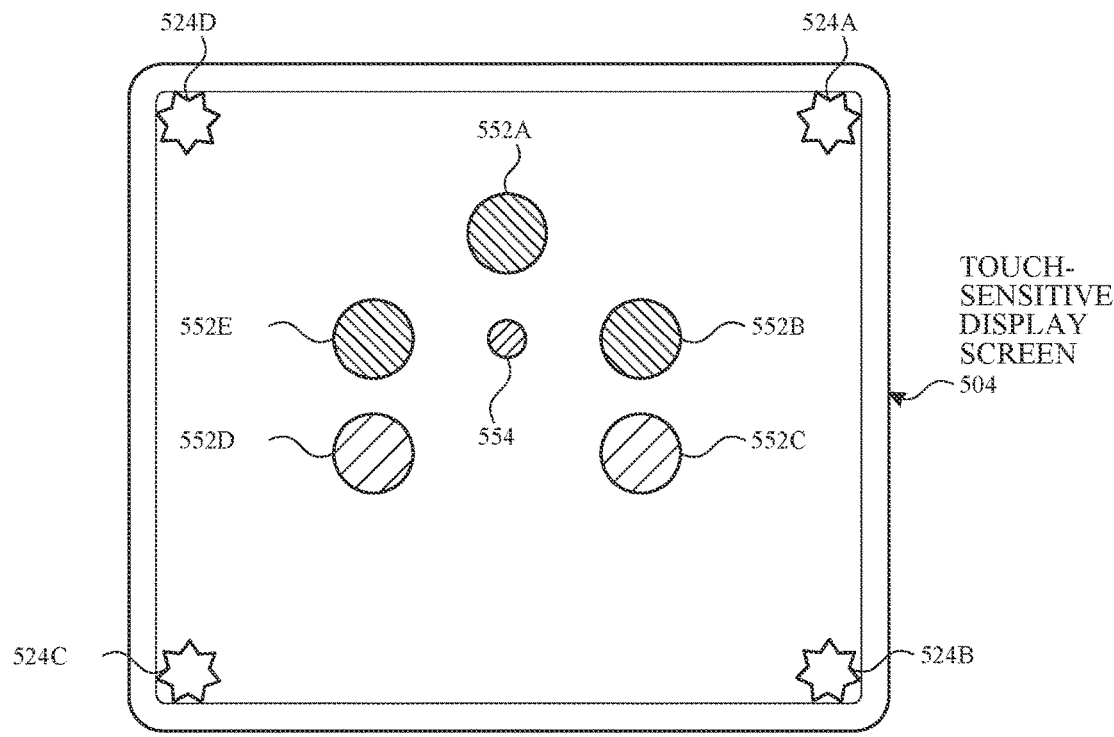
Figure 5D:
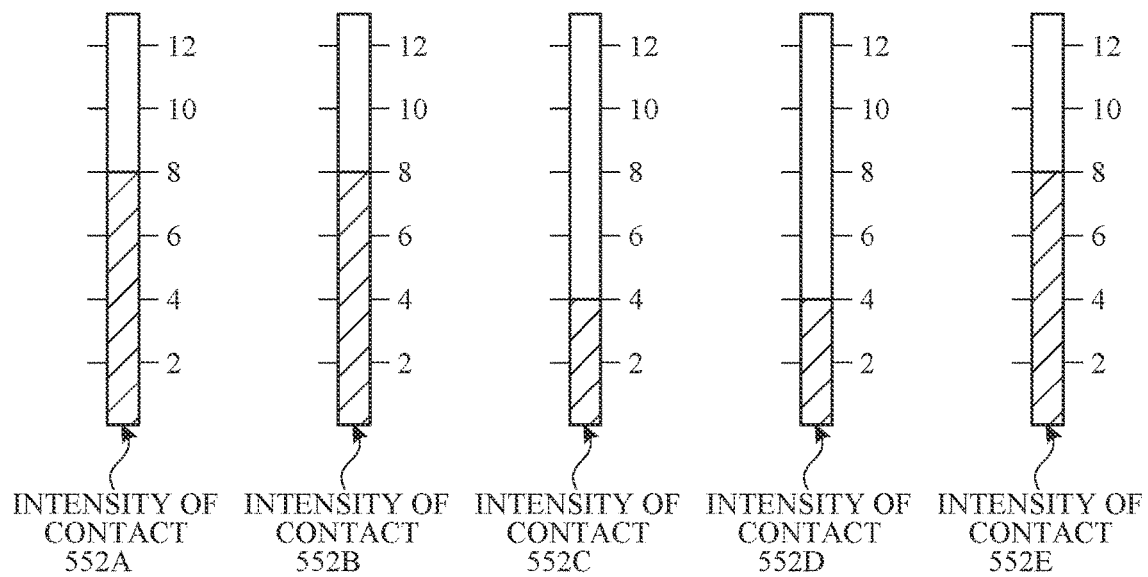

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A·(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
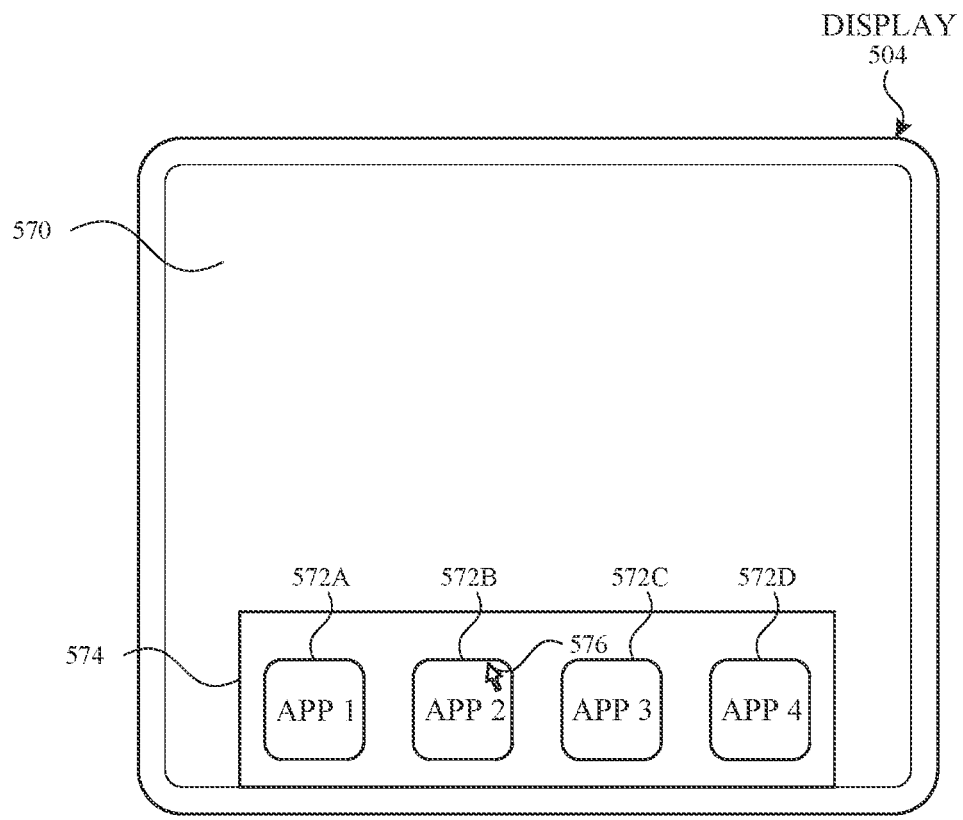
FIGS. 5E-5H illustrate exemplary components and user interfaces of a personal electronic device in accordance with some embodiments.
Figure 5E:
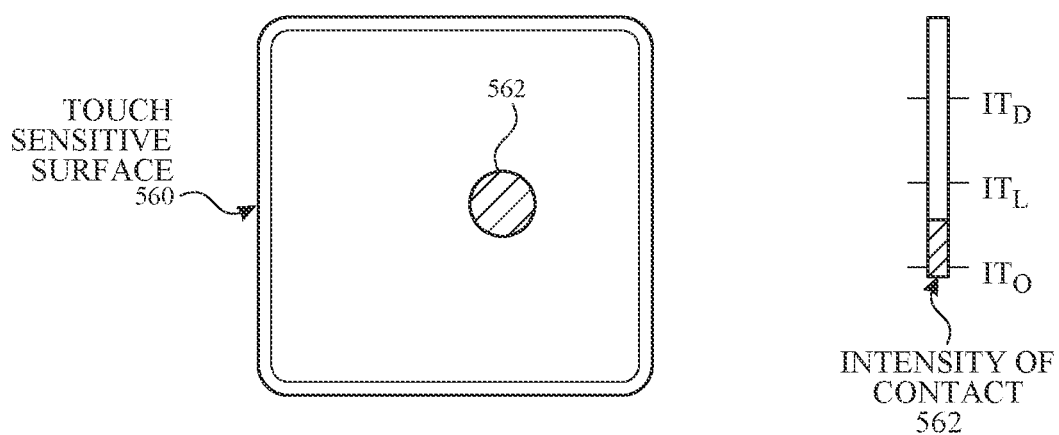
Figure 5F:
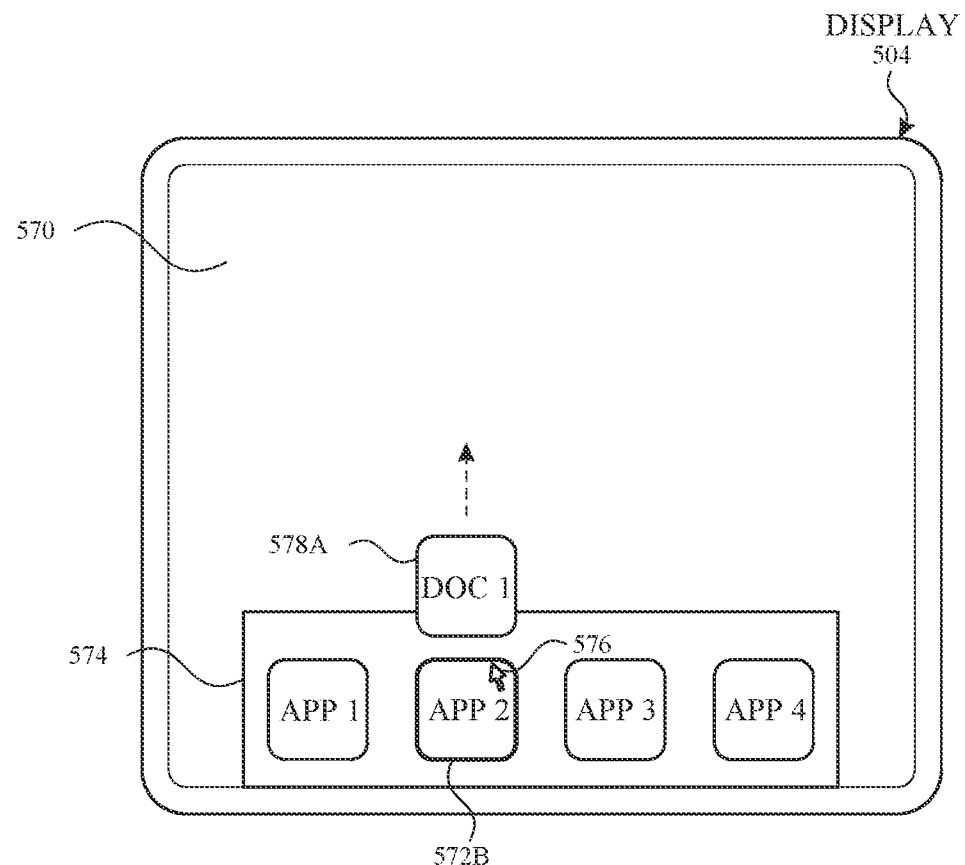
Figure 5F:
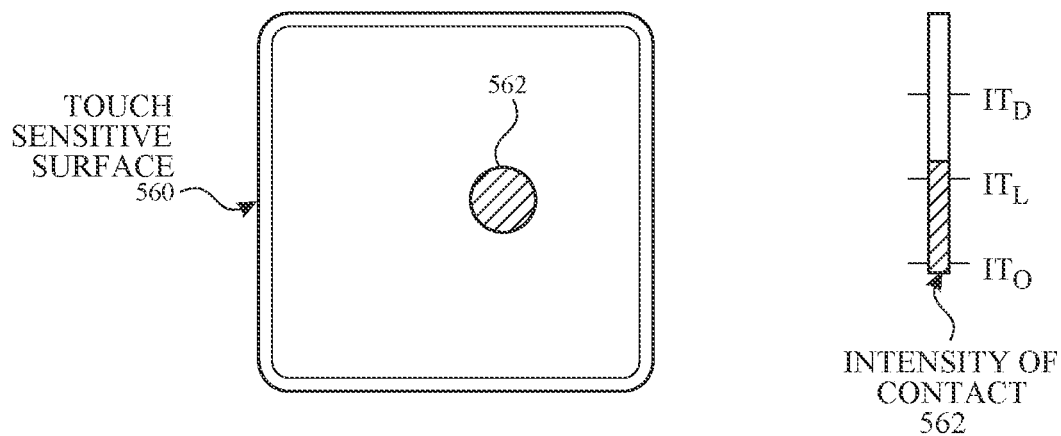
Figure 5G:
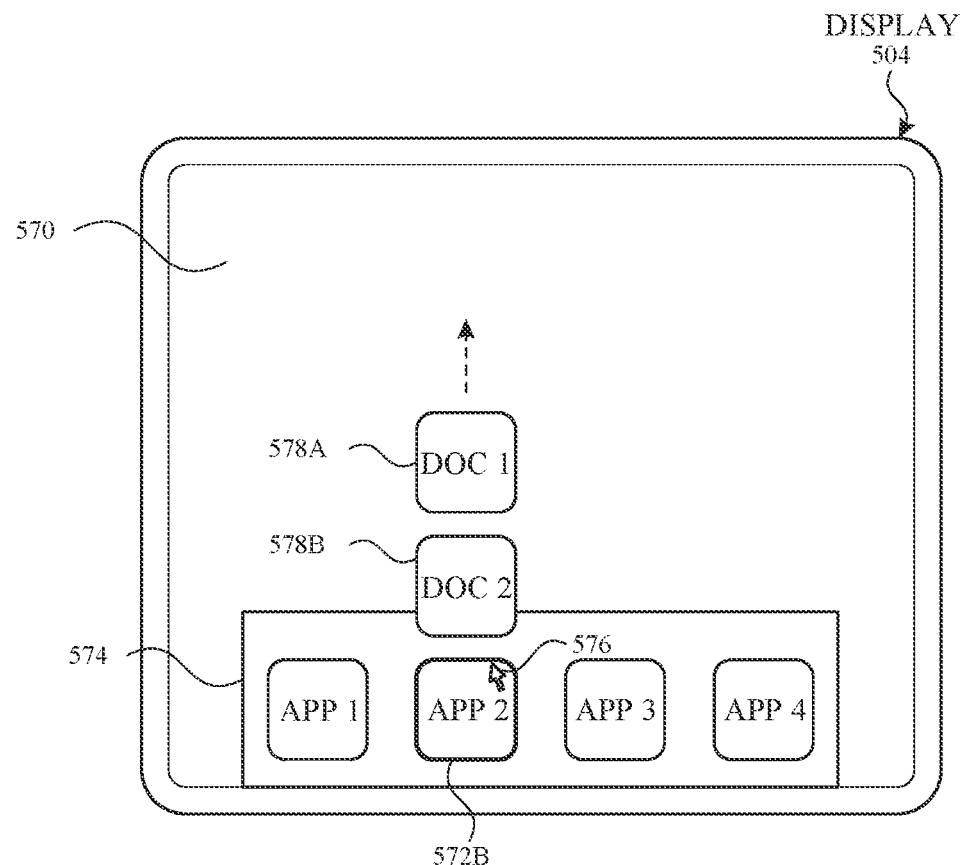
Figure 5G:
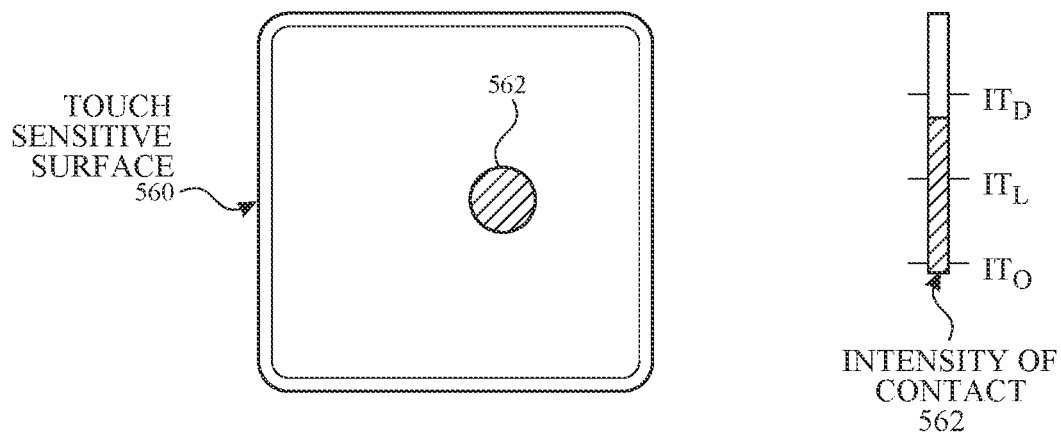
Figure 5H:
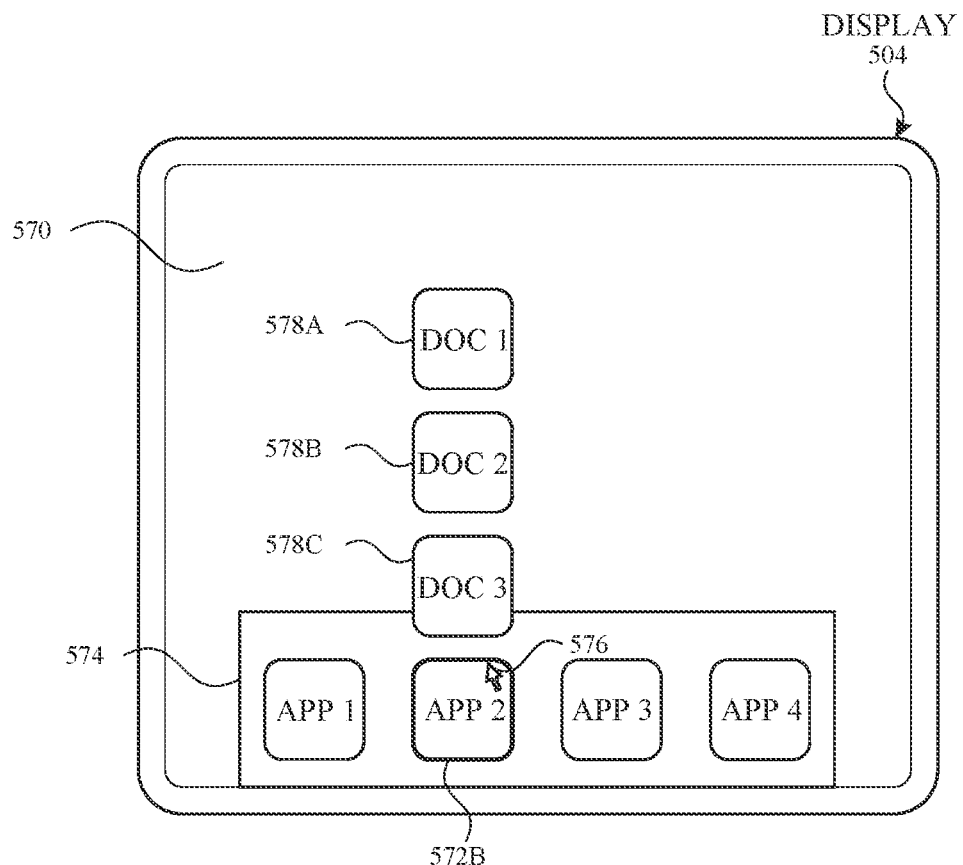
Figure 5H:
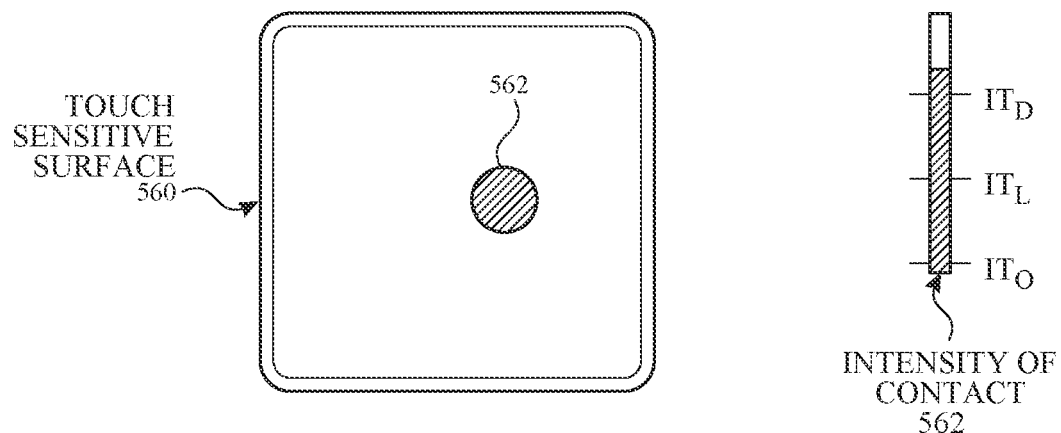

FIGS. 5E-5H illustrate detection of a gesture that includes a press input that corresponds to an increase in intensity of a contact 562 from an intensity below a light press intensity threshold (e.g., "IT L") in FIG. 5E, to an intensity above a deep press intensity threshold (e.g., "IT D") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT D"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
  an active application, which is currently displayed on a display screen of the device that the application is being used on;
  a background application (or background processes), which is not currently displayed, but one or more processes for the application are being processed by one or more processors; and
  a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

User Interfaces and Associated Processes

Incoming Call User Interfaces

Users interact with electronic devices in many different manners, including using electronic devices to make and receive calls (e.g., phone calls, internet-based voice calls, video calls, etc.). The embodiments described below provide ways in which an electronic device displays user interfaces in response to receiving an indication of an incoming call. Displaying an incoming call user interface enhances interactions with a device, thus reducing the amount of time a user needs to interact with the electronic device while the incoming call is being received and reducing the power usage of the device, which increases battery life for battery-powered devices. It is understood that people use devices. When a person uses a device, that person is optionally referred to as a user of the device.

FIGS. 6A-6GG illustrate exemplary ways in which an electronic device displays a user interface in response to an indication of an incoming call in accordance with some embodiments. The embodiments in these figures are used to illustrate the processes described below, including the processes described with reference to FIGS. 7A-7K. Although FIGS. 6A-6GG illustrate various examples of ways an electronic device is able to perform the processes described below with reference to FIGS. 7A-7K, it should be understood that these examples are not meant to be limiting, and the electronic device is able to perform one or more processes described below with reference to FIGS. 7A-7K in ways not expressly described below with reference to FIGS. 6A-6GG.

Some of the user interfaces illustrated herein (e.g., in FIGS. 6A-6F and 6O-6GG) are shown as being presented on a first electronic device 500*a*, which may be a media player, smartphone, etc. Some of the user interface illustrated herein (e.g., in FIGS. 6G-6N) are shown as being presented on a second electronic device 500*b*, which may be a tablet. It should be understood that, in some embodiments, any of the user interfaces illustrated in FIGS. 6A-6GG are displayed on any electronic device, such as a media player, smartphone, tablet, computer (e.g., laptop or desktop computer), wearable device (e.g., smart watch), or another electronic device not expressly listed here.

Figure 6B:
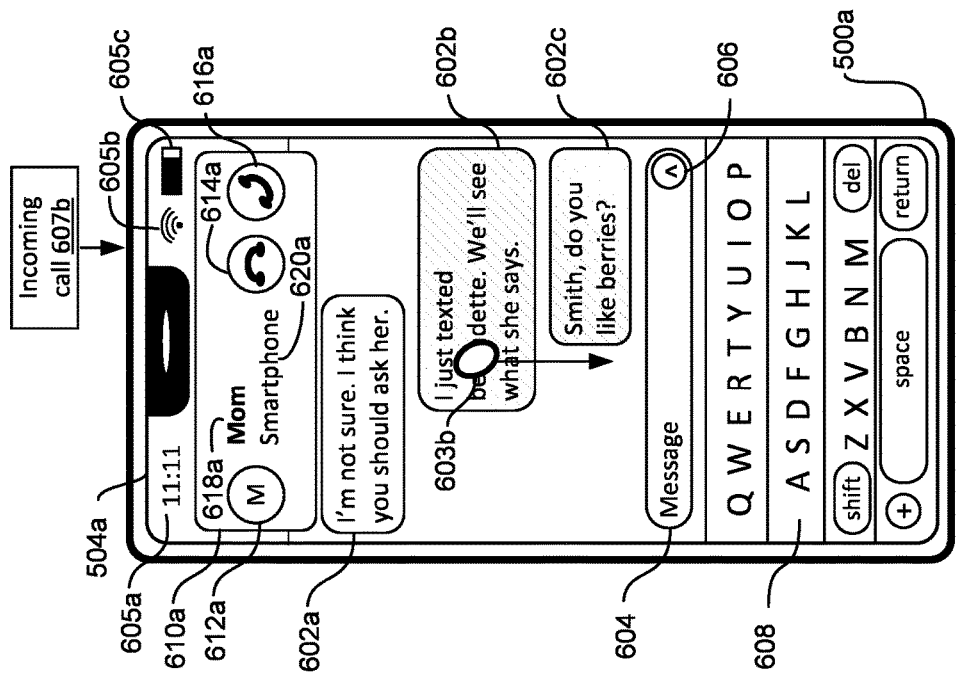
FIGS. 6A-6GG illustrate exemplary ways in which an electronic device displays a user interface in response to an indication of an incoming call in accordance with some embodiments.
Figure 6A:
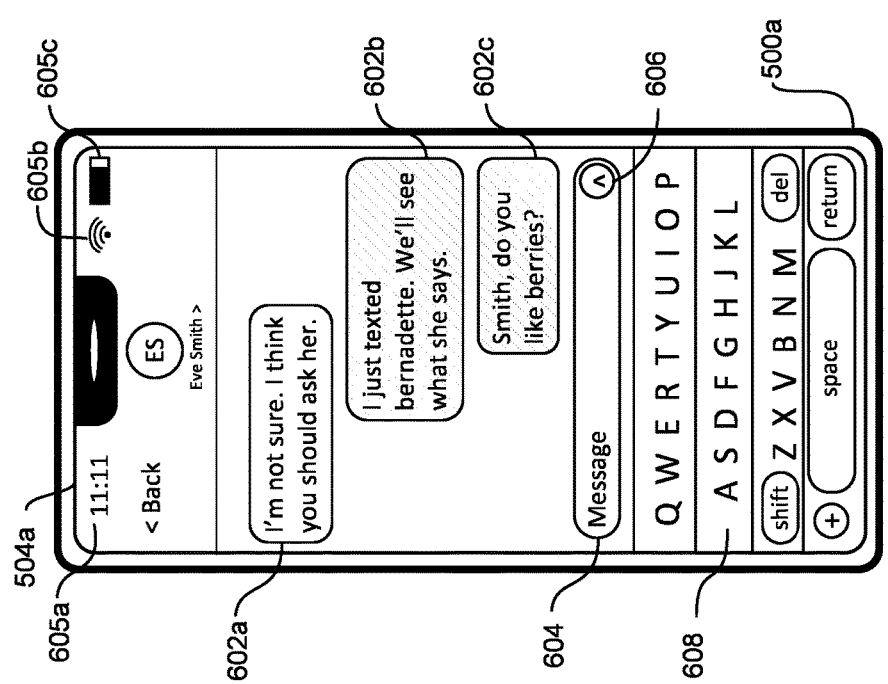

In some embodiments, in response to receiving an indication of an incoming call, the electronic device 500*a* displays an incoming call user interface overlaid on another user interface displayed by the electronic device 500*a*. FIGS. 6A-6B illustrate an example of the electronic device 500*a* receiving an incoming call while displaying a messaging user interface and, in response to the indication of the incoming call, displaying the incoming call user interface overlaid on the messaging user interface. It should be appreciated that the electronic device 500*a* is able to display the incoming call user interface overlaid on user interfaces other than messaging user interfaces, such as system user interfaces of the electronic device 500*a* and/or user interfaces associated with applications other than the messaging application.

FIG. 6A illustrates the electronic device 500*a* displaying an exemplary messaging user interface. The messaging user interface illustrated in FIG. 6A includes representations 602*a-c* of messages in the messaging conversation, including a representation 602*a* of a message from a user other than the user of the electronic device 500*a* and representations 602*b* and 602*c* of messages from the user of the electronic device 500*a*. The messaging user interface further includes a text entry field 604 toward which one or more inputs for composing a message are directed, an option 606 to send a message (e.g., to send content entered into text entry field 604 as a message to the messaging conversation), and a soft keyboard 608 which is optionally one of one or more ways of entering content into text entry field 604. The electronic device 500*a* also displays an indication 605*a* of the current time, an indication 605*b* of a network connection (e.g., a wireless network connection, such as a Wi-Fi connection) of the electronic device 500*a*, and an indication 605*c* of the current battery life of the electronic device 500*a*. In some embodiments, the electronic device 500*a* displays the indications 605*a-c* while displaying user interfaces other than the messaging user interface.

In FIG. 6B, the electronic device 500*a* detects an indication 607*b* of an incoming call. The incoming call is optionally a phone call, though, in some embodiments, the incoming call is an internet-based voice call, a video call, or another form of real-time communication. As shown in FIG. 6B, in response to detecting the indication 607*b* of the incoming call, the electronic device 500*a* displays an incoming call user interface 610*a* overlaid on the messaging user interface. The incoming call user interface 610*a* includes an indication 618*a* of the user from which the call was received, an indication 620*a* of the device or service from which the call was received, an image 612*a* associated with the user from which the call was received, a selectable option 614*a* that, when selected, causes the electronic device 500*a* to decline the call, and a selectable option 616*a* that, when selected, causes the electronic device 500*a* to accept the call.

In some embodiments, the indication 618*a* of the user from which the call is received, the indication 620*a* of the device or service from which the call was received, and the image 612*a* associated with the user from which the call is received include data included in a contact card of the user from which the call is received. For example, the electronic device 500*a* detects a phone number from which the incoming call is received and matches it to the phone number stored as the "smartphone" associated with the contact "Mom" and displays the name 618*a* of the contact, the device 620*a* from which the call was received, and the image 612*a* associated with the contact card in the incoming call user interface 610*a*. In some embodiments, if the incoming call is received from a user account that is not a contact of the electronic device 500*a*, instead of displaying the name 618*a* of the contact, the electronic device 500*a* displays an indication of the user account (e.g., the phone number from which the call was received, the username from which an internet-based phone call or video call is received) from which the call was received, displays a generic image instead of an image 612*a* associated with the user account, and/or displays an indication of the service through which the call was received instead of displaying the indication 620*a* of the device from which the call was received.

In some embodiments, while the indication 607*b* of the incoming call is detected, the electronic device 500*a* continues to display the incoming call user interface 610*a* when a user input directed to a user interface other than the incoming call user interface 610*a* is received and performs an action corresponding to the input in response to the input. As shown in FIG. 6B, the user swipes (e.g., with contact 603*b*) the messaging user interface to scroll the messaging user interface. As shown in FIG. 6C, in response to the user input illustrated in FIG. 6B, the electronic device 500*a* scrolls the messaging user interface while continuing to display the incoming call user interface 610*a*. Thus, FIGS. 6B-6C illustrate an example of the electronic device 500*a* performing an action in response to a user input while continuing to display the incoming call user interface 610*a*. In some embodiments, the user input is a user input to show or hide a user interface other than the incoming call user interface 610*a*. For example, if the electronic device 500*a* were to detect a user input corresponding to a request to cease displaying the messaging user interface, the electronic device 500*a* would, in response to the input, cease displaying the messaging user interface while continuing to display the incoming call user interface 610*a*. As another example, in response to an input corresponding to a request to display a user interface of a respective application other than the messaging application (e.g., selection of an icon corresponding to a respective application displayed in a home screen user interface), the electronic device 500*a* would display the user interface of the respective application and continue to display the incoming call user interface 610*a*.

In some embodiments, the electronic device 500*a* displays an expanded call user interface in response to an input directed to the incoming call user interface 610*a*. As shown in FIG. 6C, the user selects (e.g., with contact 603*c*) the incoming call user interface 610*a* and moves the contact 603*c* down. In response to the input illustrated in FIG. 6C, the electronic device 500*a* displays the expanded incoming call user interface illustrated in FIG. 6D, 6E, or 6F.

Figure 6D:
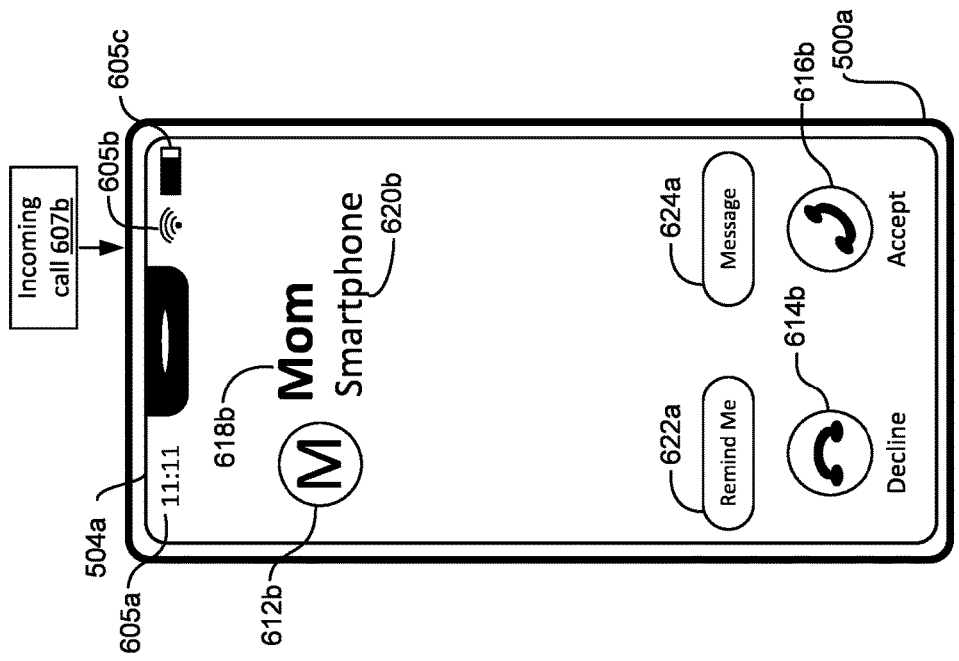
Figure 6C:
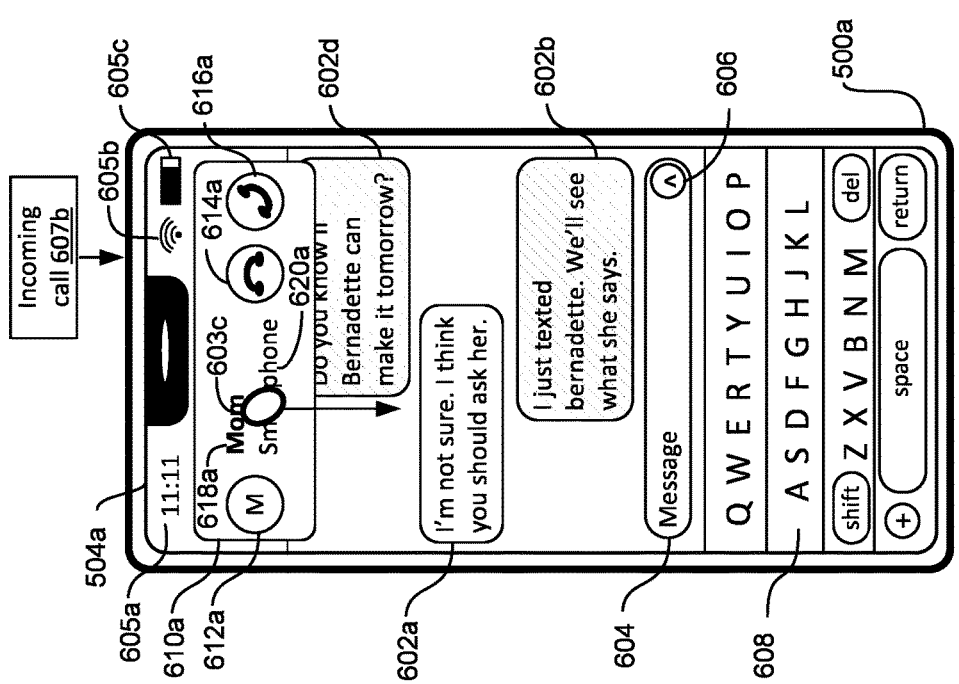

FIG. 6D illustrates an exemplary incoming call user interface. The expanded incoming call user interface is displayed in response to the user input illustrated in FIG. 6C. As shown in FIG. 6D, the expanded incoming call user interface includes the name 618*b* of the contact from which the incoming call is received, an indication 620*b* of the electronic device 500 from which the call is received, an image 612*b* associated with the contact from which the call is received, an option 622*a* to set a reminder to call the user back, an option 624*a* to initiate a process to send a message to the user, an option 614*b* to reject the incoming call, and an option 616*b* to accept the incoming call. Thus, the expanded incoming call user interface includes options 622*a* and 624*a* that were not included in the incoming call user interface illustrated in FIGS. 6B and 6C. As shown in FIG. 6D, the expanded call user interface occupies the area of display 504*a* in which the messaging user interface was previously displayed in FIG. 6C.

Figure 6F:
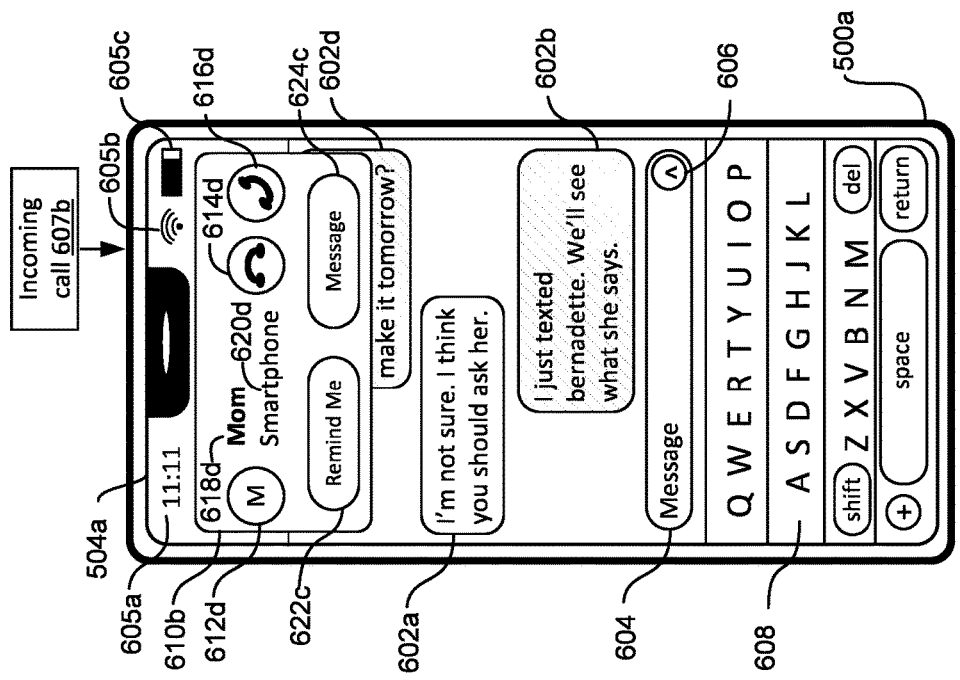
Figure 6E:
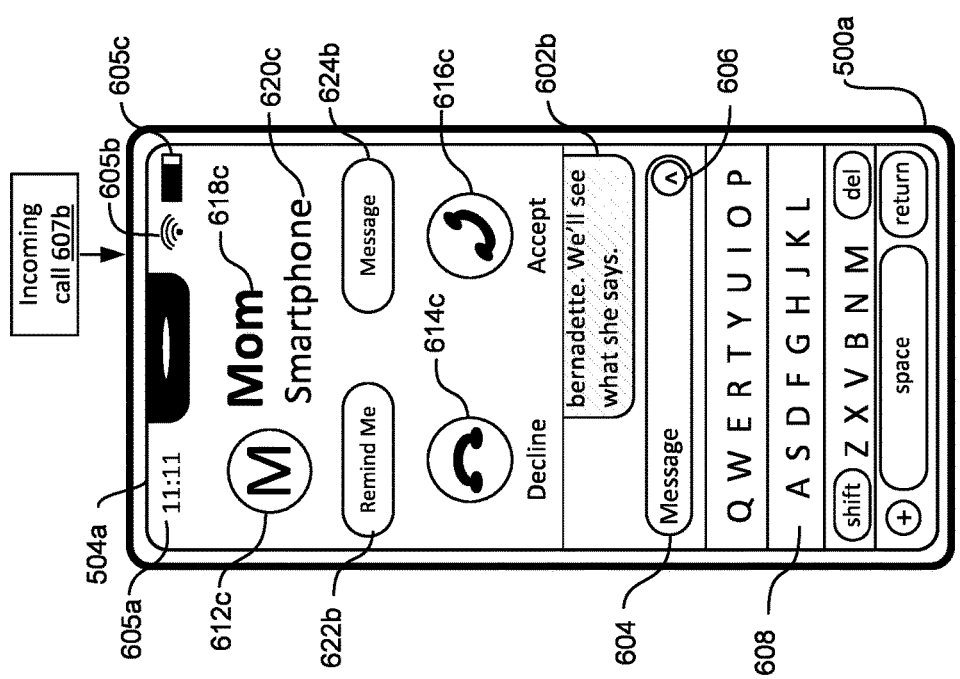

FIG. 6E illustrates another exemplary expanded incoming call user interface. The expanded incoming call user interface is displayed in response to the user input illustrated in FIG. 6C. As shown in FIG. 6E, the expanded incoming call user interface includes the name 618*c* of the contact from which the incoming call is received, an indication 620*c* of the electronic device 500 from which the call is received, an image 612*c* associated with the contact from which the call is received, an option 622*c* to set a reminder to call the user back, an option 624*c* to initiate a process to send a message to the user, an option 614*c* to reject the incoming call, and an option 616*c* to accept the incoming call. Thus, the expanded incoming call user interface includes options 622*c* and 624*c* that were not included in the incoming call user interface illustrated in FIGS. 6B and 6C. As shown in FIG. 6E, the expanded call user interface is overlaid on a portion of the messaging user interface that is larger than the portion of the messaging user interface over which the incoming call user interface 610*a* illustrated in FIGS. 6B-6C was displayed.

FIG. 6F illustrates another exemplary expanded incoming call user interface. The expanded incoming call user interface is displayed in response to the user input illustrated in FIG. 6C. As shown in FIG. 6F, the expanded incoming call user interface includes the name 618*d* of the contact from which the incoming call is received, an indication 620*d* of the electronic device 500 from which the call is received, an image 612*d* associated with the contact from which the call is received, an option 622*d* to set a reminder to call the user back, an option 624*d* to initiate a process to send a message to the user, an option 614*d* to reject the incoming call, and an option 616*d* to accept the incoming call. Thus, the expanded incoming call user interface includes options 622*d* and 624*c* that were not included in the incoming call user interface illustrated in FIGS. 6B and 6C. As shown in FIG. 6F, the expanded call user interface is overlaid on a portion of the messaging user interface that is larger than the portion of the messaging user interface over which the incoming call user interface 610*a* illustrated in FIGS. 6B-6C was displayed.

In some embodiments, an electronic device 500*b* displays the user interface of a first application in a respective region of the display 504*b* area that is partially overlaid on the user interface of a second application. The electronic device 500*b* is able to display the incoming call user interface within the respective region of the display 504*b* area, as will now be described in more detail below with reference to FIGS. 6G-6N.

Figure 6H:
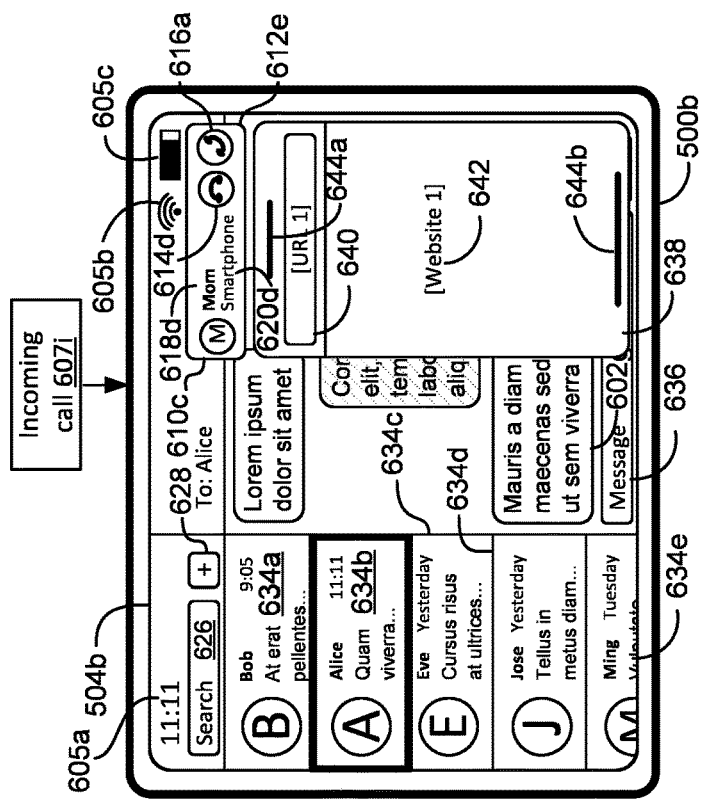
Figure 6G:
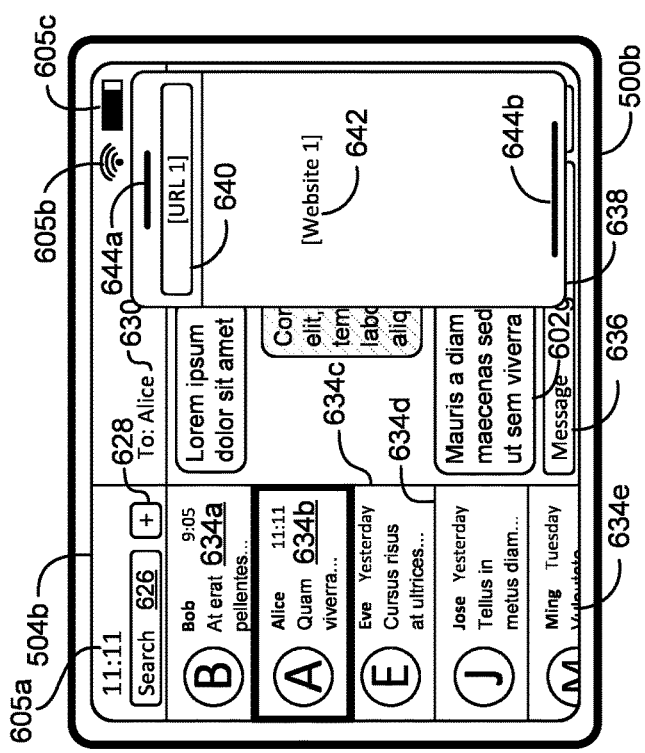

FIG. 6G illustrates the electronic device 500*b* displaying a web browsing user interface in a respective region 638 of the display 504*b* area overlaid on a messaging user interface. As shown in FIG. 6G, the web browsing user interface includes an address bar 640 and the content of a website 642. The respective region 638 includes a first user interface element 644*a* towards which an input to cease displaying the respective region 638 of the user interface is directed and a second user interface element 644*b* toward which an input to toggle the user interface displayed in respective region 638 is directed. The messaging user interface includes a search bar 626 toward which a user input searching the contents of messages is directed, an option 628 that, when selected, causes the electronic device 500*b* to initiate a process to compose a new message, representations 634*a*-*e* of messaging conversations, including a representation 634*b* of a messaging conversation that is currently displayed, a text entry field 636 toward which input to add contents to a message is directed, and a plurality of representations of messages including representation 602*g* included in the messaging conversation corresponding to representation 634*b*.

In FIG. 6H, the electronic device 500*b* detects an indication 607*i* of an incoming call. In response to detecting the indication 607*i*, the electronic device 500*b* displays an incoming call user interface 610*c* in the respective region 638 of the display 504*b* area. The incoming call user interface 610*c* can include elements similar to the elements of incoming call user interface 610*a* described above with reference to FIG. 6B. In some embodiments, the incoming call user interface 610*a* is displayed at the location illustrated in FIG. 6H even when the electronic device 500*b* is not displaying another user interface (e.g., the web browsing user interface) in the respective region 638 at the time at which the indication 607*i* of the incoming call is received.

Figure 6I:
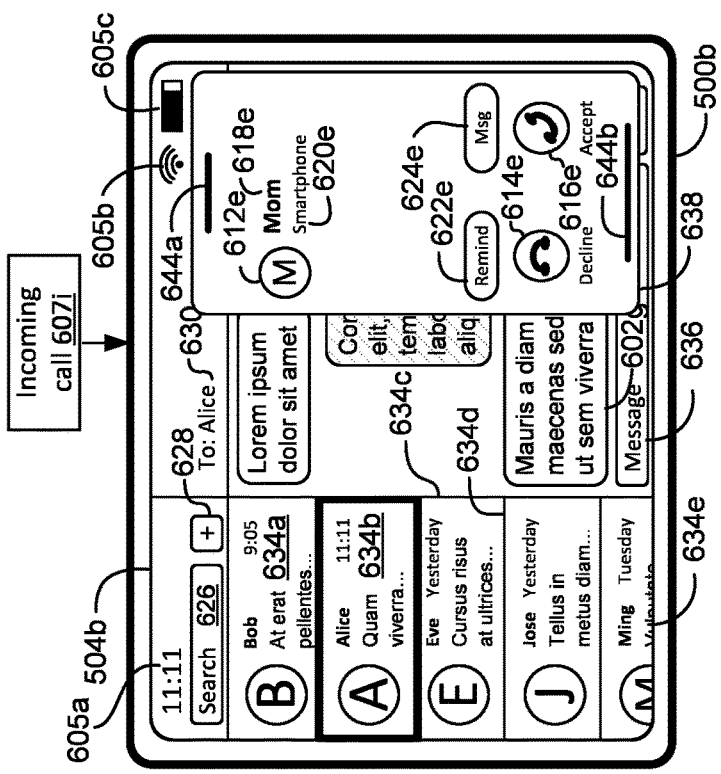
Figure 6J:
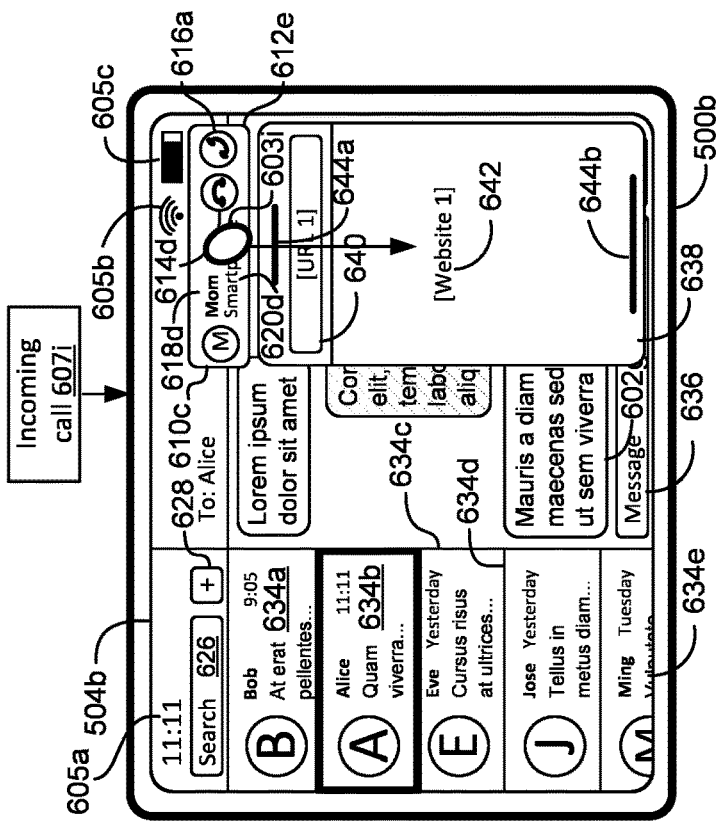

In FIG. 6I, the user selects (e.g., with contact 603*i*) the incoming call user interface 610*c* and moves contact 603*i* down in a manner similar to the manner in which the user interacts with the incoming call user interface 610*a* in FIG. 6C. As shown in FIG. 6J, in response to the input illustrated in FIG. 6I, the electronic device 500*b* ceases displaying the web browsing user interface in the respective region 638 of the display 504*b* area and displays an expanded incoming call user interface in the respective region 638 of the display 504*b* area.

FIG. 6J illustrates the electronic device 500*b* displaying the expanded incoming call user interface in the respective region 638 of the display 504*b* area. The expanded incoming call user interface is displayed in the respective region 638 of the display 504*b* area in response to the user input illustrated in FIG. 6I. As shown in FIG. 6J, the expanded incoming call user interface includes the name 618*e* of the contact from which the incoming call is received, an indication 620*e* of the electronic device 500 from which the call is received, an image 612*e* associated with the contact from which the call is received, an option 622*e* to set a reminder to call the user back, an option 624*e* to initiate a process to send a message to the user, an option 614*e* to reject the incoming call, and an option 616*e* to accept the incoming call. Thus, the expanded incoming call user interface includes options 622*e* and 624*e* that were not included in the incoming call user interface illustrated in FIGS. 6H and 6I.

Figure 6L:
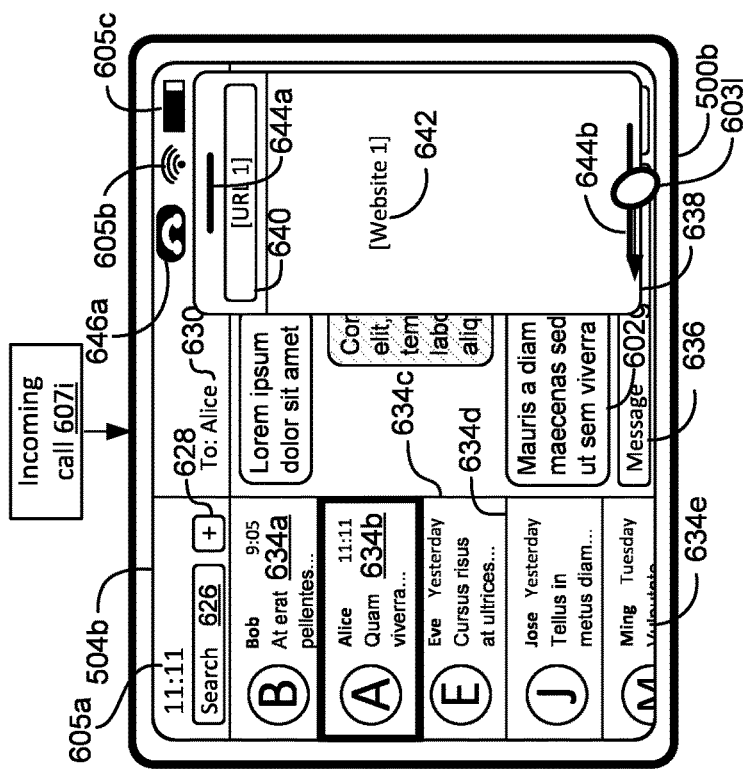
Figure 6K:
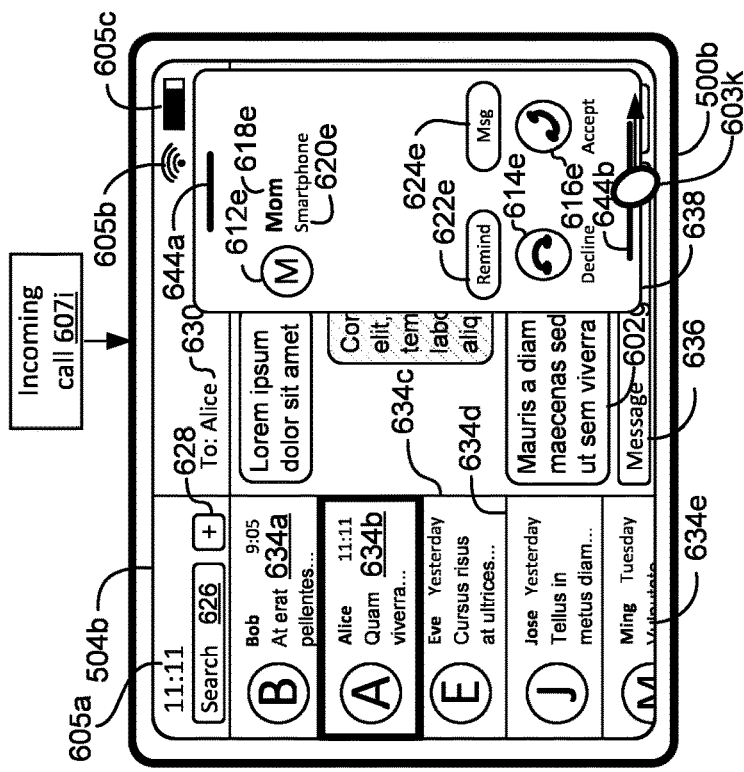

In FIG. 6K, the user selects (e.g., with contact 603*k*) the second user interface element 644*b* and moves the contact 603*k* horizontally in a swipe motion. In FIG. 6L, in response to the input illustrated in FIG. 6K, the electronic device 500*b* ceases displaying the incoming call user interface in the respective region 638 of the display 504*b* area and displays the web browsing user interface in the respective region 638 of the display 504*b* area again. In some embodiments, if the user were to perform the input illustrated in FIG. 6K again, the electronic device 500*b* would toggle through a plurality of user interfaces previously displayed in the respective region 638 of the display 504*b* area. As shown in FIG. 6L, while the indication 607*j* of the incoming call continues to be detected and the expanded incoming call user interface is no longer displayed, the electronic device 500*b* displays an indication 646*a* of the incoming call in region of the display 504*b* that includes indications 604*a*-*c*. In some embodiments, indication 646*a* is animated, as described in more detail below with reference to FIGS. 6V-6W. In some embodiments, instead of displaying indication 646*a*, the electronic device 500*b* displays an indication similar to indication 646*c* described in more detail below with reference to FIG. 6Z. In some embodiments, in response to detecting selection of indication 646*a*, the electronic device 500*b* displays the expanded incoming call user interface illustrated in FIG. 6M or the incoming call user interface 610*c* illustrated in FIG. 6I.

Figure 6N:
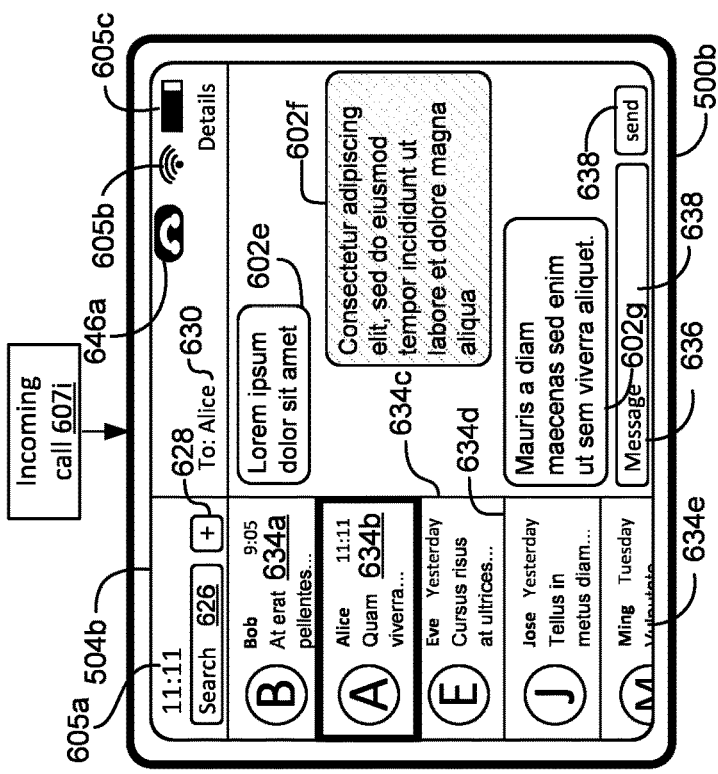
Figure 6M:
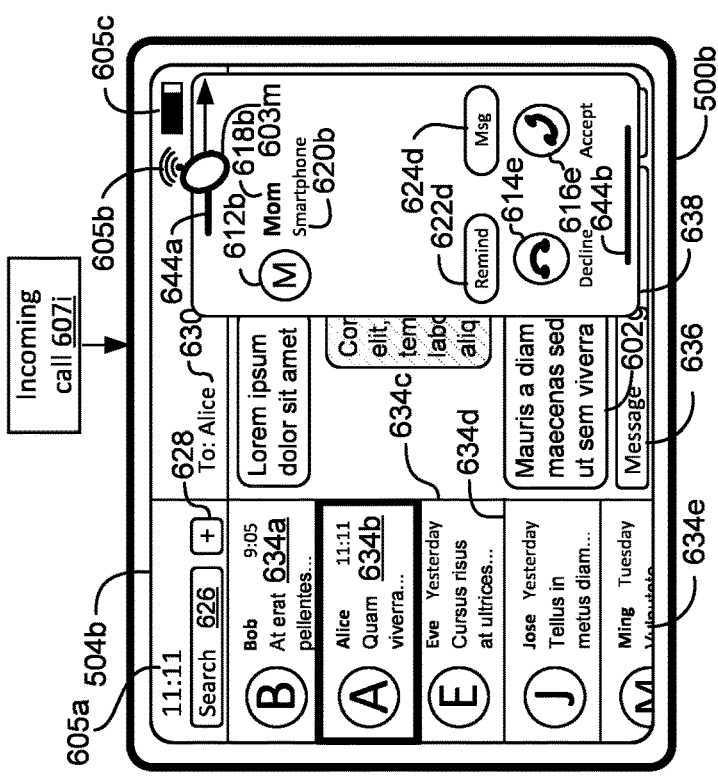

In FIG. 6L, the user selects (e.g., with contact 603*l*) the second user interface element 644*b* and moves the contact 603*l* in a direction opposite to the direction in which the user moved contact 603*k* in FIG. 6K to perform a swipe input. In FIG. 6M, in response to the user input illustrated in FIG. 6M, the electronic device 500b ceases displaying the indication 646a and displays the expanded incoming call user interface in the respective region 638 of the display 504b, as shown in FIG. 6M.

In FIG. 6M, the user selects (e.g., with contact 603m) the first user interface element and moves the contact 603m towards an edge of the display 504b that is closest to the respective region 638 of the display 504b. In FIG. 6N, in response to the input illustrated in FIG. 6M, the electronic device 500b ceases displaying a user interface other than the messaging user interface in the respective region 638 of the display 504b area and displays the indication 646a. Indication 646a is described in more detail above with reference to FIG. 6L.

In some embodiments, the electronic device 500a (or 500b) displays an ongoing call user interface in response to detecting an input corresponding to a request to accept an incoming call while the call is ongoing. FIG. 6O illustrates an exemplary user input corresponding to a request to accept an incoming call. As shown in FIG. 6O, in response to an indication 607o of an incoming call, the electronic device 500a displays the incoming call user interface 610a described above with reference to FIGS. 6B-6C. The user selects (e.g., with contact 603o) the selectable option 616a to accept the incoming call. In response to the user's selection, the electronic device 500a accepts the incoming call and connects the electronic device 500a to the electronic device from which the call was received to initiate a two-way real-time communication channel through which the electronic devices are able to communicate and updates the user interface as illustrated in FIG. 6P.

FIG. 6P illustrates an exemplary ongoing call user interface 610f. In some embodiments, the user interface illustrated in FIG. 6P is displayed in response to the input illustrated in FIG. 6O. The ongoing call user interface 610f is displayed in the same region of the display as the incoming call user interface 610 illustrated in FIG. 6O. The ongoing call user interface includes an indication 618f of the user the call is with, an image 612f corresponding to the user the call is with, an indication 620f of the elapsed time since the call was accepted, a selectable option 614f to terminate the call, and an option 616f to view one or more audio settings of the audio of the call.

Figure 6R:
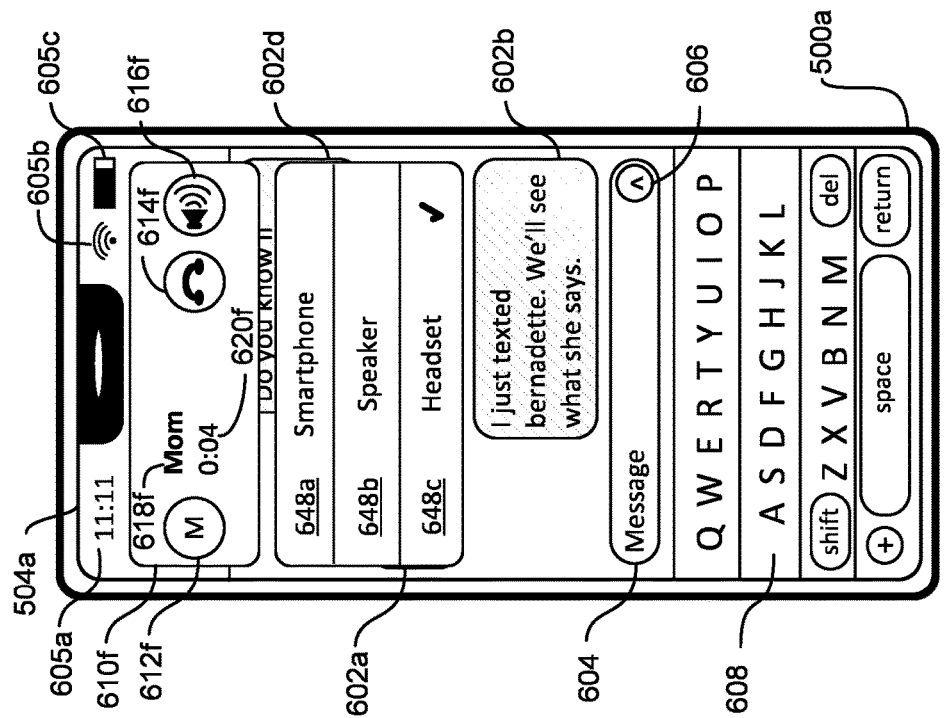
Figure 6Q:
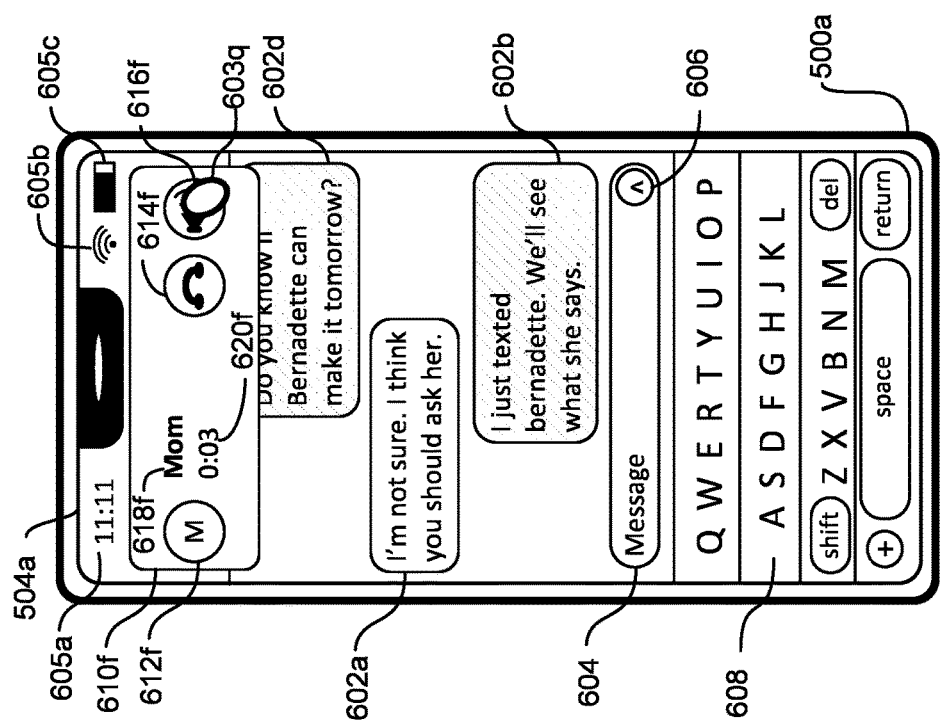

In FIG. 6Q, the user selects (e.g., with contact 603q) the option 616f to view the audio settings associated with the audio of the call, as shown in FIG. 6R. FIG. 6R illustrates a plurality of selectable options 648a-c displayed in response to the input illustrated in FIG. 6Q. Option 648c is displayed with a checkmark to indicate that the audio of the call is currently being presented through a headset in communication with the electronic device 500a. In response to detecting selection of one of the other options 648a or 648b, the electronic device 500a optionally ceases presenting the call audio through the headset and presents the call audio through the selected other audio device in communication with the electronic device 500a, such as a phone speaker integrated with the electronic device 500a (which, in this example, is a smartphone) associated with option 648a or a loudspeaker device integrated with electronic device 500a associated with option 648b.

As described above with reference to FIGS. 6B-6C, in some embodiments, while the electronic device 500a displays the incoming call user interface 610a, in response to receiving an input directed to a user interface other than the incoming call user interface 610a, the electronic device 500a performs the action in accordance with the input and continues to display the incoming call user interface 610a. In contrast, in some embodiments, while the electronic device 500a is displaying the ongoing call user interface 610f, in response to receiving an input directed to a user interface other than the ongoing call user interface 610f, the electronic device 500a performs the action in accordance with the input and ceases displaying the ongoing call user interface 610f, as will be described below with reference to FIGS. 6S-6T.

In FIG. 6S, the electronic device 500a displays the ongoing call user interface 610f overlaid on the messaging user interface. While displaying the ongoing call user interface 610f overlaid on the messaging user interface, the user makes a selection (e.g., with contact 603s) within the messaging user interface and moves contact 603s to scroll the messaging user interface.

As shown in FIG. 6T, in response to the input illustrated in FIG. 6S, the electronic device 500a scrolls the user interface in accordance with the input, ceases displaying the ongoing call user interface 610f, and displays an indication 646d of the ongoing call. The indication 646d of the ongoing call includes or is displayed with the indication 605a of the current time. For example, the indication 646d of the ongoing call is an indication that is a different color than the background color on which indications 605b and 605c are displayed. Although FIG. 6T illustrates indication 646d as having a pattern, in some embodiments, the indication 646d is a solid color. In some embodiments, in response to detecting selection of indication 646d, the electronic device 500a displays either the ongoing call user interface 610f illustrated in FIG. 6S or a full-screen, expanded ongoing call user interface that includes the same elements as the ongoing call user interface 610f and additional elements (e.g., one or more indications and/or options) not included in the ongoing call user interface 610f.

In some embodiments, the electronic device 500a displays an indication of an incoming call in the same location at which the indication 646d of the ongoing call was displayed, as shown in FIG. 6T. The indication of the incoming call can be different from the indication of the ongoing call, as will be described with reference to FIGS. 6V-6W.

In some embodiments, the indication of the incoming call is displayed in response to an input directed to the incoming call user interface 610a. In FIG. 6U, the electronic device 500a displays the incoming call use interface 610a overlaid on the messaging user interface in response to the indication 607u of an incoming call. While displaying the incoming call user interface 610a overlaid on the messaging user interface, the electronic device 500a detects selection (e.g., with contact 603u) of the incoming call user interface 610a and movement of the contact 603u towards the edge of display 504a closest to the incoming call user interface 610a.

Figure 6V:
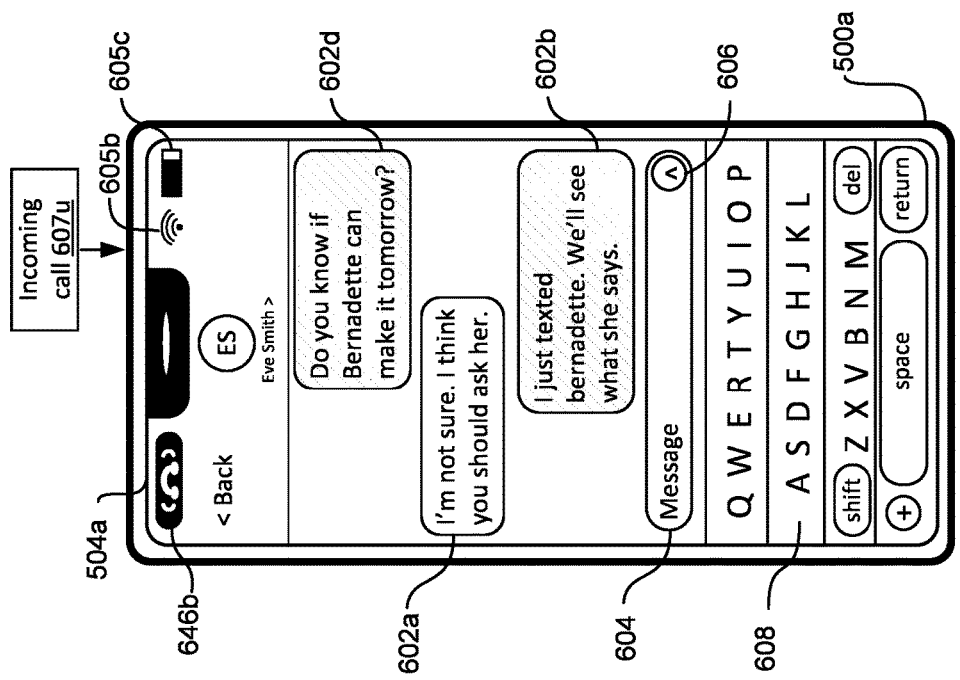
Figure 6U:
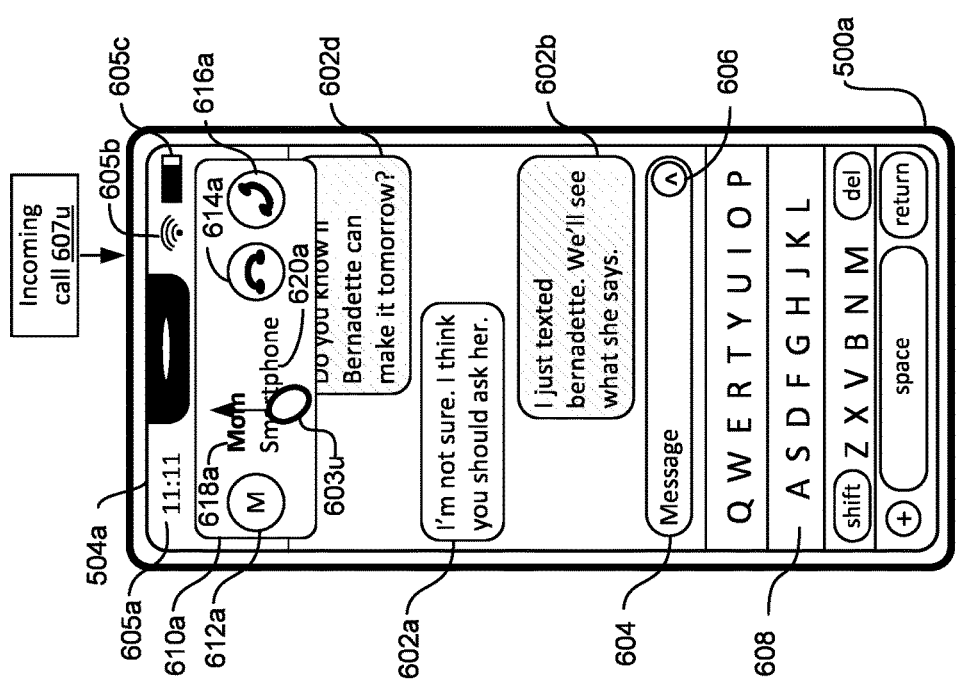

As shown in FIG. 6V, in response to the user input illustrated in FIG. 6U, the electronic device 500a ceases displaying the incoming call user interface 610a and displays an indication 646b of the incoming call. The electronic device 500a forgoes accepting or rejecting the incoming call and the indication 607u of the incoming call continues to be detected. The indication 646b of the incoming call is displayed at a location in the user interface at which the indication of the time 605a was previously displayed while the electronic device 500a displayed the incoming call user interface 610a, as shown in FIG. 6U. This location is also the location at which the indication 646d of the ongoing call was displayed while the electronic device 500a was on a call, as shown in FIG. 6T.

The indication 646b of the incoming call and the indication 646d of the ongoing call may differ in multiple ways. In some embodiments, the indication 646b of the incoming call and the indication 646d of the ongoing call include different colored backgrounds. The indication 646d of the ongoing call includes the indication 605a of the current time (or the current time 605a is overlaid on the indication 646d), whereas the indication 605a of the current time is not displayed concurrently with the indication 646b of the incoming call. The indication 646d of the ongoing call is optionally not animated, whereas the indication 646b of the ongoing call is animated, as described with reference to FIGS. 6V-6W. In some embodiments, the indication 646d of the ongoing call is selectable to display a user interface associated with the ongoing call, whereas the indication 645b of the incoming call is selectable to display a user interface associated with the incoming call, as will be described below with reference to FIGS. 6W-6Y.

Figure 6X:
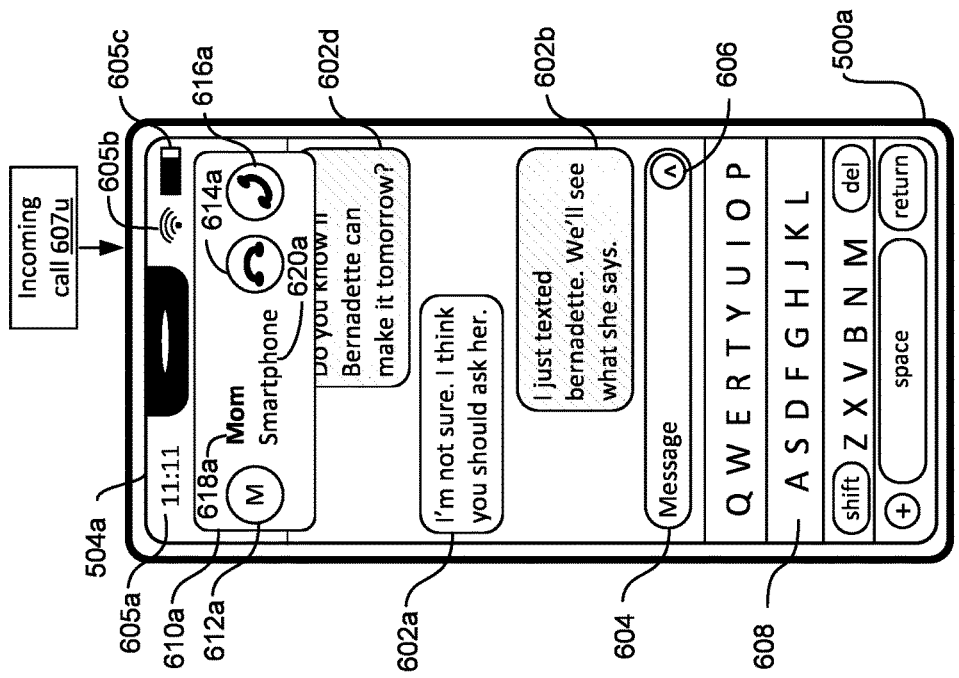
Figure 6W:
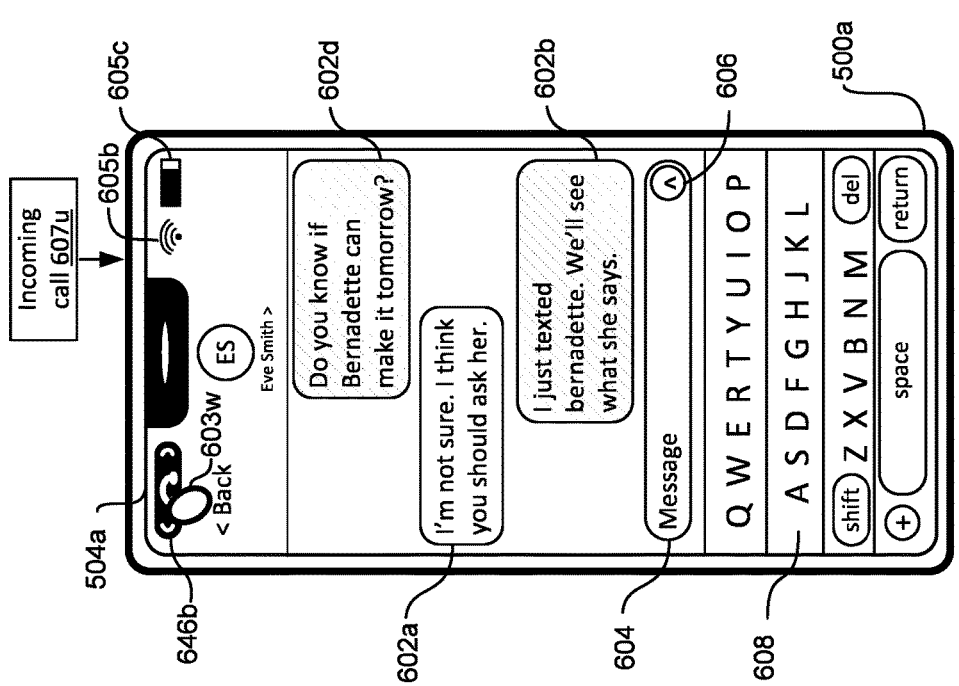

FIGS. 6V-6W illustrate multiple frames of the animation included in the indication 646b of the incoming call. In FIG. 6W, the electronic device 500a detects selection (e.g., via contact 603w) of the indication 646b of the incoming call. In some embodiments, in response to the input illustrated in FIG. 6W, the electronic device 500a displays the incoming call user interface 610a as shown in FIG. 6X. The incoming call user interface 610a illustrated in FIG. 6X is described in more detail above with reference to FIG. 6B. In some embodiments, in response to the input illustrated in FIG. 6W, the electronic device 500a displays the expanded incoming call user interface, as shown in FIG. 6Y. The expanded incoming call user interface illustrated in FIG. 6Y is described in more detail above with reference to FIG. 6D. In some embodiments, in response to the input illustrated in FIG. 6W, the electronic device 500a displays the expanded call user interface illustrated in FIG. 6E. In some embodiments, in response to the input illustrated in FIG. 6W, the electronic device 500a displays the expanded call user interface illustrated in FIG. 6F.

Figure 6Z:
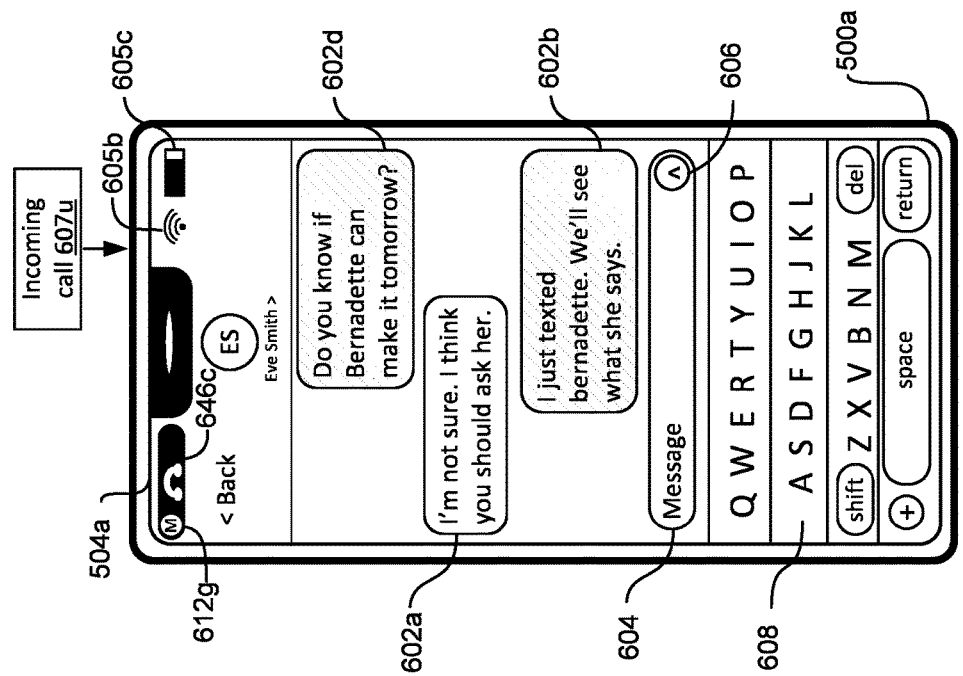
Figure 6Y:
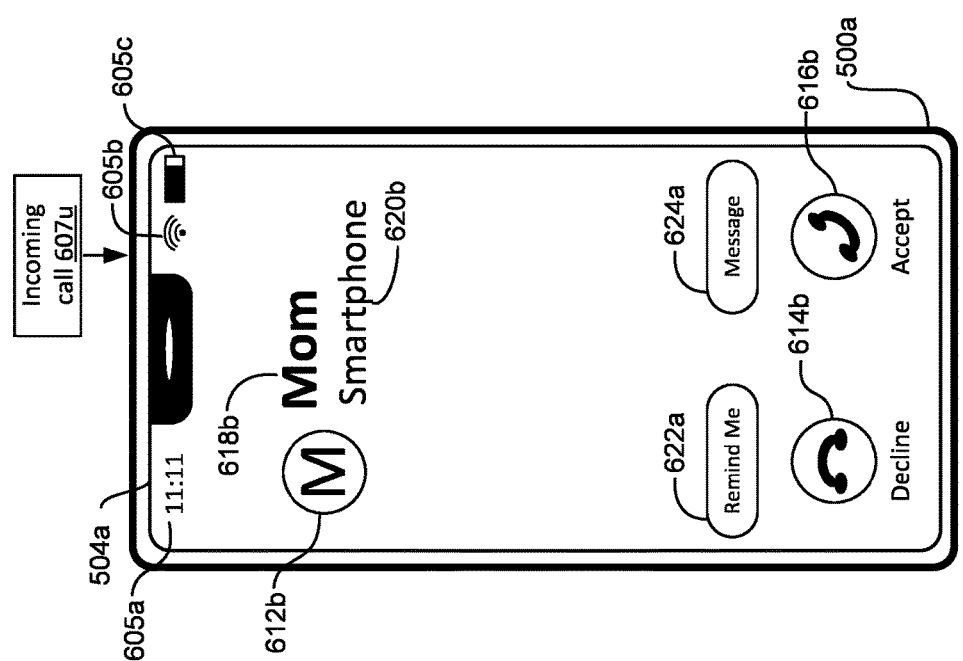
Figure 6B:
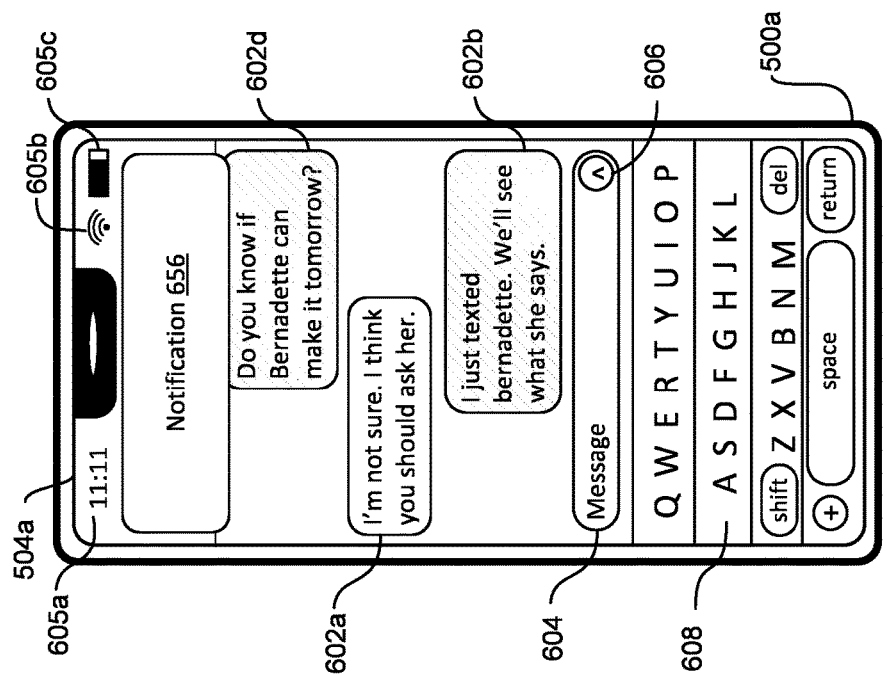
Figure 6A:
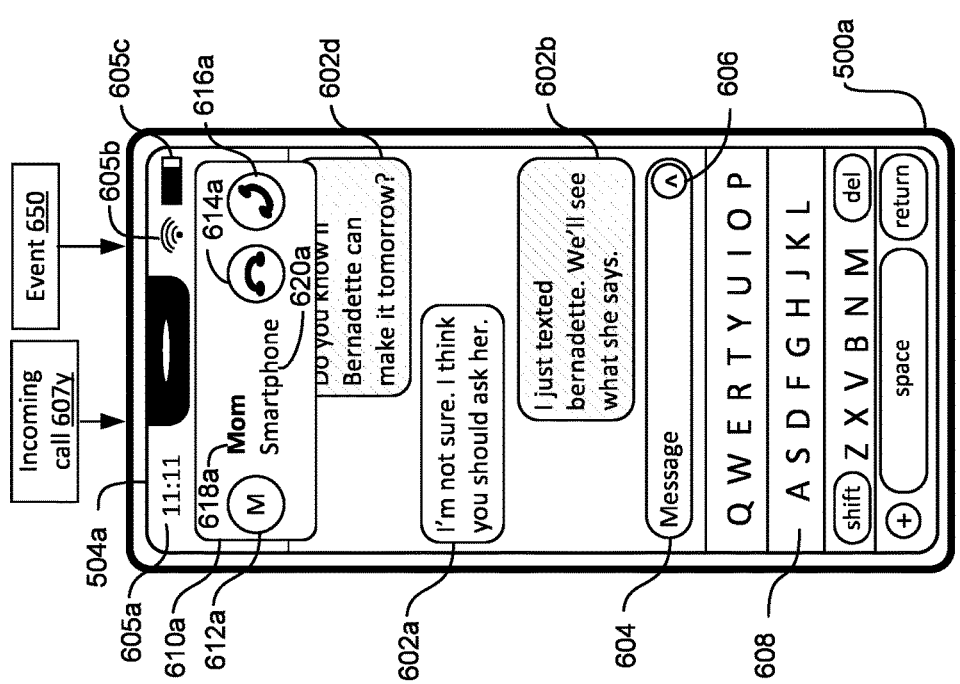
Figure 6D:
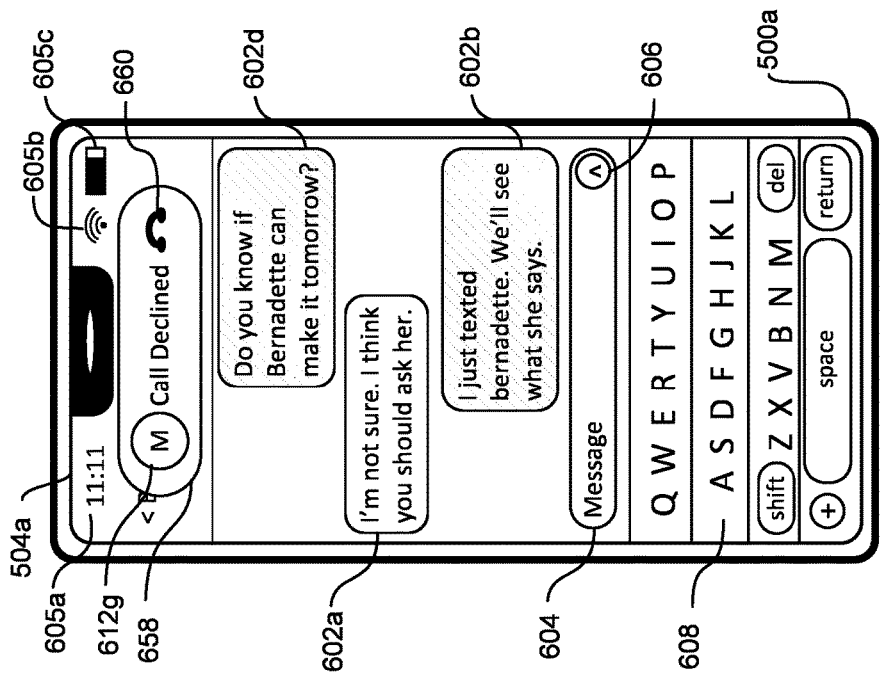
Figure 6C:
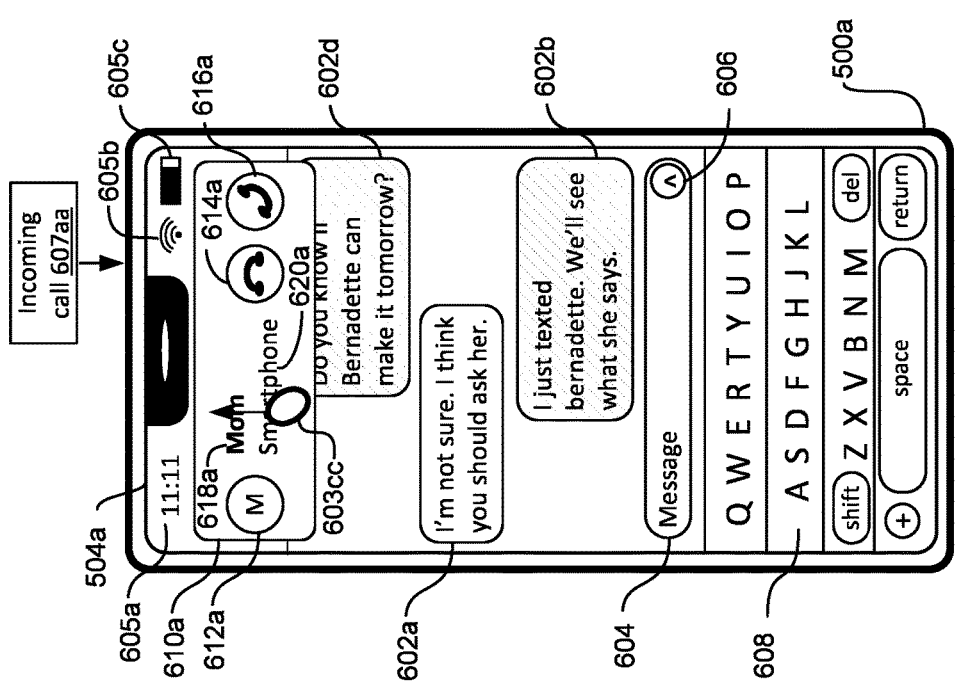
Figure 6F:
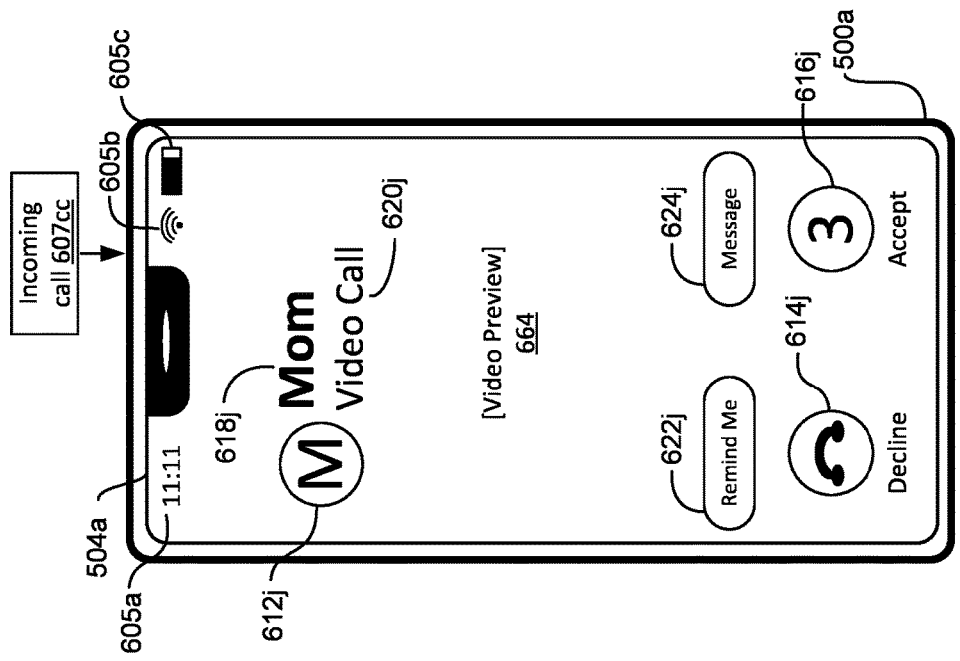
Figure 6E:
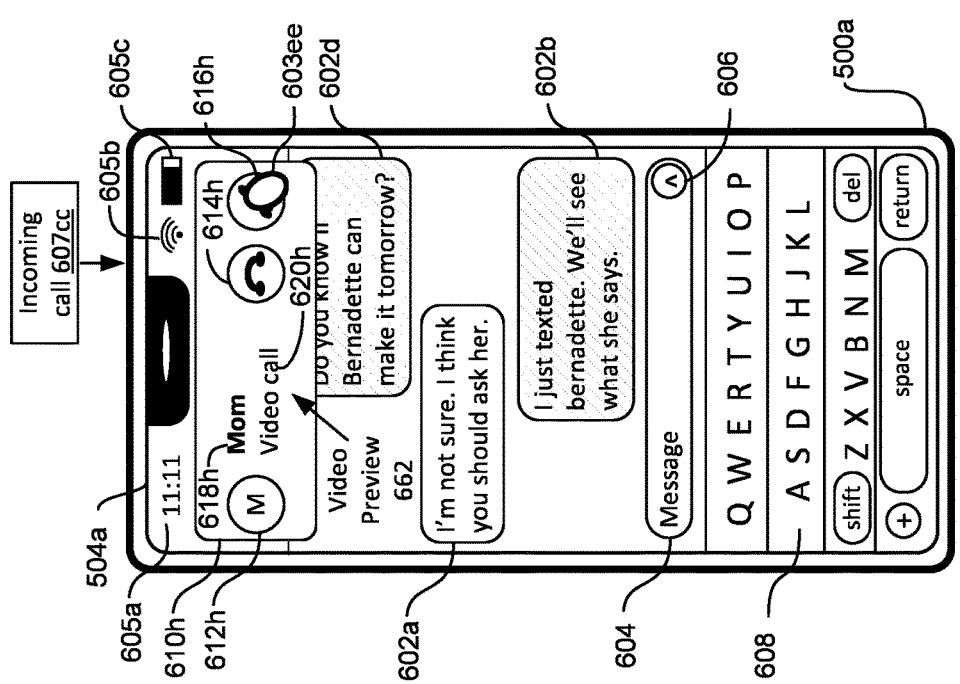
Figure 6G:
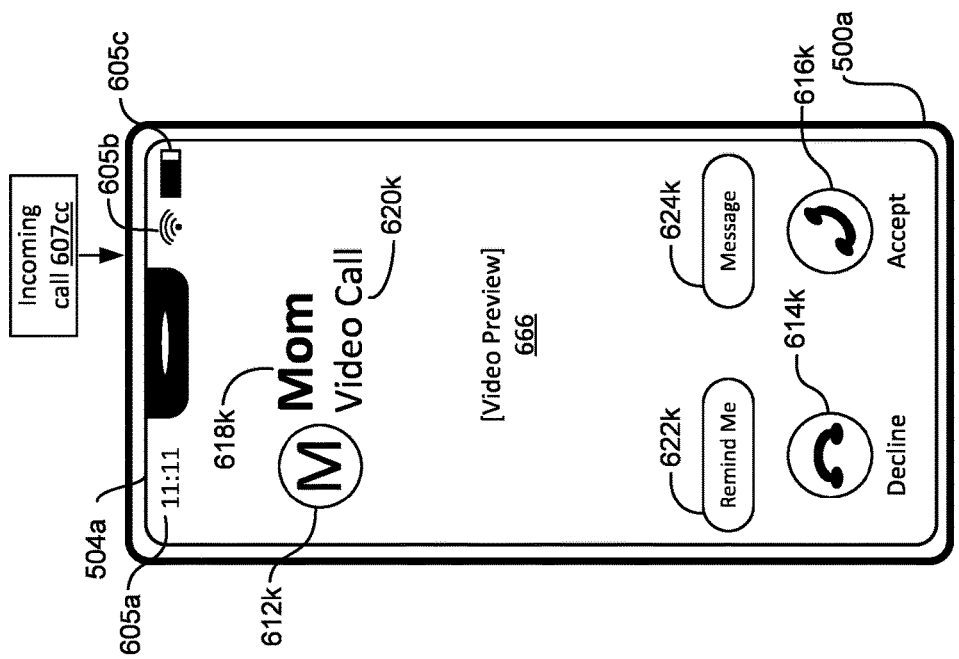
Figure 7A:
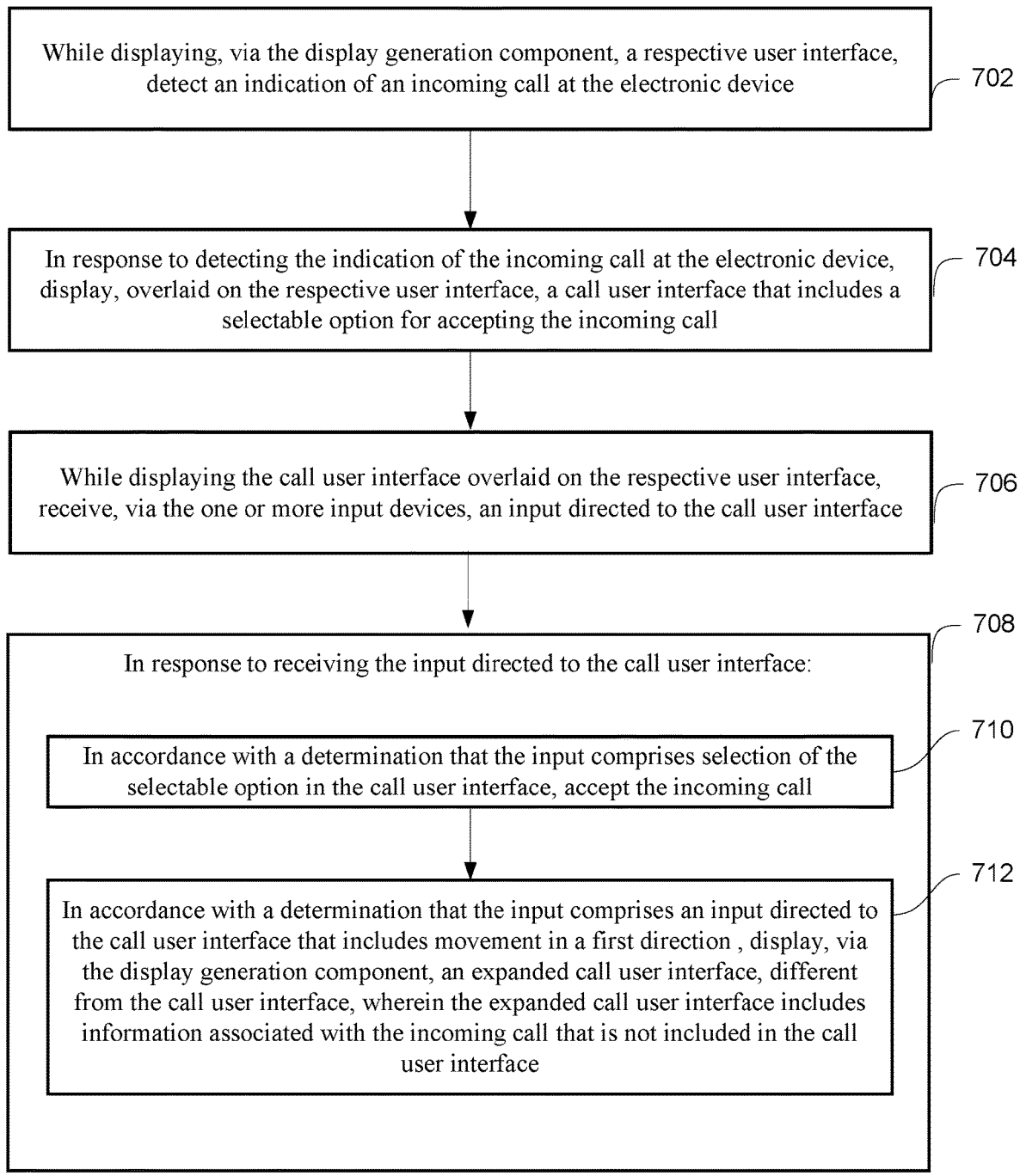
FIGS. 7A-7K is a flow diagram illustrating a method of displaying a user interface in response to an indication of an incoming call in accordance with some embodiments of the disclosure.
Figure 7B:
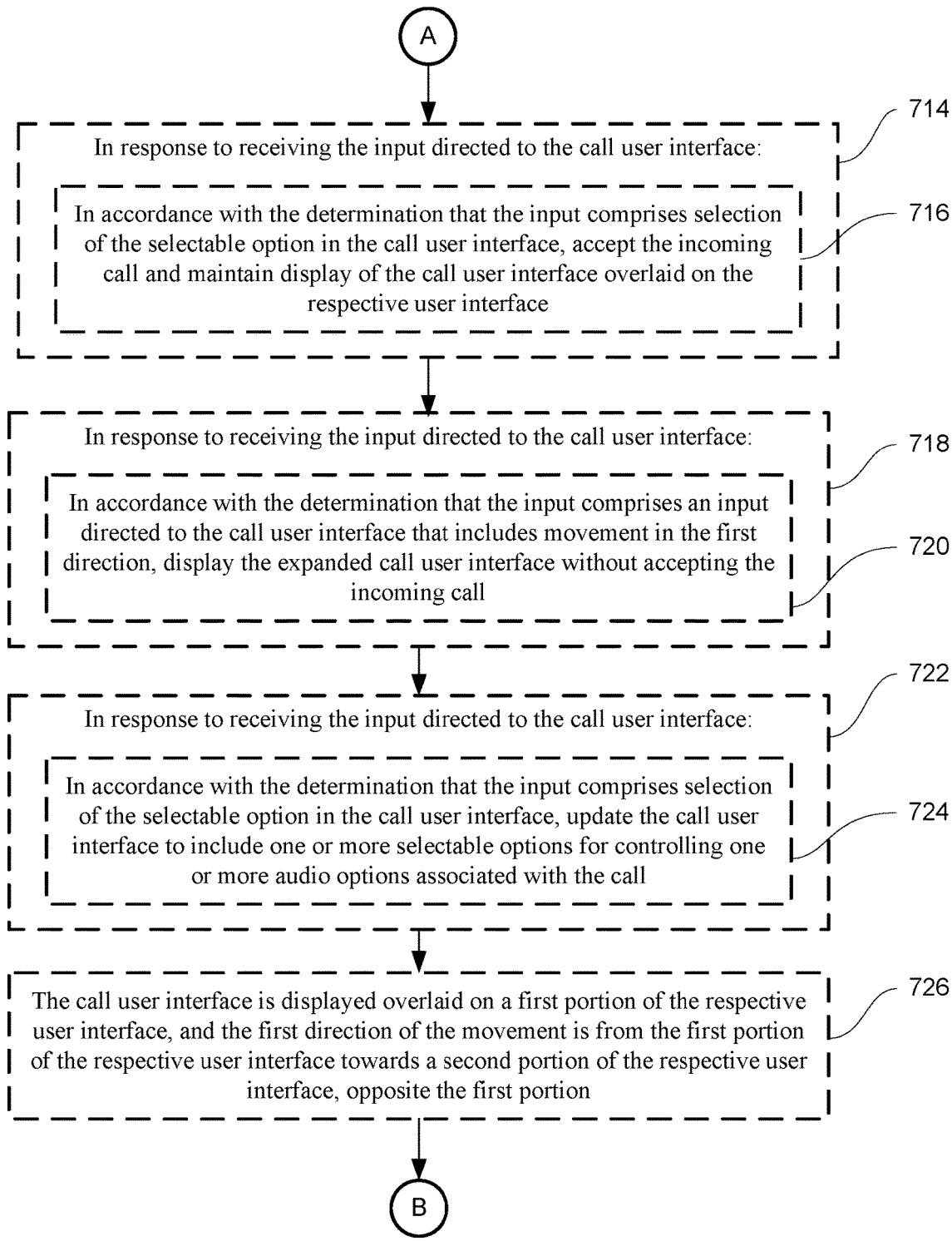
Figure 7C:
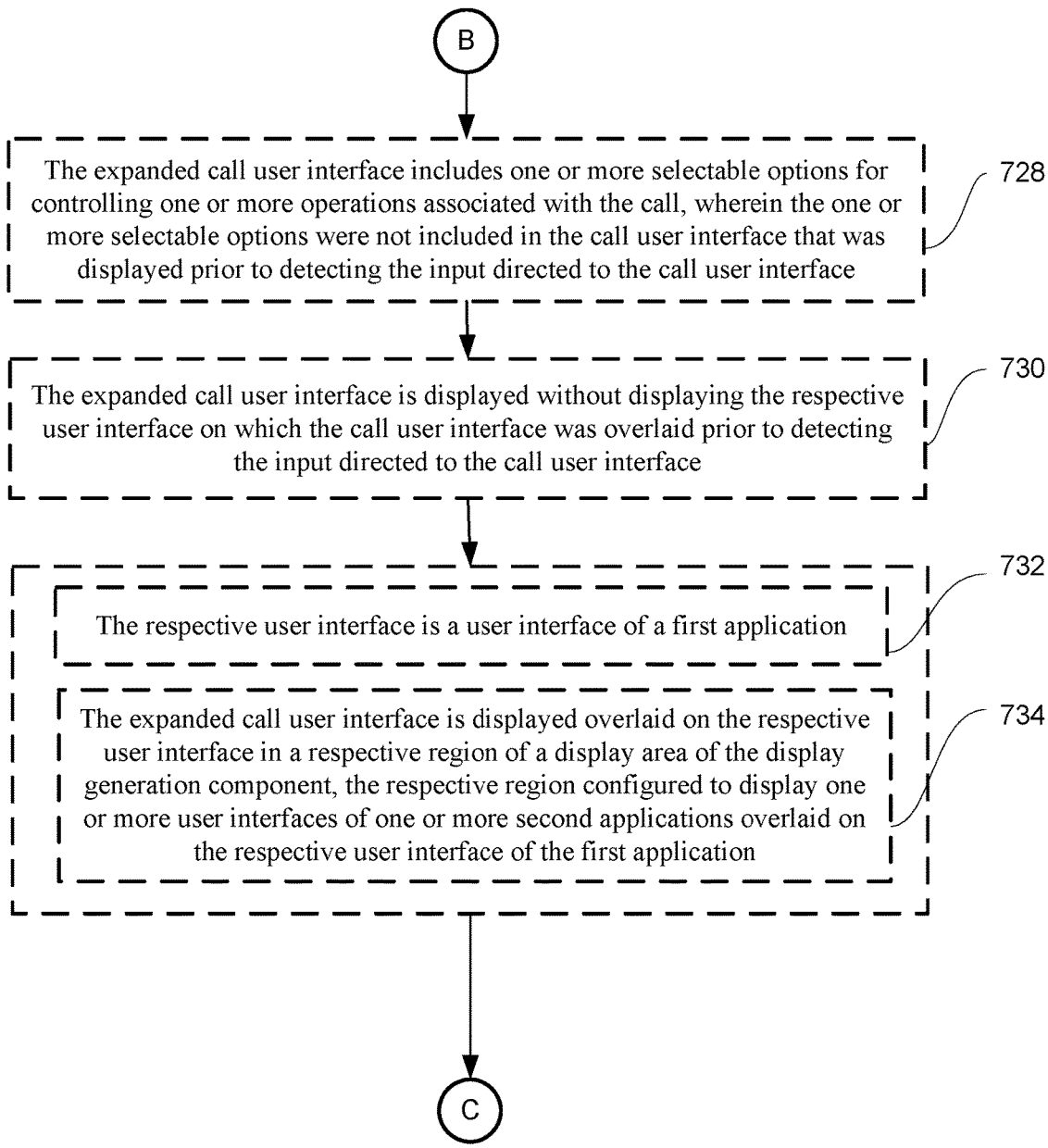
Figure 7D:
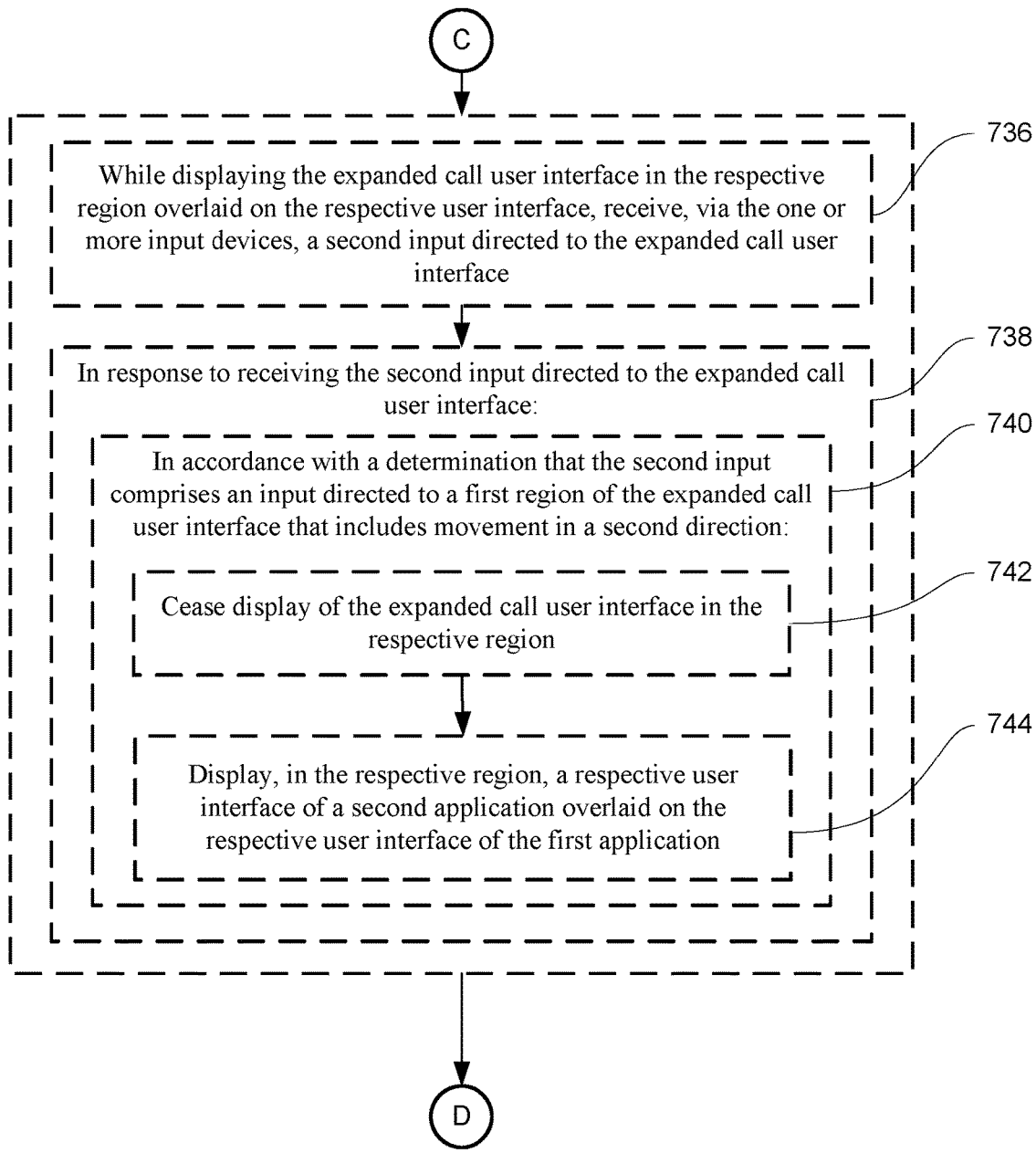
Figure 7E:
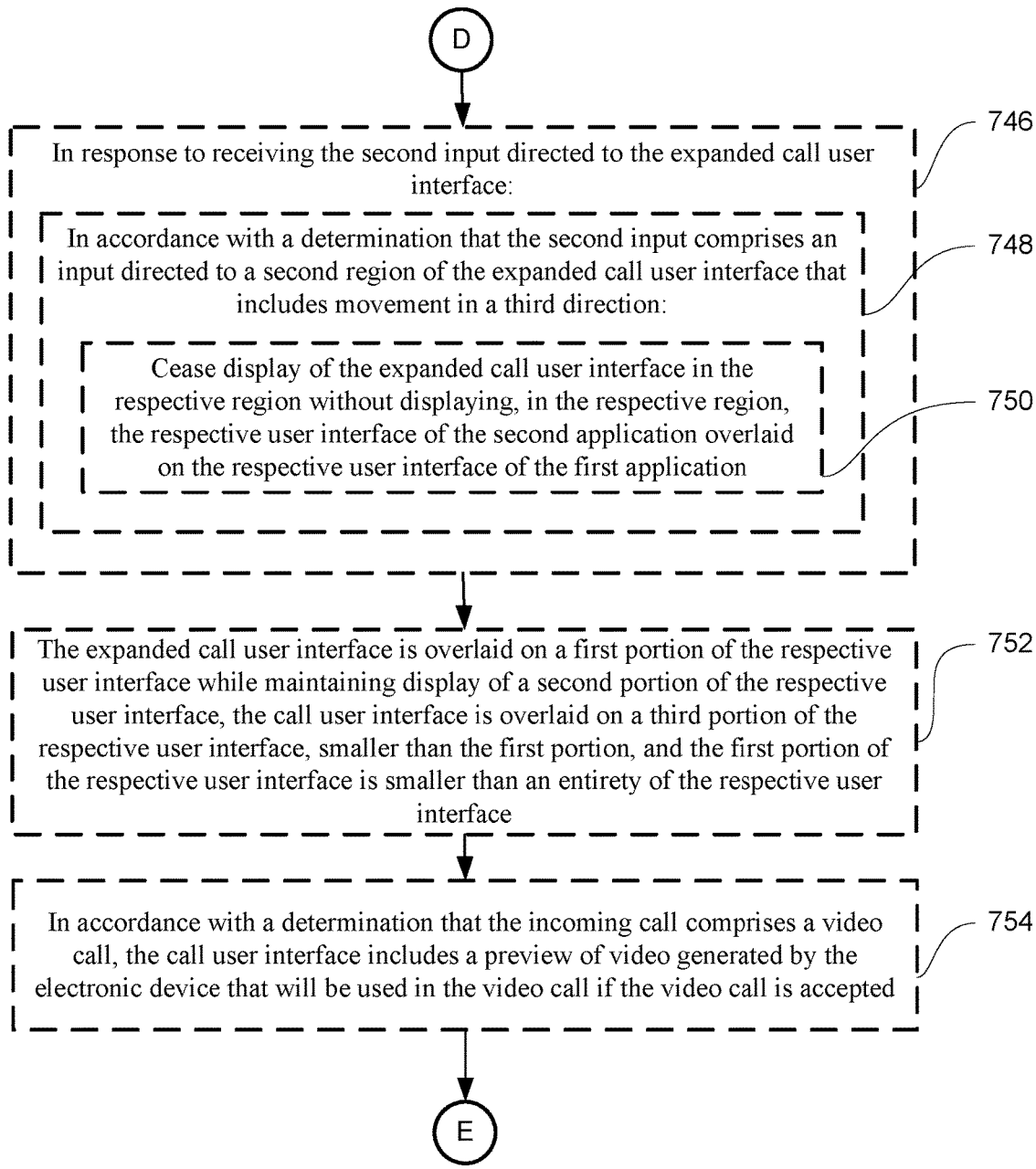
Figure 7F:
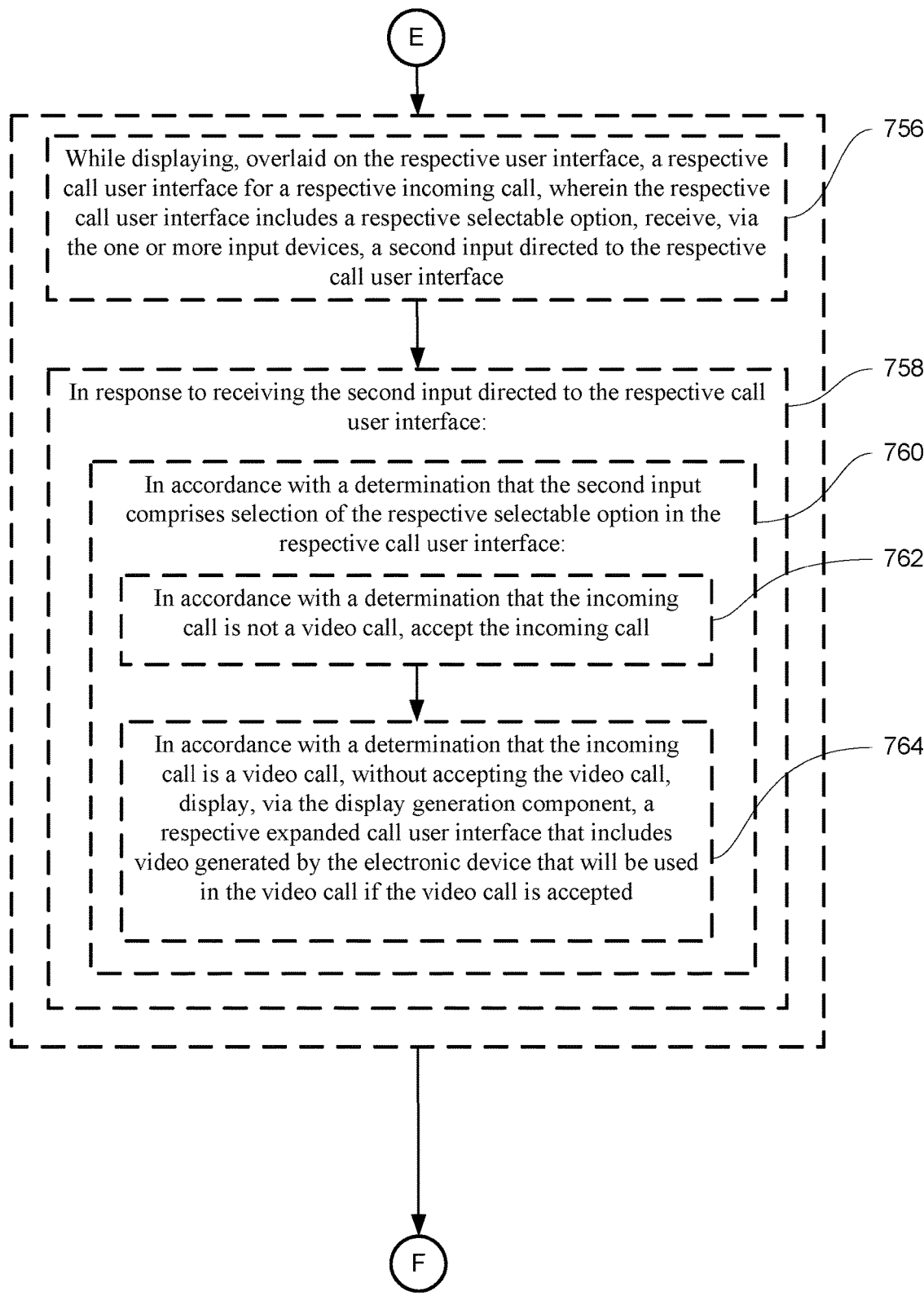
Figure 7G:
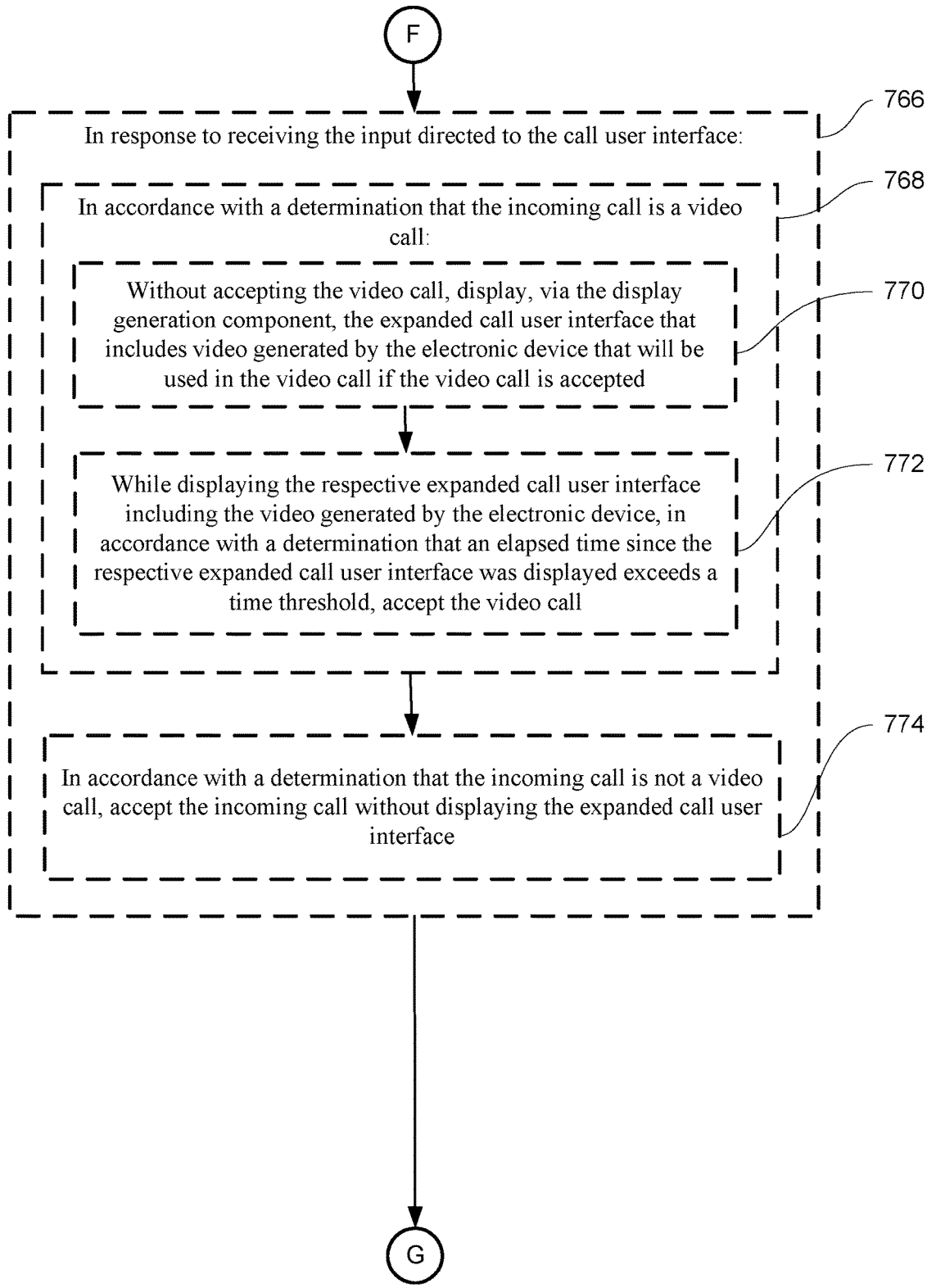
Figure 7H:
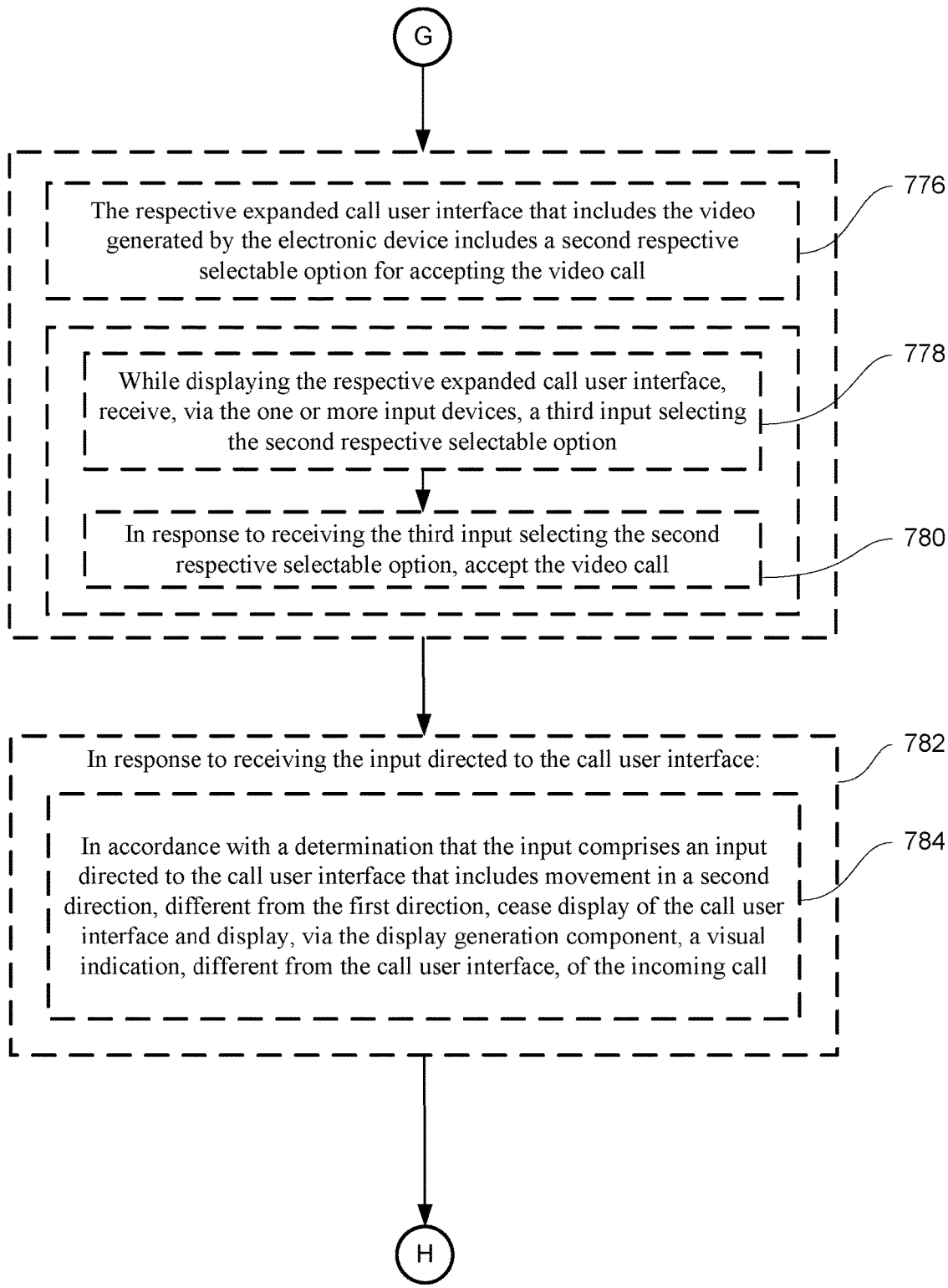
Figure 7I:
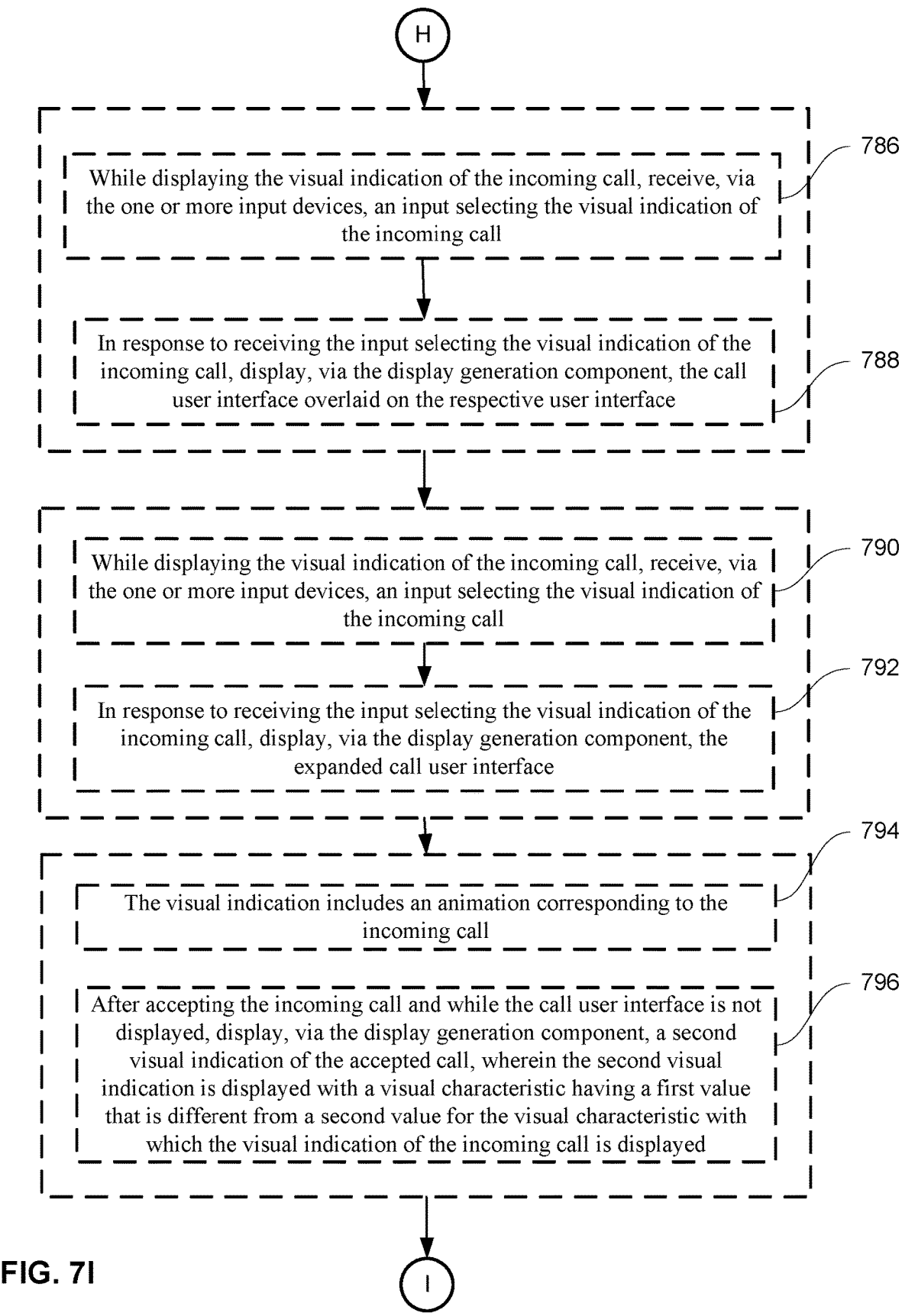
Figure 7J:
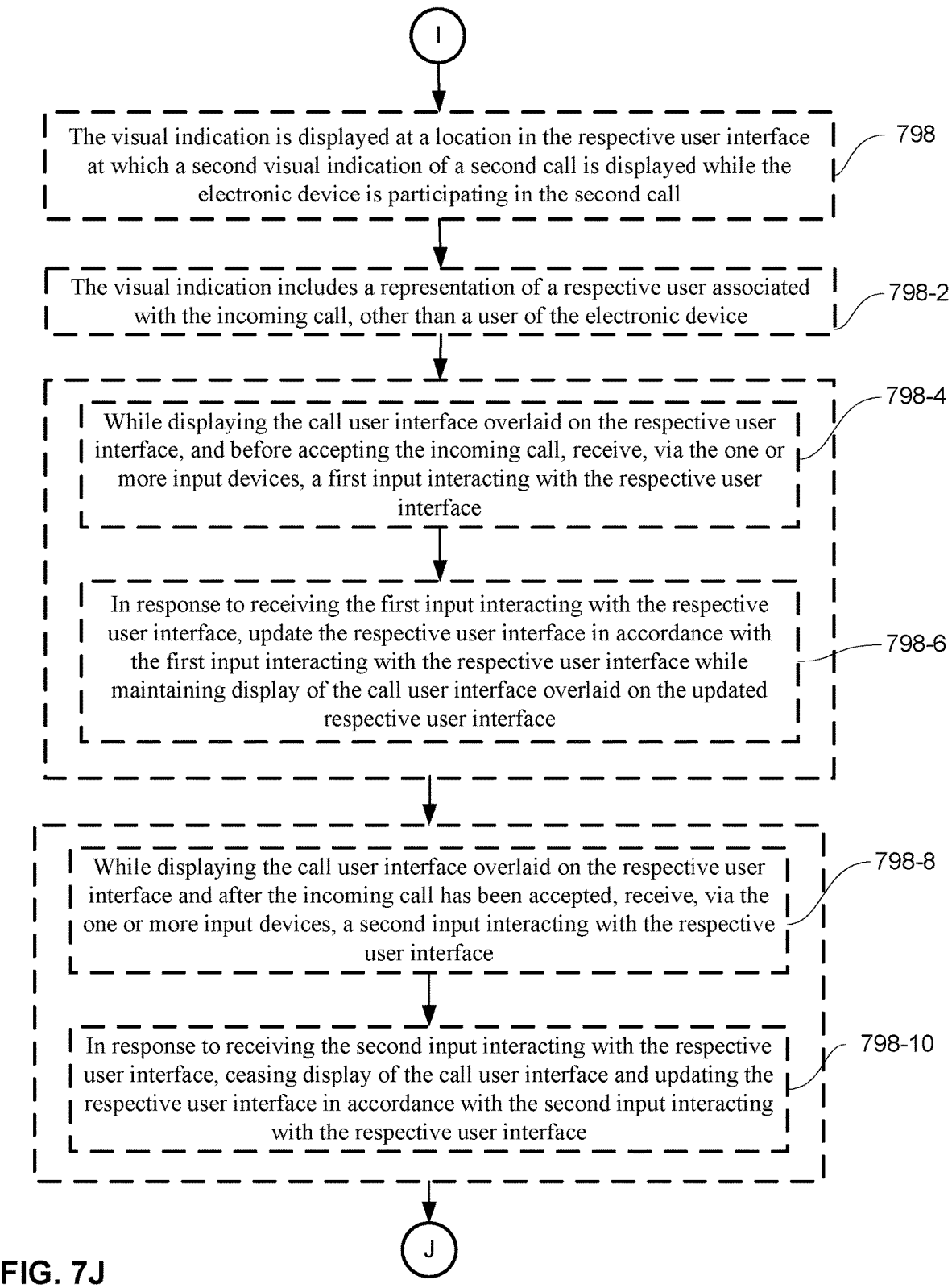
Figure 7K:
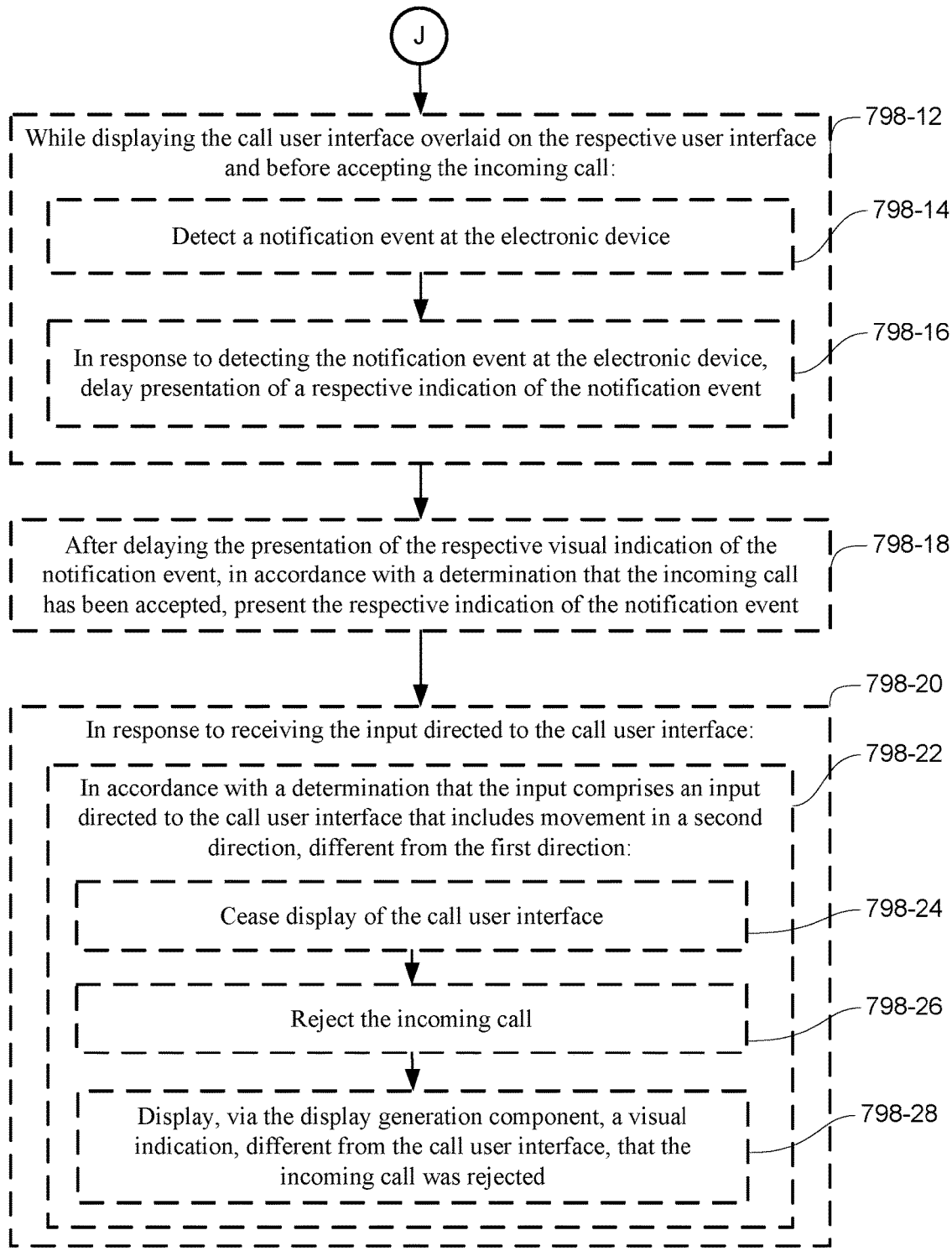

In some embodiments, instead of displaying the indication 646b of the incoming call illustrated in FIGS. 6V-6W, the electronic device 500a displays the indication 646c of the incoming call illustrated in FIG. 6Z. As shown in FIG. 6Z, the indication 646c of the incoming call includes the image 612g associated with the user from which the incoming call is received. In some embodiments, in response to detecting selection of indication 646c, the electronic device 500a displays the incoming call user interface 610a or an expanded incoming call user interface, in a manner similar to the manner in which the electronic device 500a displays the incoming call user interface 610a or an expanded incoming call user interface in response to detecting selection of the indication 646b of the incoming call user interface illustrated in FIG. 6W, as described in more detail above. In some embodiments, one or more other details of indication 646b described above apply to indication 646c illustrated in FIG. 6Z.

In some embodiments, the electronic device 500a presents an indication (e.g., including a visual indication) of a notification event in response to detecting the notification event. Examples of notification events include receipt of messages, indications generated by one or more applications installed on the electronic device, indications generated by an operating system of the electronic device 500a, and the like. In some embodiments, the electronic device 500a forgoes presenting an indication of a notification event while an incoming call user interface 610a is displayed in response to an incoming call.

FIG. 6AA illustrates the electronic device 500a displaying the incoming call user interface 610a overlaid on the messaging user interface in response to an indication 607y of an incoming call. While displaying the incoming call user interface 610a, the electronic device 500a detects a notification event 650. As shown in FIG. 6AA, the electronic device 500a forgoes presenting an indication of the notification event 650 because the incoming call user interface 610a is being displayed. In some embodiments, the indication 607y of the incoming call is presented for a threshold 654 amount of time before a voicemail system of the electronic device 500a accepts the incoming call, allowing the caller to leave a voicemail. In FIG. 6AA, a respective amount of time 652a has passed since receiving the indication 607y of the incoming call and the respective amount of time 652a is less than the threshold 654 time, so the call user interface 610a continues to be displayed and the electronic device 500a continues to forgo presenting an indication of the notification event 650.

In FIG. 6BB, once the time 652b since the indication 607y of the incoming call illustrated in FIG. 6AA reaches the predetermined threshold 654 amount of time, the electronic device 500a no longer receives the indication 607y of the incoming call and a voicemail system of the electronic device 500a optionally accepts the incoming call. Because the incoming call user interface 610a is no longer displayed, the electronic device 500a presents a visual indication 656 of the notification event 650 illustrated in FIG. 6AA. In some embodiments, the electronic device 500a also presents an audio and/or tactile indication in conjunction with the visual indication 656 of the notification event.

In some embodiments, if the user had accepted the incoming call corresponding to the incoming call user interface 610a illustrated in FIG. 6AA, the electronic device 500a would present the indication 656 of the notification and accepted the call in response to the input corresponding to a request to accept the incoming call. For example, the electronic device 500a would present the visual indication 656 of the notification event above or below the ongoing call user interface (e.g., ongoing call user interface 610f illustrated in FIG. 6P).

In some embodiments, instead of displaying indication 646b illustrated in FIGS. 6V-6W in response to the user input illustrated in FIG. 6U without accepting or rejecting the incoming call, the electronic device 500a rejects the incoming call in response to detecting the input illustrated in FIG. 6U. FIG. 6CC illustrates the electronic device 500a detecting selection (e.g., with contact 603cc of the incoming call user interface 610a) followed by movement of contact 603cc towards the edge of display 504a closest to the incoming call user interface 610a, as described above with respect to FIG. 6U. In FIG. 6DD, in response to the input illustrated in FIG. 6CC, the electronic device 500a declines the incoming call and presents an indication 658 that the incoming call was declined. In some embodiments, declining the incoming call causes a voicemail system of the electronic device 500a to answer the call and forgoes initiating a real-time communication channel with the electronic device from which the incoming call was received. As shown in FIG. 6DD, the visual indication 658 of the declined call includes the image 612g associated with the user from which the incoming call was received and an icon 660 indicating that the call was declined. In some embodiments, the indication 658 is displayed for a predetermined time until the electronic device 500a ceases displaying indication 658 without a user input to do so. In some embodiments, the indication 658 is displayed until a user input directed to the indication 658 is received or until a user input not directed to the indication 648 is received.

In some embodiments, the incoming call is a video call. One or more of the examples described above apply to phone calls, video calls, internet-based voice calls, or other types of calls. In some embodiments, the electronic device 500a presents a preview of the video that will be sent to the other electronic device during a video call before the video call is initiated, as will be described below with reference to FIGS. 6EE-6GG. In some embodiments, the video preview is captured by a camera in communication with or integrated with electronic device 500a.

FIG. 6EE illustrates the electronic device 500a presenting an indication 610h of an incoming video call in response to receiving an indication 607cc of the incoming video call. The incoming call user interface 610h includes elements similar to the elements of the incoming call user interface described above with reference to FIG. 6B, for example, with differences that will now be described. The incoming call user interface 610h includes an indication 620h that the incoming call is a video call in place of the indication 620a of the device from which the call is received. In some embodiments, the background of the incoming call user interface 610h is a video preview indicating the video that will be transmitted to the other electronic device if the call is accepted. In some embodiments, however, the incoming call user interface 610h does not include the video preview 662. For example, the background of the incoming call user interface 610h is a solid color. As shown in FIG. 6EE, the electronic device 500a detects selection (e.g., with contact 603ee) of an option 616h to accept the video call. In some embodiments, in response to the input illustrated in FIG. 6EE, the electronic device 500a accepts the video call. In some embodiments, in response to the input illustrated in FIG. 6EE, the electronic device 500a displays one of the expanded incoming call user interfaces illustrated in FIGS. 6FF and 6GG.

FIG. 6FF illustrates an expanded incoming call user interface that, in some embodiments, is displayed in response to the user input illustrated in FIG. 6EE. The expanded incoming call user interface illustrated in FIG. 6FF is similar to the expanded incoming call user interface described above with reference to FIG. 6D, for example, except for the differences that will now be described. The background of the expanded incoming call user interface in FIG. 6FF includes a video preview 664 of the video that will be sent to the other electronic device when the video call is accepted and the option 616j to accept the video call includes an indication of an amount of time remaining before the video call will be initiated without further user input. In some embodiments, once the predetermined time (e.g., 1, 2, 3 or 4 or 5 seconds) has passed (e.g., either since the indication of the incoming call was first received or since the input illustrated in FIG. 6EE was received), the electronic device 500a initiates the video call automatically in the absence of a user input corresponding to a request to initiate the video call. In some embodiments, if the electronic device 500a detects selection of the option 616j to accept the video call before the predetermined time has passed, the electronic device 500a initiates the video call in response to the input.

FIG. 6GG illustrates an expanded incoming call user interface that, in some embodiments, is displayed in response to the user input illustrated in FIG. 6EE. The expanded call user interface is similar to the expanded call user interface illustrated in FIG. 6GG, except for the differences that will now be described. Instead of displaying an indication of a predetermined time before the video call will automatically be initiated, the electronic device 500a displays an option 616k to accept the video call that does not include an indication of a countdown to the predetermined time passing and only initiates the video call in response to detecting selection of option 616k.

FIGS. 7A-7K is a flow diagram illustrating a method of displaying a user interface in response to an indication of an incoming call in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

In some embodiments, method 700 is performed at an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device)). In some embodiments, the display generation component is a display integrated with the electronic device (optionally a touch screen display) and/or an external display such as a monitor, projector, television, etc.

In some embodiments, while displaying, via the display generation component, a respective user interface, the electronic device (e.g., 500) detects (702) an indication (e.g., 607b) of an incoming call at the electronic device (e.g., 500), such as in FIG. 6B. In some embodiments, the respective user interface that is displayed while the indication of the incoming call is received is the respective user interface for an application accessible to the electronic device or a system user interface of the electronic device (e.g., a home screen user interface). For example, a home screen user interface is a user interface that includes a plurality of icons and/or widgets or other application content associated with applications accessible to the electronic device that, when selected, causes the electronic device (e.g., 500) to present a user interface of the corresponding application. In some embodiments, the home screen user interface further includes one or more widgets of one or more applications, such as clock, calendar, weather, e-mail, or other widgets. In some embodiments, a widget is a user interface element associated with an application that includes a subset of features, functionality and/or information included in a full user interface of the application. In some embodiments, the indication of the incoming call is received while the electronic device is displaying a user interface of an application accessible to the electronic device. For example, the respective user interface includes user interface elements with which the user is able to interact to use one or more features of the application. An exemplary home screen user interface according to some embodiments is described above with reference to FIG. 4A. The respective user interface is optionally not a user interface of a phone application on the electronic device. In some embodiments, the incoming call is received by the electronic device (e.g., the incoming call is detected by cellular telephone circuitry, cellular data circuitry, or other network communication circuitry of the electronic device). For example, a smartphone receives a phone call made to a cell phone number of a cellular identifier (e.g., a SIM card or eSIM) of the smartphone. In some embodiments, the indication of the incoming call is received from another electronic device associated with a user account of the electronic device. For example, a tablet that is in communication with a smart phone receives, from the smartphone, an indication of a phone call made to a cell phone number of a cellular identifier (e.g., a SIM card or eSIM) of the smartphone. In this example, the tablet and smartphone are in communication via a wireless network, such as Bluetooth and/or Wi-Fi and the tablet is able to send and receive data associated with the telephone call to and from the smartphone, enabling the user to use the tablet as an interface to conduct the phone call.

In some embodiments, such as in FIG. 6B, in response to detecting the indication (e.g., 607b) of the incoming call at the electronic device (e.g., 500), the electronic device (e.g., 500) displays 704, overlaid on the respective user interface, a call user interface (e.g., 610a) that includes a selectable option (e.g., 616a) for accepting the incoming call. In some embodiments, the call user interface is a banner displayed at a predetermined location on the display screen at which other indications of notifications are optionally displayed by the electronic device (e.g., at the top portion of the respective user interface). In some embodiments, the call user interface includes an indication of a contact or user account from which the phone call is received, a selectable option that, when selected, causes the electronic device to accept the incoming call and connect the electronic device to the caller to conduct the phone call, and a selectable option that, when selected, causes the electronic device to reject the phone call and initiate a process to terminate the connection between the caller and the electronic device.

In some embodiments, while displaying the call user interface (e.g., 610a) overlaid on the respective user interface, the electronic device (e.g., 500) receives (706), via the one or more input devices, an input directed to the call user interface (e.g., 610a), such as in FIG. 6C.

In some embodiments, in response to receiving the input directed to the call user interface (708), in accordance with a determination that the input comprises selection of the selectable option (e.g., 616a) in the call user interface, the electronic device (e.g., 500) accepts (710) the incoming call, such as in FIGS. 6O-6P. In some embodiments, accepting the incoming call includes initiating a process to connect the electronic device to an electronic device of the caller and initiate a phone call between the two devices. In some embodiments, in response to selection of the selectable option to accept the call, the electronic device updates the call user interface to include an option that, when selected, causes the electronic device to display one or more audio settings of the call (e.g., a plurality of options associated with various speakers or audio-generating devices in communication with the electronic device that, when selected, causes the electronic device to use the selected speaker to play the audio of the call.).

In some embodiments, in response to receiving the input directed to the call user interface (708), in accordance with a determination that the input comprises an input directed to the call user interface (e.g., 610a) that includes movement in a first direction (e.g., a swipe input or a touch and drag input), the electronic device (e.g., 500) a displays (712), via the display generation component, an expanded call user interface, different from the call user interface (e.g., 610a), wherein the expanded call user interface includes information associated with the incoming call that is not included in the call user interface, such as in FIGS. 6C-6D. In some embodiments, the electronic device ceases displaying the respective user interface over which the call user interface was previously overlaid to display the expanded call user interface. In some embodiments, the expanded call user interface includes one or more user interface elements that were included in the call user interface, such as selectable options to accept the call and reject the phone call (e.g., initiate a process to terminate the connection between the electronic device and the electronic device of the caller). In some embodiments, the expanded call user interface includes user interface elements that were not included in the call user interface, such as a selectable option to set a reminder to call the caller back and a selectable option to initiate a process to send a text message or enhanced data-based message to the caller. The swipe input is optionally an input in a first direction (e.g., a downward swipe). In some embodiments, in response to a swipe input in the opposite direction (e.g., an upward swipe) the electronic device ceases display of the call user interface, forgoes displaying the expanded call user interface, presents a different visual indication of the incoming call (e.g., an indication in a header region of the respective user interface), forgoes accepting the phone call, and/or forgoes rejecting the phone call.

The above-described manner of displaying the expanded call user interface in response to the swipe input enables the electronic device to preserve display area for the respective user interface displayed concurrently with the call user interface unless and until the user requests to view that expanded call user interface by providing the swipe input, which simplifies the interaction between the user and the electronic device and enhances the operability of the electronic device and makes the user-device interface more efficient (e.g., by maintaining the context of the respective user interface and forgoing interrupting the user's interactions with the respective user interface displayed concurrently with the call user interface, thus avoiding extra inputs for the user to dismiss an expanded call user interface in order to complete their interactions with the respective user interface that was displayed when the call came into the device), which additionally reduces power usage and improves battery life of the electronic device by enabling the user to use the electronic device more quickly and efficiently.

In some embodiments, in response to receiving the input directed to the call user interface (714), in accordance with the determination that the input comprises selection of the selectable option (e.g., 616a) in the call user interface (e.g., the selectable option that, when selected, causes the electronic device to accept the call), the electronic device (e.g., 500) accepts (716) the incoming call and maintains display of the call user interface (e.g., 6100 overlaid on the respective user interface, such as in FIGS. 6O-6P. In some embodiments, accepting the call includes initiating a connection with the electronic device from which the incoming call was received to establish a real-time audio and/or video communication channel with the electronic device from which the incoming call was received. In some embodiments, the electronic device continues to display the respective user interface that was displayed before the indication of the incoming call was received in response to detecting selection of the option to accept the call. For example, if the electronic device was displaying a user interface of a first application when the indication of the incoming call was received, the electronic device displays the call user interface overlaid on the respective user interface of the first application in response to the indication of the incoming call and continues to display the call user interface overlaid on the respective user interface of the first application and accepts the call in response to detecting selection of the option to accept the call. As another example, if the electronic device was displaying a user interface of a second application when the indication of the incoming call was received, the electronic device displays the call user interface overlaid on the respective user interface of the second application in response to the indication of the incoming call and continues to display the call user interface overlaid on the respective user interface of the second application and accepts the call in response to detecting selection of the option to accept the call. As another example, if the electronic device was displaying a system user interface when the indication of the incoming call was received, the electronic device displays the call user interface overlaid on the system user interface in response to the indication of the incoming call and continues to display the call user interface overlaid on the system user interface and accepts the call in response to detecting selection of the option to accept the call.

The above-described manner of maintaining display of the call user interface overlaid on the respective user interface enables the electronic device to provide an efficient way of displaying the respective user interface while the call is in progress, which simplifies the interaction between the user and the electronic device and enhances the operability of the electronic device and makes the user-device interface more efficient (e.g., by continuing to display the respective user interface after the call is answered without a user input to do so), which additionally reduces power usage and improves battery life of the electronic device by enabling the user to use the electronic device more quickly and efficiently.

In some embodiments, in response to receiving the input directed to the call user interface (718), in accordance with the determination that the input comprises an input directed to the call user interface 710*a* that includes movement in the first direction (e.g., a swipe input or a touch and drag input), display (720) the expanded call user interface without accepting the incoming call, such as in FIGS. 6C-6D. In some embodiments, the expanded call user interface will continue to be displayed until the indication of the incoming call ceases (e.g., the call goes to voicemail or the caller terminates the call) if an input to accept the call is not received. In some embodiments, in response to detecting selection of an option to accept the call that is included in the expanded call user interface, the electronic device accepts the call and continues to display the expanded call user interface. In some embodiments, in response to receiving an input accepting the call while displaying the expanded call user interface, the electronic device updates the expanded call user interface to include an indication of the duration of the call.

The above-described manner of displaying the expanded call user interface without accepting the incoming call provides a quick and efficient manner of providing additional information and/or options related to the incoming call before the call is accepted, which simplifies the interaction between the user and the electronic device and enhances the operability of the electronic device and makes the user-device interface more efficient (e.g., by presenting the information and options associated with the incoming call without accepting the call unless and until an input to accept the call is received), which additionally reduces power usage and improves battery life of the electronic device by enabling the user to use the electronic device more quickly and efficiently.

In some embodiments, in response to receiving the input directed to the call user interface (722), in accordance with the determination that the input comprises selection of the selectable option (e.g., 616*a*) in the call user interface (e.g., selection of the option to accept the call), the electronic device (e.g., 500) updates (724) the call user interface to include one or more selectable options (e.g., 6160 for controlling one or more audio options (e.g., an option to select an audio output device through which to play the audio of the call, an option to raise or lower the volume of the audio of the call) associated with the call, such as in FIGS. 6O-6P. In some embodiments, the electronic device displays an audio option at the location in the respective user interface at which the option to accept the incoming call had been displayed prior to receiving the input to accept the incoming call. In response to detecting selection of the audio option, the electronic device displays a plurality of options associated with audio output devices in communication with the electronic device that, when selected, causes the electronic device to play the audio of the call through the selected audio output device. For example, the audio options include an option to play the audio through one or more speakers integrated with the electronic device and/or an option to play the audio through a connected headset or Bluetooth device.

The above-described manner of displaying the one or more selectable options for controlling one or more audio options associated with the call in the call user interface provides a quick and efficient manner of changing an audio option associated with the call while continuing to display the call user interface overlaid on the respective user interface, which simplifies the interaction between the user and the electronic device and enhances the operability of the electronic device and makes the user-device interface more efficient (e.g., by reducing the inputs needed to change an audio option while continuing to view the respective user interface), which additionally reduces power usage and improves battery life of the electronic device by enabling the user to use the electronic device more quickly and efficiently.

In some embodiments, such as in FIG. 6C, the call user interface (e.g., 610) is displayed (726) overlaid on a first portion of the respective user interface (e.g., at or near a top edge of the respective user interface), and the first direction of the movement is from the first portion of the respective user interface towards a second portion of the respective user interface (e.g., up, down, to the right, or to the left), opposite the first portion. In some embodiments, the movement is from the call user interface towards the respective user interface on which the call user interface is overlaid. For example, the call user interface is displayed along the top edge of the respective user interface and, in response to a swipe or select and drag input downward, the electronic device displays the expanded calling user interface (e.g., and ceases displaying the respective user interface).

The above-described manner of displaying the call user interface overlaid on a first edge of the respective user interface and displaying the expanded call user interface in response to an input including a movement away from the first edge of the respective user interface provides an efficient and intuitive way to display the expanded call user interface, which simplifies the interaction between the user and the electronic device and enhances the operability of the electronic device and makes the user-device interface more efficient (e.g., by reducing the number of inputs and the amount of time it takes to display the expanded call user interface), which additionally reduces power usage and improves battery life of the electronic device by enabling the user to use the electronic device more quickly and efficiently.

In some embodiments, such as in FIG. 6D, the expanded call user interface includes (728) one or more selectable options (e.g., 622*a*) and (e.g., 624*a*) for controlling one or more operations associated with the call, wherein the one or more selectable options (e.g., 622*a*) and (e.g., 624*a*) were not included in the call user interface (e.g., 610*a*) that was displayed prior to detecting the input directed to the call user interface, such as in FIG. 6C. In some embodiments, the expanded call user interface includes an option to send a message to the caller of the incoming call and an option to set a reminder associated with the incoming call (e.g., a reminder to call the caller back)—in some embodiments, these options were not displayed in the call user interface, and are displayed in the expanded call user interface. In some embodiments, both the call user interface and the expanded call user interface include options to accept the call and to decline the call.

The above-described manner of displaying selectable options in the expanded call user interface that were not included in the call user interface enables the electronic device to preserve display area while displaying the call user interface overlaid on the respective user interface by forgoing displaying some of the options unless and until receiving an input to display the expanded call user interface, which simplifies the interaction between the user and the electronic device and enhances the operability of the electronic device and makes the user-device interface more efficient (e.g., by maintaining the context of the respective user interface and forgoing interrupting the user's interactions with the respective user interface displayed concurrently with the call user interface, thus avoiding extra inputs for the user to dismiss an expanded call user interface in order to complete their interactions with the respective user interface that was displayed when the call came into the device), which additionally reduces power usage and improves battery life of the electronic device by enabling the user to use the electronic device more quickly and efficiently.

In some embodiments, such as in FIG. 6D, the expanded call user interface is displayed (730) without displaying the respective user interface on which the call user interface (e.g., 610*a*) was overlaid prior to detecting the input directed to the call user interface, such as in FIG. 6C (e.g., in a full screen mode via the display generation component). In some embodiments, in response to the input to display the expanded call user interface, the electronic device ceases displaying the respective user interface and displays the expanded call user interface at the location at which the respective user interface had been displayed. For example, in response to receiving the user input to display the expanded call user interface while displaying the respective user interface in a full screen mode, the electronic device ceases displaying the respective user interface and displays the expanded call user interface in a full screen mode. In some embodiments, the electronic device displays a second user interface in a first respective region concurrently with the respective user interface in a second respective region, and the call user interface when the input to display the expanded call user interface is received. In some embodiments, in response to receiving the input to display the expanded call user interface, the electronic device ceases displaying the respective user interface in the second respective region and displays the expanded call user interface in the second respective region while continuing to display the second user interface in the first respective region.

The above-described manner of displaying the expanded call user interface without displaying the respective user interface enables the electronic device to allocate enough display area to the expanded call user interface to display expanded information and options associated with the incoming call, which simplifies the interaction between the user and the electronic device and enhances the operability of the electronic device and makes the user-device interface more efficient (e.g., by providing the information and options associated with the incoming call in an efficient manner), which additionally reduces power usage and improves battery life of the electronic device by enabling the user to use the electronic device more quickly and efficiently.

In some embodiments, such as in FIG. 6H, the respective user interface is a user interface of a first application (e.g., the first application is an application other than the application through which the call is received (e.g., a phone application, a virtual or internet phone application, a voice chat application, etc.). In some embodiments, the respective user interface is a system user interface of the operating system of the electronic device.

In some embodiments, such as in FIG. 6J, the expanded call user interface is displayed (734) overlaid on the respective user interface in a respective region (e.g., 638) of a display area of the display generation component (e.g., 504*b*), the respective region (e.g., 638) configured to display one or more user interfaces of one or more second applications overlaid on the respective user interface of the first application. In some embodiments, the electronic device is configured to display one or more user interfaces in a first region of the display area while displaying another user interface in a second region overlaid on the first region. In some embodiments, the second region is smaller than the first region so that the respective user interface displayed in the first region (e.g., the respective user interface of the first application) is partially visible while the respective user interface (e.g., of the one or more second applications) is displayed in the second region overlaid on the first region. In some embodiments, the respective user interface of the first application occupies the entire display area other than the respective region. In some embodiments, the respective user interface of the first application occupies a portion (e.g., half, a third, etc.) of the full screen display region other than the respective region. For example, the electronic device displays the respective user interface of the first application and a user interface of a third application such that these user interfaces together occupy the first region of the display area. In some embodiments, the indication of the incoming call is received while the electronic device displays a user interface of a second application in the respective region of the respective user interface (e.g., overlaid over the respective user interface of the first application) and, in response to the indication of the incoming call, the electronic device reduces the size of the respective user interface of the second application to display both the respective user interface of the second application and the call user interface in the respective region of the display area (e.g., overlaid on the respective user interface of the first application). In some embodiments, in response to receiving the input including movement in the first direction while displaying the call user interface and the respective user interface of the second application, the electronic device ceases displaying the respective user interface of the second application and displays the expanded call user interface in the respective region (e.g., overlaid on the respective user interface of the first application). In some embodiments, the electronic device is not displaying a user interface of a second application in the respective region when the indication of the incoming call is received and, in response to receiving the indication of the incoming call, the electronic device displays the call user interface in the respective region (e.g., overlaid on the respective user interface of the first application). In some embodiments, the call user interface is displayed at a size that is smaller than the maximum size of the respective region (e.g., the size at which the respective user interface of the second application is displayed in the respective region) unless and until the input including movement in the first direction is received. In some embodiments, in response to receiving the input including movement in the first direction while displaying the call user interface in the respective region without displaying a user interface of a second application in the respective region, the electronic device displays the expanded call user interface in the respective region (e.g., overlaid on the respective user interface of the first application).

The above-described manner of displaying the call user interface in the respective region enables the electronic device to continue displaying the respective user interface of the first application while displaying the call user interface in a manner similar to other user interfaces overlaid on the first user interface, which simplifies the interaction between the user and the electronic device and enhances the operability of the electronic device and makes the user-device interface more efficient (e.g., by maintaining the context of the respective user interface and forgoing interrupting the user's interactions with the respective user interface displayed concurrently with the call user interface, thus avoiding extra inputs for the user to dismiss an expanded call user interface in order to complete their interactions with the respective user interface that was displayed when the call came into the device), which additionally reduces power usage and improves battery life of the electronic device by enabling the user to use the electronic device more quickly and efficiently.

In some embodiments, such as in FIG. 6K, while displaying the expanded call user interface in the respective region (e.g., 638) overlaid on the respective user interface, the electronic device (e.g., 500) receives (736), via the one or more input devices, a second input directed to the expanded call user interface (e.g., a movement corresponding to a request to change the respective user interface displayed in the respective region). In some embodiments, in response to receiving the second input directed to the expanded call user interface (738), in accordance with a determination that the second input comprises an input directed to a first region of the expanded call user interface that includes movement in a second direction (740) (e.g., a swipe or touch and drag or select and drag input to the left or right), the electronic device (e.g., 500) ceases (742) display of the expanded call user interface in the respective region (e.g., 638), such as in FIG. 6L. In some embodiments, the input is directed to a portion and/or user interface element in the expanded call user interface at a bottom edge of the expanded call user interface element.

In some embodiments, the electronic device (e.g., 500) displays (744), in the respective region (e.g., 638), a respective user interface of a second application overlaid on the respective user interface of the first application, such as in FIG. 6L. In some embodiments, the respective user interface of the second application had been previously displayed in the respective region before the incoming call was received. For example, while the electronic device is displaying the call user interface in the respective region, the electronic device receives an input to change the respective user interface displayed in the respective region and in response to the input, the electronic device ceases displaying the call user interface and displays a user interface for the second application. In some embodiments, in response to the input and while ceasing to display the call user interface, the electronic device displays an indication of the incoming and/or accepted call at a predetermined location in the display area of the display generation component other than the respective region (e.g., in a header region in which information such as the current time, the connectivity status of the electronic device, and other information is displayed).

The above-described manner of displaying the respective user interface of the second application in the respective region in response to the input provides an intuitive and efficient way of ceasing to display the call user interface in the respective region that is similar to the way the electronic device ceases displaying other user interfaces displayed in the respective region, which simplifies the interaction between the user and the electronic device and enhances the operability of the electronic device and makes the user-device interface more efficient (e.g., by reducing the time it takes to display the respective user interface of the second application compared to waiting until the incoming call is no longer received before ceasing to display the call user interface), which additionally reduces power usage and improves battery life of the electronic device by enabling the user to use the electronic device more quickly and efficiently.

In some embodiments, in response to receiving the second input directed to the expanded call user interface (746), in accordance with a determination that the second input comprises an input directed to a second region of the expanded call user interface that includes movement in a third direction (748) (e.g., a swipe, touch and drag, or select and drag movement up), such as in FIG. 6M, the electronic device (e.g., 500) ceases (750) display of the expanded call user interface in the respective region (e.g., 638) without displaying, in the respective region, the respective user interface of the second application overlaid on the respective user interface of the first application, such as in FIG. 6N (e.g., and without displaying any other user interface overlaid on the respective user interface of the first application). In some embodiments, the third direction is different from the second direction. In some embodiments, the third direction is the same as the second direction. In some embodiments, the input is directed to a portion and/or user interface element in the expanded call user interface at a top edge of the expanded call user interface element. In some embodiments, in response to the second input and ceasing displaying the expanded call user interface, the electronic device displays an indication of the incoming and/or accepted call in a region of the respective user interface other than the respective region. For example, the visual indication is displayed in a header region in which information, such as the current time and the network connection status of the electronic device are displayed.

The above-described manner of ceasing display of the expanded call user interface without displaying a user interface of the second application overlaid on the respective user interface of the first application provides a quick and efficient way to resume displaying the respective user interface of the first application in an unobstructed way, which simplifies the interaction between the user and the electronic device and enhances the operability of the electronic device and makes the user-device interface more efficient (e.g., by allowing the user to continue viewing the respective user interface of the first application while the indication of the incoming call is still being received), which additionally reduces power usage and improves battery life of the electronic device by enabling the user to use the electronic device more quickly and efficiently.

In some embodiments, such as in FIG. 6E, the expanded call user interface is overlaid on a first portion (e.g., less than the entirety) of the respective user interface while maintaining display of a second portion of the respective user interface (e.g., without being overlaid on a second portion of the respective user interface), the call user interface is overlaid on a third portion of the respective user interface, smaller than the first portion, and the first portion of the respective user interface is smaller than an entirety of the respective user interface (752). In some embodiments, the call user interface is displayed at a size smaller than the expanded call user interface and at least a portion of the respective user interface is still visible/displayed while the expanded call user interface is being displayed. In some embodiments, in response to detecting an input selecting a region of the expanded call user interface that is not a selectable option, the electronic device expands the expanded call user interface to a full screen size.

The above-described manner of displaying the expanded call user interface on a first portion of the respective user interface enables the electronic device to continue displaying a portion of the respective user interface concurrently with the expanded call user interface, which simplifies the interaction between the user and the electronic device and enhances the operability of the electronic device and makes the user-device interface more efficient (e.g., by reducing the time it takes to resume viewing the respective user interface after viewing the expanded call user interface, maintaining the context of the respective user interface, avoiding interrupting the user's interactions with the respective user interface, and reducing the inputs needed to resume interacting with the respective user interface), which additionally reduces power usage and improves battery life of the electronic device by enabling the user to use the electronic device more quickly and efficiently.

In some embodiments, such as in FIG. 6EE, in accordance with a determination that the incoming call comprises a video call, the call user interface (e.g., 610h) includes a preview (e.g., 662) of video generated by the electronic device that will be used in the video call if the video call is accepted (754). In some embodiments, the video is captured by a camera in communication with the electronic device, such as a camera integrated with the electronic device, and captures video of the user of the electronic device for use in the video call, if accepted. In some embodiments, the call user interface is sized differently than a video calling user interface and once the video call begins, the aspect ratio and/or field of view of the video changes from the aspect ratio and/or field of view of the preview of the video.

The above-described manner of displaying the video preview in the call user interface provides a quick and efficient way to convey that video will be transmitted to the caller in response to detecting an input to accept the video call, which simplifies the interaction between the user and the electronic device and enhances the operability of the electronic device and makes the user-device interface more efficient (e.g., by reducing erroneous inputs to accept video calls that would not have otherwise been accepted if it were known that the call was a video call), which additionally reduces power usage and improves battery life of the electronic device by enabling the user to use the electronic device more quickly and efficiently.

In some embodiments, while displaying, overlaid on the respective user interface, a respective call user interface for a respective incoming call, wherein the respective call user interface (e.g., 610h) includes a respective selectable option (e.g., 616h) (e.g., an option that, when selected, causes the electronic device to initiate a process to accept the incoming call), the electronic device (e.g., 500) receives (756), via the one or more input devices, a second input directed to the respective call user interface (e.g., 610h), such as in FIG. 6EE. In some embodiments, in response to receiving the second input directed to the respective call user interface (758), in accordance with a determination that the second input comprises selection of the respective selectable option (e.g., 616h) in the respective call user interface (e.g., 610h) (760), in accordance with a determination that the incoming call is not a video call, the electronic device (e.g., 500) accepts (762) the incoming call, such as in FIG. 6O. In some embodiments, the call is accepted in response to detecting selection of the option without any additional input between receipt of selection of the option and acceptance of the call. In some embodiments, the call is a telephone call, an internet-based voice call, or other call including audio that does not include video. In some embodiments, in accordance with a determination that the incoming call is a video call, without accepting the video call, the electronic device (e.g., 500) displays (764), via the display generation component, a respective expanded call user interface that includes video generated by the electronic device that will be used in the video call if the video call is accepted, such as in FIG. 6FF. In some embodiments, the respective call user interface includes an option that, when selected, causes the electronic device to accept the video call. In some embodiments, in response to accepting the video call, the electronic device captures video and transmits the video to the caller. In some embodiments, the video preview is captured by a camera in communication with the electronic device, such as a camera integrated with the electronic device, and captured video of the user of the electronic device that will be used in the video call, if accepted.

The above-described manner of displaying the expanded call user interface without accepting the call when the call is a video call provides a quick and efficient way to convey that video will be transmitted to the caller in response to detecting an input to accept the video call, which simplifies the interaction between the user and the electronic device and enhances the operability of the electronic device and makes the user-device interface more efficient (e.g., by reducing erroneous inputs to accept video calls that would not have otherwise been accepted if it were known that the call was a video call), which additionally reduces power usage and improves battery life of the electronic device by enabling the user to use the electronic device more quickly and efficiently.

In some embodiments, in response to receiving the input directed to the call user interface (e.g., detecting selection of an option to accept the incoming call) (766), such as in FIG. 6EE, in accordance with a determination that the incoming call is a video call 768, such as in FIG. 6EE, without accepting the video call, the electronic device (e.g., 500) displays (770), via the display generation component, the expanded call user interface that includes video (e.g., 664) generated by the electronic device that will be used in the video call if the video call is accepted, such as in FIG. 6FF. In some embodiments, the background of the expanded call user interface includes the video generated by the electronic device that will be used in the video call if the video call is accepted. In some embodiments, the video is captured by a camera integrated with or in communication with the electronic device. In some embodiments, while displaying the respective expanded call user interface including the video (e.g., 664) generated by the electronic device (e.g., 500), in accordance with a determination that an elapsed time since the respective expanded call user interface was displayed exceeds a time threshold (e.g., 1, 2, 3, 5, or 7 seconds), the electronic device (e.g., 500) accepts (772) the video call. In some embodiments, the expanded call user interface includes an indication of the amount of time before the video call will be accepted. In some embodiments, the expanded call user interface further includes a selectable option that, when selected, causes the electronic device to accept the video call before the predetermined elapsed time has passed. In some embodiments, in accordance with a determination that the incoming call is not a video call, the electronic device (e.g., 500) accepts (774) the incoming call without displaying the expanded call user interface, such as in FIG. 6P.

The above-described manner of accepting the video call in accordance with the determination that the elapsed time has passed since the expanded call user interface was displayed provides a quick and efficient way to automatically accept the video call once the expanded call user interface is displayed, which simplifies the interaction between the user and the electronic device and enhances the operability of the electronic device and makes the user-device interface more efficient (e.g., by reducing the number of inputs needed to accept the video call), which additionally reduces power usage and improves battery life of the electronic device by enabling the user to use the electronic device more quickly and efficiently.

In some embodiments, such as in FIG. 6GG the respective expanded call user interface that includes the video (e.g., 666) generated by the electronic device (e.g., 500) includes a second respective selectable option (e.g., 616*k*) for accepting the video call (776). In some embodiments, while displaying the respective expanded call user interface, the electronic device 50 receives (778), via the one or more input devices, a third input selecting the second respective selectable option (e.g., 616*k*). In some embodiments, in response to receiving the third input selecting the second respective selectable option, the electronic device accepts (780) the video call. In some embodiments, the electronic device automatically captures and sends video to the other participant in the video call in response to the input to accept the video call. In some embodiments, the input to accept the call is received before the predetermined period of time has passed and the electronic device initiates the video call before the predetermined time has passed.

The above-described manner of concurrently displaying a second respective selectable option for accepting the video call with the video preview provides a quick manner of accepting the video call without having to wait for the elapsed time to reach the time threshold, which simplifies the interaction between the user and the electronic device and enhances the operability of the electronic device and makes the user-device interface more efficient (e.g., by reducing the time needed to accept the video call), which additionally reduces power usage and improves battery life of the electronic device by enabling the user to use the electronic device more quickly and efficiently.

In some embodiments, in response to receiving the input directed to the call user interface (782), in accordance with a determination that the input comprises an input directed to the call user interface (e.g., 610*a*) that includes movement in a second direction (e.g., up), different from the first direction (e.g., a swipe input or a touch and drag input), such as in FIG. 6U, the electronic device (e.g., 500) ceases (784) display of the call user interface (e.g., 610*a*) and displays, via the display generation component, a visual indication (e.g., 646*b*), different from the call user interface, of the incoming call, such as in FIG. 6V. In some embodiments, for some devices (e.g., devices not having sensors at the top of the display that occupy display area), a status bar at the top of the respective user interface changes color and the visual indication is displayed within the status bar but doesn't replace existing content of the status bar. In some embodiments, for some devices (e.g., devices with sensors at top of display that occupy some display area) the visual indication replaces content (e.g., the current time) that was displayed at the top of the respective user interface. In some embodiments, for some devices (e.g., tablets), the visual indication of the incoming call is displayed next to existing content in the top region of the respective user interface. In some embodiments, in response to the input, an audio and/or other type of indication (e.g., tactile) of the incoming call (e.g., ringtone) is silenced but call is not declined. In some embodiments, in response to the input, the electronic device declines the call. In some embodiments, the visual indication of the incoming call continues to be displayed for the duration during which the indication of the incoming call is detected and the electronic device ceases displaying the visual indication of the incoming call when the incoming call is disconnected and/or ceases.

The above-described manner of displaying the visual indication of the incoming call in response to the input provides a quick and efficient way of ceasing display of the call user interface but maintaining an indication corresponding to the incoming call, which simplifies the interaction between the user and the electronic device and enhances the operability of the electronic device and makes the user-device interface more efficient (e.g., by reducing the display area needed to indicate the incoming call, thereby enabling the user to continue viewing the full user interface), which additionally reduces power usage and improves battery life of the electronic device by enabling the user to use the electronic device more quickly and efficiently.

In some embodiments, such as in FIG. 6W, while displaying the visual indication (e.g., 646*b*) of the incoming call, the electronic device (e.g., 500) receives (786), via the one or more input devices, an input selecting (e.g., via a tap or selection with a cursor, key, or button, etc.) the visual indication (e.g., 646*b*) of the incoming call. In some embodiments, in response to receiving the input selecting the visual indication (e.g., 646*b*) of the incoming call, the electronic device (e.g., 500) displays (788), via the display generation component, the call user interface (e.g., 610*a*) overlaid on the respective user interface, such as in FIG. 6X. In some embodiments, in response to the input and while displaying the call user interface, the electronic device ceases displaying the visual indication of the incoming call.

The above-described manner of displaying the call user interface in response to selection of the visual indication of the incoming call provides an efficient way of viewing information about the incoming call and options to accept or decline the call, which simplifies the interaction between the user and the electronic device and enhances the operability of the electronic device and makes the user-device interface more efficient (e.g., by reducing the number of inputs needed to view the information about the call compared to navigating to an application associated with the incoming call instead of selecting the indication of the incoming call), which additionally reduces power usage and improves battery life of the electronic device by enabling the user to use the electronic device more quickly and efficiently.

In some embodiments, while displaying the visual indication (e.g., 646*b*) of the incoming call, the electronic device (e.g., 500) receives (790), via the one or more input devices, an input selecting the visual indication (e.g., 646b) of the incoming call. In some embodiments, in response to receiving the input selecting the visual indication (e.g., 646b) of the incoming call, the electronic device (e.g., 500) displays (792), via the display generation component, the expanded call user interface, such as in FIG. 6Y. In some embodiments, in response to the input and while displaying the expanded call user interface, the electronic device ceases displaying the visual indication of the incoming call.

The above-described manner of displaying the expanded call user interface in response to selection of the visual indication of the incoming call provides an efficient way of viewing information about the incoming call and options to accept or decline the call, which simplifies the interaction between the user and the electronic device and enhances the operability of the electronic device and makes the user-device interface more efficient (e.g., by reducing the number of inputs needed to view the information about the call compared to navigating to an application associated with the incoming call instead of selecting the indication of the incoming call), which additionally reduces power usage and improves battery life of the electronic device by enabling the user to use the electronic device more quickly and efficiently.

In some embodiments, such as in FIGS. 6V-6W, the visual indication (e.g., 646b) includes an animation corresponding to the incoming call. In some embodiments, such as in FIG. 6T, after accepting the incoming call (e.g., while the call is connected and ongoing) and while the call user interface is not displayed (e.g., and the expanded call user interface is not displayed, either), the electronic device (e.g., 500) displays (796), via the display generation component, a second visual indication (e.g., 646d) of the accepted call, wherein the second visual indication (e.g., 646d) is displayed with a visual characteristic having a first value that is different from a second value for the visual characteristic with which the visual indication of the incoming call is displayed. In some embodiments, the animation includes changing one or more of the colors of the visual indication (e.g., a background color, a foreground color, etc.) as the incoming call is pending. In some embodiments, the animation includes an animated illustration as the incoming call is pending, such as flashing colors, a vibrating or shaking phone icon, etc. In some embodiments, the visual indication of the accepted call does not include an animation.

The above-described manner of including an animation in the visual indication of the incoming call efficiently distinguishes the visual indication from the rest of the respective user interface and/or status visual indications that might be displayed in its location, which simplifies the interaction between the user and the electronic device and enhances the operability of the electronic device and makes the user-device interface more efficient (e.g., by effectively conveying the meaning of the indication without the need for further user input), which additionally reduces power usage and improves battery life of the electronic device by enabling the user to use the electronic device more quickly and efficiently.

In some embodiments, such as in FIG. 6V, the visual indication (e.g., 646b) is displayed at a location in the respective user interface at which a second visual indication (e.g., 646d) of a second call is displayed while the electronic device (e.g., 500) is participating in the second call, such as in FIG. 6T (798). In some embodiments, the electronic device has accepted the second call). In some embodiments, the electronic device displays the visual indication of the incoming call at the same location as an indication of a call that is in progress. For example, the electronic device displays the visual indication of the incoming call, receives a sequence of one or more inputs to accept the call, and then, while the call is occurring, displays a visual indication of the ongoing call at the same location in the respective user interface at which the visual indication of the incoming call was displayed. In some embodiments, the visual indication of the incoming call has a different appearance (e.g., color, content, animations, etc.) than the visual indication of the ongoing call.

The above-described manner of displaying the visual indication of the incoming call at the same location at which the electronic device displays the second visual indication of the second call enables the electronic device to efficiently indicate the status of incoming and ongoing calls without using unnecessary display area, which simplifies the interaction between the user and the electronic device and enhances the operability of the electronic device and makes the user-device interface more efficient (e.g., by displaying the indications of the incoming call and the second call at the same location, the user is able to more quickly locate the indications), which additionally reduces power usage and improves battery life of the electronic device by enabling the user to use the electronic device more quickly and efficiently.

In some embodiments, such as in FIG. 6Z, the visual indication (e.g., 646c) includes a representation (e.g., 612g) of a respective user associated with the incoming call, other than a user of the electronic device (798-2). In some embodiments, a contact card including a name and/or contact information of the contact that is accessible to the electronic device includes an image (e.g., avatar, picture, etc.) associated with the contact. In some embodiments, the image associated with the contact is included in the visual indication of the incoming call. In some embodiments, if the incoming call has multiple participants, the visual indication of the incoming call includes a visual indication of each (or at least multiple, if not all) participant.

The above-described manner of including the representation of the respective user in the indication of the incoming call efficiently indicates the user that is making the incoming call, which simplifies the interaction between the user and the electronic device and enhances the operability of the electronic device and makes the user-device interface more efficient (e.g., by reducing the number of inputs needed to confirm who the call is from while displaying the visual indication of the incoming call), which additionally reduces power usage and improves battery life of the electronic device by enabling the user to use the electronic device more quickly and efficiently.

In some embodiments, such as in FIG. 6B, while displaying the call user interface (e.g., 610a) overlaid on the respective user interface, and before accepting the incoming call, the electronic device (e.g., 500) receives (798-4), via the one or more input devices, a first input interacting with the respective user interface (e.g., the first input includes selection of an element included in the respective user interface (e.g., selection of an application icon to display the application), and/or an input navigating from the first user interface to a different user interface other than the call user interface or expanded call user interface, etc.). In some embodiments, such as in FIG. 6C, in response to receiving the first input interacting with the respective user interface, the electronic device (e.g., 500) updates (798-6) the respective user interface in accordance with the first input interacting with the respective user interface while maintaining display of the call user interface (e.g., 610a) overlaid on the updated respective user interface. In some embodiments, the electronic device continues to display the call user interface overlaid on the displayed user interface unless and until an input dismissing the call user interface is received (e.g., an input to display the expanded call user interface, an input to dismiss the call user interface) or the incoming call ceases to be received (e.g., the call disconnects or is answered by a voicemail system).

The above-described manner of updating the respective user interface in response to the first input while maintaining display of the call user interface overlaid on the updated user interface reduces the number of inputs needed to interact with the call user interface after interacting with the respective user interface while the call user interface is displayed, which simplifies the interaction between the user and the electronic device and enhances the operability of the electronic device (e.g., by maintaining the context of the respective user interface and forgoing interrupting the user's interactions with the respective user interface displayed concurrently with the call user interface, thus avoiding extra inputs for the user to dismiss an expanded call user interface in order to complete their interactions with the respective user interface that was displayed when the call came into the device) and makes the user-device interface more efficient, which additionally reduces power usage and improves battery life of the electronic device by enabling the user to use the electronic device more quickly and efficiently.

In some embodiments, such as in FIG. 6S, while displaying the call user interface (e.g., 6100 overlaid on the respective user interface and after the incoming call has been accepted (e.g., while the electronic device is participating in the call), the electronic device (e.g., 500) receives (798-8), via the one or more input devices, a second input interacting with the respective user interface. In some embodiments, the second input includes selection of an element included in the respective user interface (e.g., selection of an application icon to display the application), and/or an input navigating from the first user interface to a different user interface other than the call user interface or expanded call user interface, etc. In some embodiments, in response to receiving the second input interacting with the respective user interface, the electronic device (e.g., 500) cease (798-10) display of the call user interface and updating the respective user interface in accordance with the second input interacting with the respective user interface, such as in FIG. 6T. In some embodiments, once the call has been accepted, in response to a user input directed to a user interface other than the call user interface, the electronic device ceases displaying the call user interface and performs the action associated with the input. For example, in response to receiving an input selecting an option in the respective user interface while displaying the call user interface overlaid on the respective user interface, the electronic device performs the action associated with the option (e.g., navigates to another user interface, such as a user interface of another application) and ceases displaying the call user interface overlaid on the respective user interface. In some embodiments, in response to detecting a user input directed to the call user interface, the electronic device performs the action in accordance with the input and continues displaying the call user interface overlaid on the respective user interface. For example, in response to detecting selection of an option to view one or more audio settings of the call included in the call user interface, the electronic device displays the audio options and continues displaying the call user interface.

The above-described manner of ceasing display of the call user interface and updating the respective user interface in accordance with the second input while the call is in progress provides an efficient way of ceasing display of the call user interface when input to the call user interface is less likely, which simplifies the interaction between the user and the electronic device and enhances the operability of the electronic device and makes the user-device interface more efficient (e.g., by reducing the number of inputs needed to view the respective user interface unobstructed while the call is in progress), which additionally reduces power usage and improves battery life of the electronic device by enabling the user to use the electronic device more quickly and efficiently.

In some embodiments, while displaying the call user interface overlaid on the respective user interface and before accepting the incoming call (798-12), the electronic device (e.g., 500) detects (798-14) a notification event (e.g., 650) at the electronic device (e.g., 500), such as in FIG. 6AA. In some embodiments, the notification event is an event that causes the electronic device to present an indication (e.g., a visual, audio, or tactile indication) of the event. For example, the notification event is one of an incoming message, an upcoming calendar appointment, or an application alert. In some embodiments, in response to detecting the notification event (e.g., 650) at the electronic device, the electronic device (e.g., 500) delays (798-16) presentation (e.g., display) of a respective (e.g., visual, audio, tactile) indication (e.g., 656) of the notification event, such as in FIGS. 6AA-6BB. In some embodiments, the electronic device forgoes presenting the indication (e.g., visual indication, audio indication, tactile indication) of the alert while the incoming call is being received. The electronic device optionally presents the indication after delaying presentation of the respective indication of the notification event in response to a subsequent event at the device that is related to the notification event such as ceasing to detect the incoming call and/or ceasing to display the call user interface, such as because the call was declined, accepted, disconnected by the caller, or answered by a voicemail system, or because the device otherwise detected an input to dismiss the call user interface. The above-described manner of delaying display of the respective indication while the indication of the incoming call is being detected enables the electronic device to avoid altering display of the call user interface while the call is incoming, and thus avoiding erroneous input interaction with the call user interface or the respective user interface more generally while the call is incoming, which simplifies the interaction between the user and the electronic device and enhances the operability of the electronic device and makes the user-device interface more efficient (e.g., by reducing the chance of user error caused by trying to select one user interface element and accidentally selecting a different user interface element), which additionally reduces power usage and improves battery life of the electronic device by enabling the user to use the electronic device more quickly and efficiently.

In some embodiments, after delaying the presentation of the respective visual indication of the notification event, in accordance with a determination that the incoming call has been accepted, the electronic device (e.g., 500) presents (798-18) the respective indication of the notification event. In some embodiments, the electronic device continues to display the call user interface while displaying the visual indication of the notification event. In some embodiments, the visual indication of the notification event is displayed at the location in the respective user interface at which the call user interface had been displayed and the electronic device moves the location of the call user interface (e.g., downward). In some embodiments, the electronic device maintains the location of the call user interface on the display and displays the indication of the notification at a different location in the respective user interface, such as below the call user interface. In some embodiments, the electronic device concurrently presents the visual indication of the notification event with a tactile or audio indication of the notification event.

The above-described manner of presenting the visual indication of the notification event after the call is accepted enables the electronic device to promptly inform the user of the notification event, which simplifies the interaction between the user and the electronic device and enhances the operability of the electronic device and makes the user-device interface more efficient (e.g., by reducing the time it takes the user to act on the notification event), which additionally reduces power usage and improves battery life of the electronic device by enabling the user to use the electronic device more quickly and efficiently.

In some embodiments, in response to receiving the input directed to the call user interface (e.g., 610*a*) (798-20), such as in FIG. 6CC, in accordance with a determination that the input comprises an input directed to the call user interface that includes movement in a second direction, different from the first direction (798-22) (e.g., a swipe input or a touch and drag input up), the electronic device (e.g., 500) ceases (798-24) display of the call user interface, such as in FIG. 6DD. In some embodiments, the electronic device continues to display the respective user interface on which the call user interface had been overlaid. In some embodiments, the electronic device (e.g., 500) rejects (798-26) the incoming call, such as in FIG. 6DD. In some embodiments, the electronic device (e.g., 500) displays (798-28), via the display generation component, a visual indication (e.g., 658), different from the call user interface, that the incoming call was rejected, such as in FIG. 6DD. In some embodiments, the visual indication is displayed at a location in the respective user interface at which the call user interface was previously displayed, and is displayed for a predetermined time period (e.g., 1, 2 or 3 seconds) and then ceases to be displayed without any user input.

The above-described manner of rejecting the incoming call and displaying the visual indication that the incoming call was rejected in response to the input provides an efficient way of rejecting the call and confirming that the call was rejected, which simplifies the interaction between the user and the electronic device and enhances the operability of the electronic device and makes the user-device interface more efficient (e.g., by reducing the inputs needed to reject the call), which additionally reduces power usage and improves battery life of the electronic device by enabling the user to use the electronic device more quickly and efficiently.

It should be understood that the particular order in which the operations in FIGS. 7A-7K have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7K are, optionally, implemented by components depicted in FIGS. 1A-1B. For example, displaying operations 704, 712, and 718, presenting operation 798-18, and receiving operations 706, 736, and 756 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, detecting video and/or audio can facilitate use of the electronic device for the purpose of voice and/or video calls. Accordingly, use of such personal information data enables users to communicate with other electronic devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can disable a video calling function of the electronic device if they do not wish for video to be captured and transmitted to other electronic devices in this way.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, phone call and other audio calling functions are operational even if the user has chosen not to share certain personal information, such as location services, health data, device usage history, and the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
while displaying, via the display generation component, a respective user interface, detecting an indication of an incoming call at the electronic device;
in response to detecting the indication of the incoming call at the electronic device, displaying, overlaid on the respective user interface, a call user interface that includes a selectable option for accepting the incoming call;
while displaying the call user interface overlaid on the respective user interface, receiving, via the one or more input devices, an input directed to the call user interface; and
in response to receiving the input directed to the call user interface:
in accordance with a determination that the input comprises selection of the selectable option in the call user interface, accepting the incoming call; and
in accordance with a determination that the input comprises an input directed to the call user interface that includes movement in a first direction, ceasing display of the call user interface and displaying, via the display generation component, a visual indication, different from the call user interface, of the incoming call.

2. The method of claim 1, further comprising:
in response to receiving the input directed to the call user interface:
in accordance with the determination that the input comprises selection of the selectable option in the call user interface, accepting the incoming call and maintaining display of the call user interface overlaid on the respective user interface.

3. The method of claim 1, further comprising:
in response to receiving the input directed to the call user interface:
in accordance with the determination that the input is different from selection of the selectable option in the call user interface and different from the input directed to the call user interface that includes movement in the first direction, displaying an expanded call user interface, different from the call user interface, without accepting the incoming call.

4. The method of claim 3, wherein the expanded call user interface includes selectable options associated with the incoming call that are not included in the call user interface.

5. The method of claim 3, wherein the expanded call user interface is displayed without displaying the respective user interface on which the call user interface was overlaid prior to detecting the input directed to the call user interface.

6. The method of claim 1, further comprising:
in response to receiving the input directed to the call user interface:
in accordance with the determination that the input comprises selection of the selectable option in the call user interface, updating the call user interface to include one or more selectable options for controlling one or more audio options associated with the call.

7. The method of claim 1, wherein the call user interface is displayed overlaid on a first portion of the respective user interface, and the first direction of the movement is in a direction from a second portion of the respective user interface, opposite the first portion, towards the first portion of the respective user interface.

8. The method of claim 1, further comprising:
while displaying the visual indication of the incoming call, receiving, via the one or more input devices, an input selecting the visual indication of the incoming call; and
in response to receiving the input selecting the visual indication of the incoming call, displaying, via the display generation component, an expanded call user interface, different from the call user interface.

9. The method of claim 1, further comprising:
after accepting the incoming call and while the call user interface is not displayed, displaying, via the display generation component, a second visual indication of the incoming call, wherein the second visual indication is displayed with a first appearance different from a second appearance with which the visual indication of the incoming call is displayed.

10. The method of claim 1, wherein the visual indication is displayed at a location in the respective user interface at which a second visual indication of a second call is displayed while the electronic device is participating in the second call.

11. The method of claim 1, wherein the visual indication includes a representation of a respective user associated with the incoming call, other than a user of the electronic device.

12. The method of claim 1, further comprising:
while displaying the call user interface overlaid on the respective user interface, and before accepting the incoming call, receiving, via the one or more input devices, a first input interacting with the respective user interface; and
in response to receiving the first input interacting with the respective user interface, updating the respective user interface in accordance with the first input interacting with the respective user interface while maintaining display of the call user interface overlaid on the updated respective user interface.

13. An electronic device, comprising:
one or more processors;
memory; and
one or more programs, wherein the one or more programs are stored in the memory and configured to be executed by the one or more processors, the one or more programs including instructions for:
while displaying, via a display generation component, a respective user interface, detecting an indication of an incoming call at the electronic device;
in response to detecting the indication of the incoming call at the electronic device, displaying, overlaid on the respective user interface, a call user interface that includes a selectable option for accepting the incoming call;
while displaying the call user interface overlaid on the respective user interface, receiving, via one or more input devices, an input directed to the call user interface; and
in response to receiving the input directed to the call user interface:
in accordance with a determination that the input comprises selection of the selectable option in the call user interface, accepting the incoming call; and
in accordance with a determination that the input comprises an input directed to the call user interface that includes movement in a first direction, ceasing display of the call user interface and displaying, via the display generation component, a visual indication, different from the call user interface, of the incoming call.

14. A non-transitory computer readable storage medium storing one or more programs, the one or more programs comprising instructions, which when executed by one or more processors of an electronic device, cause the electronic device to:
while displaying, via a display generation component, a respective user interface, detect an indication of an incoming call at the electronic device;
in response to detecting the indication of the incoming call at the electronic device, display, overlaid on the respective user interface, a call user interface that includes a selectable option for accepting the incoming call;
while displaying the call user interface overlaid on the respective user interface, receive, via one or more input devices, an input directed to the call user interface; and
in response to receiving the input directed to the call user interface:
in accordance with a determination that the input comprises selection of the selectable option in the call user interface, accept the incoming call; and
in accordance with a determination that the input comprises an input directed to the call user interface that includes movement in a first direction, cease display of the call user interface and display, via the display generation component, a visual indication, different from the call user interface, of the incoming call.

15. The electronic device of claim 13, wherein the one or more programs further include instructions for:
in response to receiving the input directed to the call user interface:
in accordance with the determination that the input comprises selection of the selectable option in the call user interface, accepting the incoming call and maintaining display of the call user interface overlaid on the respective user interface.

16. The electronic device of claim 13, wherein the one or more programs further include instructions for:
in response to receiving the input directed to the call user interface:
in accordance with the determination that the input is different from selection of the selectable option in the call user interface and different from the input directed to the call user interface that includes movement in the first direction, displaying an expanded call user interface, different from the call user interface, without accepting the incoming call.

17. The electronic device of claim 16, wherein the expanded call user interface includes selectable options associated with the incoming call that are not included in the call user interface.

18. The electronic device of claim 16, wherein the expanded call user interface is displayed without displaying the respective user interface on which the call user interface was overlaid prior to detecting the input directed to the call user interface.

19. The electronic device of claim 13, wherein the one or more programs further include instructions for:
in response to receiving the input directed to the call user interface:
in accordance with the determination that the input comprises selection of the selectable option in the call user interface, updating the call user interface to include one or more selectable options for controlling one or more audio options associated with the call.

20. The electronic device of claim 13, wherein the call user interface is displayed overlaid on a first portion of the respective user interface, and the first direction of the movement is in a direction from a second portion of the respective user interface, opposite the first portion, towards the first portion of the respective user interface.

21. The electronic device of claim 13, wherein the one or more programs further include instructions for:
while displaying the visual indication of the incoming call, receiving, via the one or more input devices, an input selecting the visual indication of the incoming call; and
in response to receiving the input selecting the visual indication of the incoming call, displaying, via the display generation component, an expanded call user interface, different from the call user interface.

22. The electronic device of claim 13, wherein the one or more programs further include instructions for:
after accepting the incoming call and while the call user interface is not displayed, displaying, via the display generation component, a second visual indication of the incoming call, wherein the second visual indication is displayed with a first appearance different from a second appearance with which the visual indication of the incoming call is displayed.

23. The electronic device of claim 13, wherein the visual indication is displayed at a location in the respective user interface at which a second visual indication of a second call is displayed while the electronic device is participating in the second call.

24. The electronic device of claim 13, wherein the visual indication includes a representation of a respective user associated with the incoming call, other than a user of the electronic device.

25. The electronic device of claim 13, wherein the one or more programs further include instructions for:
while displaying the call user interface overlaid on the respective user interface, and before accepting the incoming call, receiving, via the one or more input devices, a first input interacting with the respective user interface; and
in response to receiving the first input interacting with the respective user interface, updating the respective user interface in accordance with the first input interacting with the respective user interface while maintaining display of the call user interface overlaid on the updated respective user interface.

26. The non-transitory computer readable storage medium of claim 14, wherein the one or more programs further cause the electronic device to:
in response to receiving the input directed to the call user interface:
in accordance with the determination that the input comprises selection of the selectable option in the call user interface, accept the incoming call and maintain display of the call user interface overlaid on the respective user interface.

27. The non-transitory computer readable storage medium of claim 14, wherein the one or more programs further cause the electronic device to:
in response to receiving the input directed to the call user interface:
in accordance with the determination that the input is different from selection of the selectable option in the call user interface and different from the input directed to the call user interface that includes movement in the first direction, display an expanded call user interface, different from the call user interface, without accepting the incoming call.

28. The non-transitory computer readable storage medium of claim 27, wherein the expanded call user interface includes selectable options associated with the incoming call that are not included in the call user interface.

29. The non-transitory computer readable storage medium of claim 27, wherein the expanded call user interface is displayed without displaying the respective user interface on which the call user interface was overlaid prior to detecting the input directed to the call user interface.

30. The non-transitory computer readable storage medium of claim 14, wherein the one or more programs further cause the electronic device to:
in response to receiving the input directed to the call user interface:
in accordance with the determination that the input comprises selection of the selectable option in the call user interface, update the call user interface to include one or more selectable options for controlling one or more audio options associated with the call.

31. The non-transitory computer readable storage medium of claim 14, wherein the call user interface is displayed overlaid on a first portion of the respective user interface, and the first direction of the movement is in a direction from a second portion of the respective user interface, opposite the first portion, towards the first portion of the respective user interface.

32. The non-transitory computer readable storage medium of claim 14, wherein the one or more programs further cause the electronic device to:
while displaying the visual indication of the incoming call, re4ceive, via the one or more input devices, an input selecting the visual indication of the incoming call; and
in response to receiving the input selecting the visual indication of the incoming call, display, via the display generation component, an expanded call user interface, different from the call user interface.

33. The non-transitory computer readable storage medium of claim 14, wherein the one or more programs further cause the electronic device to:
after accepting the incoming call and while the call user interface is not displayed, display, via the display generation component, a second visual indication of the incoming call, wherein the second visual indication is displayed with a first appearance different from a second appearance with which the visual indication of the incoming call is displayed.

34. The non-transitory computer readable storage medium of claim 14, wherein the visual indication is displayed at a location in the respective user interface at which a second visual indication of a second call is displayed while the electronic device is participating in the second call.

35. The non-transitory computer readable storage medium of claim 14, wherein the visual indication includes a representation of a respective user associated with the incoming call, other than a user of the electronic device.

36. The non-transitory computer readable storage medium of claim 14, wherein the one or more programs further cause the electronic device to:
while displaying the call user interface overlaid on the respective user interface, and before accepting the incoming call, receive, via the one or more input devices, a first input interacting with the respective user interface; and in response to receiving the first input interacting with the respective user interface, update the respective user interface in accordance with the first input interacting with the respective user interface while maintaining display of the call user interface overlaid on the updated respective user interface.

\* \* \* \* \*